（12） United States Patent
Makita et al.

(10) Patent No.: US 8,871,403 B2
(45) Date of Patent: Oct. 28, 2014

(54) FUEL CELL STACK SYSTEM, CHANNEL STRUCTURE, FUEL CELL, ELECTRODE AND ELECTRONIC DEVICE

(75) Inventors: Kengo Makita, Kanagawa (JP);
Shinichi Uesaka, Kanagawa (JP);
Yasunori Ohto, Kanagawa (JP)

(73) Assignee: Sony Corporation, Tokyo (JP)

( * ) Notice: Subject to any disclaimer, the term of this patent is extended or adjusted under 35 U.S.C. 154(b) by 782 days.

(21) Appl. No.: 12/671,598

(22) PCT Filed: Jul. 30, 2008

(86) PCT No.: PCT/JP2008/063650
§ 371 (c)(1),
(2), (4) Date: Feb. 25, 2010

(87) PCT Pub. No.: WO2009/017150
PCT Pub. Date: Feb. 5, 2009

(65) Prior Publication Data
US 2011/0223496 A1  Sep. 15, 2011

(30) Foreign Application Priority Data

Aug. 2, 2007   (JP) ................. 2007-202006
Aug. 22, 2007  (JP) ................. 2007-216397
Sep. 6, 2007   (JP) ................. 2007-231562
Sep. 12, 2007  (JP) ................. 2007-236647

(51) Int. Cl.
*H01M 2/38*     (2006.01)
*H01M 2/40*     (2006.01)
(Continued)

(52) U.S. Cl.
CPC ............. *H01M 8/188* (2013.01); *H01M 8/249* (2013.01); *Y02E 60/528* (2013.01);
(Continued)

(58) Field of Classification Search
None
See application file for complete search history.

(56) References Cited

U.S. PATENT DOCUMENTS 3,443,999 A * 5/1969 Yanagihara et al. .......... 429/447
3,511,712 A * 5/1970 Giner ............................ 429/410
(Continued)

FOREIGN PATENT DOCUMENTS

JP    48-54022       7/1973
JP    S59-191265    10/1984
(Continued)

OTHER PUBLICATIONS

Japanese Office Action issued Dec. 1, 2011, corresponding to Japanese Appln. No. 2007-231562.

(Continued)

*Primary Examiner* — Jeffrey Wollschlager
(74) *Attorney, Agent, or Firm* — K&L Gates LLP

(57) ABSTRACT

A fuel cell stack system is configured to uniformly supply a fuel or an electrolytic solution to each of fuel cell elements, and an electronic device using the fuel cell stack system are provided. An electrolytic solution channel allowing an electrolytic solution to flow therethrough is arranged between a fuel electrode and an oxygen electrode, and a fuel channel allowing a fuel to flow therethrough is arranged outside of the fuel electrode. The electrolytic solution channels and the fuel channels of all fuel cell elements are connected in series to one another. That is, the fuel or the electrolytic solution emitted from an outlet of the fuel channel or the electrolytic solution channel of one fuel cell element enters into an inlet of the fuel channel or the electrolytic solution channel of the next fuel cell element through a connection channel. In addition, either or both of the electrolytic solution channels and the fuel channels of some or all of the fuel cell elements may be connected in series to one another.

14 Claims, 41 Drawing Sheets

(51) Int. Cl.
*H01M 8/24* (2006.01)
*H01M 8/04* (2006.01)
*H01M 4/86* (2006.01)
*H01M 8/18* (2006.01)
*H01M 8/02* (2006.01)

(52) U.S. Cl.
CPC ...... *H01M 8/04753* (2013.01); *H01M 8/04559* (2013.01); *H01M 4/8605* (2013.01); *H01M 8/04589* (2013.01); *H01M 8/0258* (2013.01); *H01M 8/0482* (2013.01); *H01M 8/0247* (2013.01)
USPC ........... 429/456; 429/454; 429/455; 429/457; 429/462; 429/498; 429/512; 429/513; 429/514; 429/515; 429/529

(56) References Cited

U.S. PATENT DOCUMENTS

| | | | | |
|---|---|---|---|---|
| 4,038,458 | A | * | 7/1977 | Jacquelin ............ 429/404 |
| 4,377,445 | A | * | 3/1983 | Grimes ............ 205/343 |
| 4,732,822 | A | * | 3/1988 | Wright et al. ............ 429/451 |
| 5,419,979 | A | * | 5/1995 | Garshol et al. ............ 429/406 |
| 5,952,117 | A | * | 9/1999 | Colborn et al. ............ 429/404 |
| 6,110,334 | A | * | 8/2000 | Lohrberg ............ 204/256 |
| 6,641,948 | B1 | * | 11/2003 | Ohlsen et al. ............ 429/480 |
| 6,692,862 | B1 | * | 2/2004 | Zocchi ............ 429/50 |
| 6,911,274 | B1 | * | 6/2005 | Colborn et al. ............ 429/410 |
| 2003/0170524 | A1 | * | 9/2003 | Kordesch et al. ............ 429/34 |
| 2005/0072514 | A1 | * | 4/2005 | Yan et al. ............ 156/230 |
| 2007/0059575 | A1 | * | 3/2007 | Kan et al. ............ 429/30 |
| 2008/0070076 | A1 | | 3/2008 | Makita et al. | |

FOREIGN PATENT DOCUMENTS

| | | |
|---|---|---|
| JP | 59-188675 | 12/1984 |
| JP | 62-246265 | 10/1987 |
| JP | 1-292751 | 11/1989 |
| JP | 01-292751 | 11/1989 |
| JP | 4-306570 | 10/1992 |
| JP | 6-103998 | 4/1994 |
| JP | 06-103998 | 4/1994 |
| JP | 08-233778 | 9/1996 |
| JP | 11-3724 | 1/1999 |
| JP | 11-003724 | 1/1999 |
| JP | 11-016590 | 1/1999 |
| JP | 2002-110199 | 4/2002 |
| JP | 2003-515894 | 5/2003 |
| JP | 2003-272662 | 9/2003 |
| JP | 2004-058214 | 2/2004 |
| JP | 2004-079245 | 3/2004 |
| JP | 2004-281417 | 10/2004 |
| JP | 2004-317498 | 11/2004 |
| JP | 2004-349029 | 12/2004 |
| JP | 2005-071765 | 3/2005 |
| JP | 2005-156518 | 6/2005 |
| JP | 2005-251492 | 9/2005 |
| JP | 2006-164872 | 6/2006 |
| JP | 2006-172880 | 6/2006 |
| JP | 2006-236776 | 9/2006 |
| JP | 2007-144419 | 6/2007 |
| JP | 2008-300215 | 12/2008 |
| JP | 2009-524508 | 7/2009 |
| WO | 01/39307 | 5/2001 |
| WO | 2008/035667 | 3/2008 |

OTHER PUBLICATIONS

International Search Report dated Nov. 10, 2008, for corresponding Patent Application PCT/JP2008/063650.
Japanese Office Action issued Jul. 10, 2012, corresponding to Japanese Application No. 2007-216397.
Japanese Office Action issued Jul. 17, 2012, corresponding to Japanese Application No. 2007-236647.
Japanese Office Action issued Jul. 17, 2012, corresponding to Japanese Application No. 2007-202006.

\* cited by examiner

FUEL CELL STACK SYSTEM, CHANNEL STRUCTURE, FUEL CELL, ELECTRODE AND ELECTRONIC DEVICE

CROSS REFERENCE TO RELATED APPLICATIONS

The present application is a National Stage of International Application No. PCT/JP2008/063650 filed on Jul. 30, 2008 and which claims priority to Japanese Patent Application No. 2007-202006 filed on Aug. 2, 2007, Japanese Patent Application No. 2007-216397 filed on Aug. 22, 2007, Japanese Patent Application No. 2007-231562 filed on Sep. 6, 2007, and Japanese Patent Application No. 2007-236647 filed on Sep. 12, 2007, the entire contents of which are being incorporated herein by reference.

BACKGROUND

The present disclosure relates to a fuel cell stack system such as a direct methanol fuel cell (DMFC) directly supplying methanol to a fuel electrode to cause a reaction, a fuel cell, an electrode used in the fuel cell, and an electronic device using them. Moreover, the present invention relates to a channel structure allowing a fluid (a liquid or a gas) to flow therethrough, a fuel cell such as a DMFC using the channel structure, and an electronic device including them. Further, the present invention relates to a channel structure suitable for a micro TAS (Total Analysis System), a fuel cell or the like.

Indicators of characteristics of a battery include energy density and output density. The energy density is an amount of energy storage of the battery per unit mass, and the output density is an output amount of the battery per unit mass. Lithium-ion secondary batteries combine two characteristics of relatively high energy density and remarkably high output density, and also have high perfection, so it is widely adopted as power sources for mobile devices. However, in recent years, the mobile devices tend to consume more power with performance enhancement, thereby further improvements in energy density and output density of the lithium-ion secondary batteries are desired.

Solutions to such an issue include changing an electrode material forming a cathode and an anode, improving a method of applying an electrode material, improving a method of sealing an electrode material, and the like, and research aimed at improving the energy density of the lithium-ion secondary batteries has been conducted. However, a hurdle to practical use is still high. Moreover, unless constituent materials used for the lithium-ion secondary batteries are changed, it is difficult to expect a drastic improvement in the energy density.

Therefore, the development of batteries with higher energy density as an alternative to the lithium-ion secondary batteries is urgently necessary, and fuel cells are considered as a promising candidate.

The fuel cell has a configuration in which an electrolyte is arranged between an anode (a fuel electrode) and a cathode (an oxygen electrode), and a fuel, and air or oxygen are supplied to the fuel electrode and the oxygen electrode, respectively. As a result, an oxidation-reduction reaction in which the fuel is oxidized by oxygen occurs in the fuel electrode and the oxygen electrode, and a part of chemical energy of the fuel is converted into electrical energy to be extracted.

Various types of fuel cells have been already proposed or prototyped, and some of them have been already put to practical use. These fuel cells are classified into types, that is, an alkaline fuel cell (AFC), a phosphoric acid fuel cell (PAFC), a molten carbonate fuel cell (MCFC), a solid electrolyte fuel cell (SOFC), a polymer electrolyte fuel cell (PEFC) and the like according to electrolytes used in the fuel cells. The PEFC is operable at a lower temperature than other types, for example, a temperature of approximately 30° C. to 130° C.

As the fuel for the fuel cells, various flammable substances such as hydrogen and methanol may be used. However, a gas fuel such as hydrogen is necessary to be stored in a storage cylinder, so the gas fuel is not suitable to size reduction. On the other hand, a liquid fuel such as methanol is advantageous in terms of easy storage. Especially, the DMFC does not need a reformer for extracting hydrogen from the fuel, so the DMFC has advantages that its configuration is simplified and its size is easily reduced.

In the DMFC, methanol as the fuel is typically supplied to the fuel electrode as a high- or low-concentrated aqueous solution or as gaseous pure methanol, and methanol is oxidized to carbon dioxide in a catalyst layer of the fuel electrode. Protons produced at this time move to the oxygen electrode through an electrolyte film separating the fuel electrode and the oxygen electrode, and then react with oxygen in the oxygen electrode, thereby to generate water. Reactions occurring in the fuel electrode, the oxygen electrode and the whole DMFC are represented by Chemical Formula 1.

(Chemical Formula 1)
Fuel electrode: 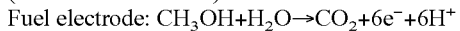
$CH_3OH + H_2O \rightarrow CO_2 + 6e^- + 6H^+$
Oxygen electrode: 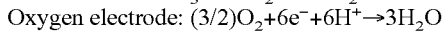
$(3/2)O_2 + 6e^- + 6H^+ \rightarrow 3H_2O$
The whole DMFC: 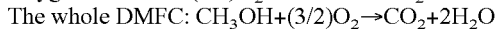
$CH_3OH + (3/2)O_2 \rightarrow CO_2 + 2H_2O$ The energy density of methanol as the fuel for the DMFC is theoretically 4.8 kW/L, which is 10 or more times larger than the energy density of a typical lithium-ion secondary battery. That is, the fuel cell using methanol as a fuel has a good chance of exceeding the energy density of the lithium-ion secondary battery. Therefore, among various fuel cells, the DMFC is the most likely to be used as an energy source for a mobile device, an electric vehicle or the like.

However, the DMFC has such an issue that even though its theoretical voltage is 1.23 V, its output voltage when actually generating electric power is reduced to approximately 0.6 V or less. A cause of a reduction in output voltage is a voltage drop caused by internal resistance of the DMFC, and the DMFC has internal resistance such as resistance accompanied with reactions occurring in both electrodes, resistance accompanied with movement of a substance, resistance generated when protons moves through the electrolyte film and further, contact resistance. Energy which is allowed to be actually extracted as electrical energy through oxidation of methanol is represented by a product of an output voltage during electric power generation and the quantity of electric power flowing through a circuit, so when the output voltage during electric power generation is reduced, the energy which is allowed to be actually extracted is reduced correspondingly. In addition, when the whole amount of methanol is oxidized in the fuel electrode according to Chemical Formula 1, the quantity of electric power which is allowed to be extracted to the circuit through oxidation of methanol is proportional to the amount of methanol in the DMFC.

Moreover, the DMFC has an issue of methanol crossover. Methanol crossover is a phenomenon in which methanol reaches the oxygen electrode side from the fuel electrode side through the electrolyte film due to two mechanisms of a phenomenon in which methanol diffusively moves by a difference in methanol concentration between the fuel electrode side and the oxygen electrode side and an electroosmotic phenomenon in which hydrated methanol is transported by the movement of water caused by the movement of protons.

When methanol crossover occurs, methanol having passed through the electrolyte film is oxidized in a catalyst layer of the oxygen electrode. Although an oxidation reaction of methanol on the oxygen electrode side is the same as the above-described oxidation reaction on the fuel electrode side, the oxidation reaction on the oxygen electrode side causes a reduction in the output voltage of the DMFC. Moreover, methanol is not used for electric power generation on the fuel electrode side, and is wasted on the oxygen electrode side, so the quantity of electric power which is allowed to be extracted to the circuit is reduced correspondingly. Further, the catalyst layer of the oxygen electrode is not a platinum (Pt)-ruthenium (Ru) alloy catalyst but a platinum (Pt) catalyst, so there is such an inconvenience that carbon monoxide (CO) is easily absorbed onto a surface of the catalyst to cause catalyst poisoning.

Thus, the DMFC has two issues of a reduction in voltage caused by internal resistance and methanol crossover and fuel waste caused by methanol crossover, and these issues cause a decline in electric power generation efficiency of the DMFC. Therefore, to improve the electric power generation efficiency of the DMFC, research and development aimed at improving characteristics of materials forming the DMFC, and research and development aimed at optimizing operating conditions of the DMFC have been intensely conducted.

The research aimed at improving the characteristics of the materials forming the DMFC includes research related to the electrolyte film and a catalyst on the fuel electrode side. As the electrolyte film, a polyperfluoroalkyl sulfonic acid-based resin film ("Nafion (a registered trademark)" manufactured by E. I. du Pont de Nemours and Company) is typically used; however, as an electrolyte film having higher proton conductivity and a higher ability to prevent methanol from passing through than the polyperfluoroalkyl sulfonic acid-based resin film, a fluoropolymer film, a hydrocarbon-based polymer electrolyte film or a hydrogel-based electrolyte film and the like have been studied. As the catalyst on the fuel electrode side, research and development of a catalyst having higher activity than a platinum (Pt)-ruthenium (Ru) alloy catalyst which is typically used at present have been conducted.

Such an improvement in the characteristics of the constituent materials of the fuel cell is appropriate as a means of improving the electric power generation efficiency of the fuel cell. However, at present, an optimum catalyst to solve the above-described two issues has not yet been found, and an optimum electrolyte film has not yet been found.

On the other hand, Japanese Unexamined Patent Application Publication No. S59-191265 discloses a fuel cell using a liquid electrolyte (an electrolytic solution) and not needing the electrolyte film. The electrolytic solution may remain stationary between the oxygen electrode and the fuel electrode, or the electrolytic solution may circulate by flowing through a channel arranged between the oxygen electrode and the fuel electrode to outside, and then going back to the channel.

However, when a fuel cell stack system in which a plurality of fuel cell elements are stacked in a vertical direction or a horizontal direction is considered as a fuel cell using an electrolytic solution, the fuel cell has issues that it is more difficult to manufacture the fuel cell than a fuel cell including a solid electrolyte film in related art, and it is difficult to stably generate electric power. It is because unlike the fuel cell using the solid electrolyte film in related art, it is necessary to supply two kinds of fluids, that is, a fuel and an electrolytic solution as a liquid electrolyte to the fuel cell using the electrolytic solution, and, further in the case where the fuel cell stack system is configured, unless two kinds of fluids are supplied substantially uniformly to each of the fuel cell elements, electric power is not stably generated.

Typically, in the case where a fluid flows through the fuel cell stack system, the fluid is sent to a main channel connected to all fuel cell elements so as to be supplied to each of the fuel cell elements through the channel. That is, the fluid is supplied by parallel connection. However, it is extremely difficult to supply the fluid uniformly to each of the fuel cell elements.

First, it is difficult to make the widths and heights of channels of the fuel cell elements 100% uniform. In addition to this, carbon dioxide or the like generated during electric power generation is released into the fluid as bubbles, thereby to disturb the flow of the fluid, so a pressure loss in each of the fuel cell elements is changed due to various factors, thereby a fuel cell in which the fluid easily flows and a fuel cell in which the fluid flows with difficulty are inevitably produced. Means to prevent such a situation and create an environment that the fluid easily flows include allowing a sufficient height of the channel, and the like, but needless to say, this means causes an increase in the thickness of the fuel cell stack system, thereby resulting in an increase in size.

Also, Japanese Unexamined Patent Application Publication No. 2006-164872 discloses that a fluid is supplied to each fuel cell element through an individual pump and a valve. However, in such a configuration in related art, when a fuel cell stack system including 30 fuel cell elements is assumed and two pumps are necessary per fuel cell, 60 pumps are necessary in total. Therefore, devices for supply such as pumps occupy a majority of the fuel cell stack system to cause an increase in size of the fuel cell stack system, so the configuration is extremely unrealistic.

Moreover, there is a common issue in a fuel cell needing an electrolyte film and a fuel cell not needing an electrolyte film in related art. For example, it is necessary to uniformly supply a fuel, an electrolytic solution, or oxygen, air or the like into the fuel cell, and when a flow rate distribution, a pressure distribution or a concentration distribution is locally generated in the fuel cell, the characteristics of the fuel cell is extremely unstable. Therefore, it is essential to design an optimum shape of a channel (microchannel) so as to uniformly supply a liquid or a gas supplied in the fuel cell as a whole.

As the shape of the channel of the fuel cell, there are a large number of kinds such as a serpentine (meandering) shape type as one kind of a serial channel in which an inlet 352A and an outlet 353A are connected by one channel 356A as illustrated in FIG. 41 and a grid type in which a grid-like channel 356B is arranged in a matrix form between the inlet 352A and the outlet 353A as illustrated in FIG. 42. However, the serpentine type channel shape has a major issue. It is because when a gas fuel such as hydrogen or oxygen flows through the channel, the pressure loss is small, but when a liquid fuel such as a methanol aqueous solution or an electrolytic solution such as a sulfuric acid flows through the channel, the pressure loss is pronouncedly increased to cause an increase in the power of a pump for flowing the fluid.

Moreover, in the serpentine type channel, the case where the concentration distribution of a reactive gas or a liquid tends to be generated in the channel and electric power is generated locally under a high utilization rate condition and a low utilization rate condition often occurs, thereby the case tends to become a cause of reductions in the performance and longevity of the fuel cell. That is, the concentration distribution or the like causes catalyst deterioration, thereby to reduce its performance not temporarily but permanently.

As a method of avoiding an increase in pressure loss and deterioration in performance, the introduction of a parallel channel is considered. In the parallel channel, as illustrated in FIG. 43, first, the fluid flows from the inlet 352A to a first main channel 352 to be supplied to a plurality of parallel channels 354 connected to the first main channel 352 at a right angle, and then the fluid joins into a second main channel 353 connected to the exit 353A. In such a parallel channel configuration, compared to the serpentine type as one kind of serial channel, the pressure loss is allowed to be significantly reduced.

However, in the channel configuration, it is extremely difficult to supply the fluid uniformly to the plurality of parallel channels 354. In particular, as illustrated in FIG. 43, in the case where the first main channel 352 and the second main channel 353 have the same widths or depths (heights) as those of the parallel channels 354, the fluid does not flow uniformly through the parallel channels 354.

To allow the fluid to flow through the parallel channels 354 as uniformly as possible, it is necessary to reduce the resistance of the first main channel 352 connected to the inlet 352A and the resistance of the second main channel 353 connected to the outlet 353A to the flow of the fluid to a minimum, and to form a channel configuration where the fluid flows more easily than the parallel channels 354. However, to do so, it is necessary to allow a sufficient height of the channel, so the thickness of a plate forming the channel is inevitably increased to 1 mm or over. As a result, the thickness of the whole fuel cell is increased, and the size of a stack configuration in which the fuel cells are stacked is also increased.

Further, in the fuel cell using the electrolytic solution, the fuel electrode and the oxygen electrode is constantly in contact with the fluid, so there is an issue that deterioration in the electrodes such as a crack or a hole is inevitable. The deterioration in the fuel electrode promotes fuel crossover, and the deterioration in the oxygen electrode causes leakage of the electrolytic solution. Such deterioration in the electrodes is fatal, and the characteristics of the fuel cell are pronouncedly deteriorated.

By the way, in related art, a fine channel formed on a glass substrate or a base such as a plastic film is used as an analyzer, a chemical reaction chip or a biochemistry chip or the like. As a method of connecting a fluid connector (tube) to such a channel, for example, as illustrated in FIG. 44, an extendable member 422 is arranged on an inlet-outlet 431 of a channel 420, and a gap 440 between the inlet-outlet 421 and a fluid connector 430 is filled with the extendable member 422. Moreover, Japanese Unexamined Patent Application Publication No. 2004-58214 discloses that a connection section having adhesion which is fixable to another device is arranged around an opening of a channel.

However, in these configurations in related art, a tube is connected in a direction perpendicular to a surface of the base, so a space in a vertical direction of the base is occupied by connection of the fluid connector, thereby the bases to which the fluid connectors are connected are not allowed to be stacked in parallel.

There is a method in which the thickness of the base and the thickness of the tube diameter of the fluid connector connected to the base are substantially equal to each other, and the fluid connector is connected to a side surface of the base with an adhesive or the like; however, in addition to needing care for adhesion, the fluid connector is not allowed to be connected to a substrate with a smaller thickness than the tube diameter (outside diameter) of the fluid connector.

SUMMARY

A first object is to provide a fuel cell stack system allowing a fuel or an electrolytic solution to be supplied uniformly to each fuel cell element with a simple configuration, and an electronic device using the fuel cell stack system.

A second object is to provide a channel structure allowing a fluid to flow uniformly through parallel channels, and a fuel cell using the channel structure, and an electronic device including them.

A third object is to provide a fuel cell allowed to prevent deterioration of a fuel electrode or an oxygen electrode, an electrode, and an electronic device using the electrode.

A fourth object is to provide a channel structure allowed to reduce a space for connection of a fluid connector.

A fuel cell stack system according to an embodiment includes a plurality of fuel cell elements, in which the plurality of fuel cell elements each include a fuel electrode and an oxygen electrode which are arranged so as to face each other, and a channel allowing at least an electrolytic solution to flow therethrough, and the channels of some or all of the plurality of fuel cell elements are connected in series to one another.

Here, "connected in series" means that an outlet of the fuel channel or the electrolytic solution channel of one fuel cell element is connected to an inlet of the fuel channel or the electrolytic solution channel of the next fuel cell element. In addition, "connected in parallel" means that there is a main channel connected to all of the fuel cell elements, and the main channel is divergently connected to an inlet of the fuel channel or the electrolytic solution channel of each fuel cell element.

In the fuel cell stack system of an embodiment, the channels of some or all of the plurality of fuel cell elements are connected in series to one another, so the number of supply auxiliaries such as pumps or valves is reduced, thereby the configuration is simplified. Moreover, influences such as non-uniformity of the flow of fluid through each of the fuel cell elements, a change in pressure loss, internal characteristics and the like are reduced, and the fuel or the electrolytic solution is uniformly supplied to each of the fuel cell elements. Therefore, stability of electric power supply is improved.

A first electronic device according to an embodiment includes a fuel cell stack system including a plurality of fuel cell elements, and the fuel cell stack system is configured of the above-described fuel cell stack system of the invention.

In the first electronic device of the embodiment, the fuel cell stack system according to the above-described embodiment allowing stable electric power generation is included, so even if the number of fuel cell elements is increased, stable electric power generation is allowed, and the first electronic device is allowed to respond to more functions and higher performance with an increase in electric power consumption.

A first channel structure according to the embodiment includes a first main channel connected to a main inlet for fluid; a second main channel connected to a main outlet for fluid; and two or more parallel channels arranged between the first main channel and the second main channel and each having an inlet connected to the first main channel and an outlet connected to the second main channel, in which one or more of the two or more parallel channels each include a region of which the sectional area is reduced at either or both of the inlet and the outlet.

In the first channel structure of the embodiment, a fluid enters from the main inlet to the first main channel, and then enters from the first main channel to the inlets of the parallel channels to flow through the parallel channels, and the fluid enters from the outlets of the parallel channels to the second main channel to exit from a main outlet. Here, the region of which the sectional area is reduced is arranged at either or both of the inlet and the outlet of one or more of the parallel channels, so the region becomes a barrier to the flow of the fluid, and the resistance of the first main channel or the second main channel to the flow is reduced to cause easy flow of the fluid, and uniformity of the flow of the fluid through the parallel channels is improved.

A first fuel cell of an embodiment including an electrolyte between a fuel electrode and an oxygen electrode includes: a fuel channel allowing a fluid including a fuel to flow therethrough on a side opposite to a side where the oxygen electrode is arranged of the fuel electrode, in which the fuel channel includes a first main channel connected to a main inlet for the fluid, a second main channel connected to a main outlet for the fluid; and two or more parallel channels arranged between the first main channel and the second main channel and each having an inlet connected to the first main channel and an outlet connected to the second main channel, and one or more of the two or more parallel channels each include a region of which the sectional area is reduced at either or both of the inlet and the outlet.

In the first fuel cell of the embodiment, the channel structure according to the above-described embodiment is included as the fuel channel, so the fluid including the fuel uniformly flows through the parallel channels. Therefore, when the number of parallel channels is increased, an output is increased with a linear relationship, and electric power characteristics are improved.

A second electronic device of the embodiment includes a fuel cell including an electrolyte between a fuel electrode and an oxygen electrode, and the fuel cell is configured of the above-described first fuel cell of the embodiment.

In the second electronic device according to the embodiment, the fuel cell of the embodiment with improved electric power generation characteristics is included, so the second electronic device is allowed to respond to more functions and higher performance with an increase in electric power consumption.

A second fuel cell according to the embodiment includes an electrolytic solution between a fuel electrode and an oxygen electrode, in which either or both of the fuel electrode and the oxygen electrode include a catalyst layer and a functional layer arranged on the catalyst layer and preventing direct contact between the catalyst layer and the electrolytic solution.

An electrode according to the embodiment is used as a fuel electrode or an oxygen electrode of a fuel cell including an electrolytic solution between the fuel electrode and the oxygen electrode, and includes a catalyst layer; and a functional layer arranged on the catalyst layer and preventing direct contact between the catalyst layer and the electrolytic solution.

A third electronic device according to the embodiment includes a fuel cell including an electrolytic solution between a fuel electrode and an oxygen electrode, and the fuel cell is configured of the above-described second fuel cell of the invention.

In the second fuel cell of the embodiment or the electrode of the embodiment, as the functional layer preventing direct contact between the catalyst layer and the electrolytic solution is arranged on the catalyst layer, the occurrence of deterioration such as a crack or a hole in the fuel electrode or the oxygen electrode is prevented. Therefore, fuel crossover due to deterioration of the fuel electrode, the leakage of the electrolytic solution due to the deterioration of the oxygen electrode, and the like is reduced, and stable characteristics are maintained, and long-time electric power generation is allowed.

In the third electronic device of the embodiment, the second fuel cell according to the above-described embodiment allowed to generate electric power for a long time is included, so the third electronic device is allowed to respond to more functions and higher performance with an increase in electric power consumption.

A second channel structure of the embodiment includes a channel for fluid formed in a base; and a fluid connector connected to the channel in a direction parallel to a main surface of the base. Here, "main surface of the base" is a flat surface in the case where the base is a thin plate made of glass, silicon (Si) or the like, but is not necessarily a flat surface, and, for example, in the case where the base is configured of a flexible film, the main surface may be a flat surface or a curved surface.

According to the fuel cell stack system of the embodiment, the channels of some or all of the plurality of fuel cell elements are connected in series to one another, so the number of supply arbitraries such as pumps or valves is allowed to be reduced, and the configuration is allowed to be simplified. Moreover, influences such as nonuniformity of the flow of fluid through each of the fuel cell elements, a change in pressure loss, and internal characteristics are allowed to be reduced, and the fuel or the electrolytic solution is allowed to be uniformly supplied to each of the fuel cell elements. Therefore, the stability of electric power generation is allowed to be improved, and the fuel cell stack system is suitable for a multifunctional high-performance electronic device consuming a large amount of electric power.

According to the first channel structure of the embodiment, the region of which the sectional area is reduced is arranged at either or both of the inlet and the outlet of one or more of two or more parallel channels, so the fluid is allowed to uniformly flow through the parallel channels. Therefore, when the channel structure is applied to a fuel channel of a fuel cell, or the like, the fluid including the fuel is allowed to uniformly flow through the parallel channels, and electric power characteristics are allowed to be improved, and the fuel channel is suitable for a multifunctional high-performance electronic device consuming a large amount of electric power.

According to the second fuel cell of the embodiment or the electrode of the embodiment, the functional layer preventing direct contact between the catalyst layer and the electrolytic solution is arranged on the catalyst layer, deterioration such as a crack or a hole in the fuel electrode or the oxygen electrode is preventable. Therefore, a decline in characteristics of the fuel cell is preventable, and long-time electric power generation is allowed, and they are suitable for a multifunctional high-performance electronic device consuming a large amount of electric power.

According to the second channel structure of the embodiment, the fluid connector is connected to the channel formed in the base in a direction parallel to the main surface of the base, so a space in a vertical direction of the base is not occupied by connection of the fluid connector. Therefore, a space for connection of the fluid connector is allowed to be reduced, and the bases where the fluid connector is connected are allowed to be stacked in parallel, thereby integration is allowed to be improved.

Additional features and advantages are described herein, and will be apparent from the following Detailed Description and the figures.

DETAILED DESCRIPTION

Embodiments will be described in detail below.

First Embodiment

Figure 1:
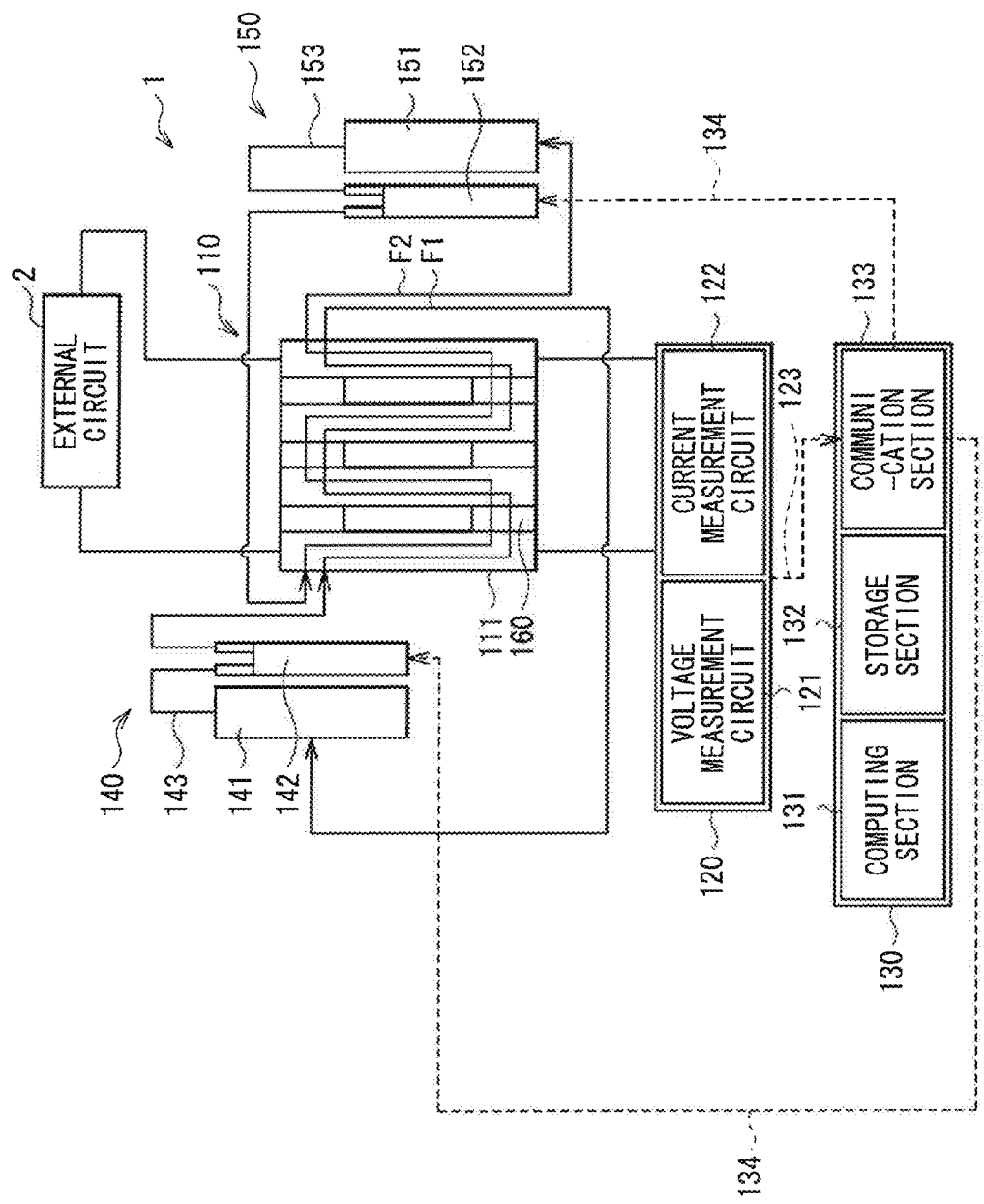
FIG. 1 is an illustration of a schematic configuration of an electronic device including a fuel cell stack system according to a first embodiment.

FIG. 1 illustrates a schematic configuration of an electronic device including a fuel cell stack system according to a first embodiment. The electronic device is a small- to large-sized device needing electric power, for example, a mobile device such as a cellular phone or a PDA (Personal Digital Assistant), a notebook PC (Personal Computer), a camera, or a vehicle, and the electronic device includes a fuel cell stack system 1 and an external circuit (load) 2 driven by electrical energy generated in the fuel cell stack system 1.

The fuel cell stack system 1 includes, for example, a fuel cell stack 110, a measurement section 120 measuring the operating state of the fuel cell stack 110, and a control section 130 determining operating conditions of the fuel cell stack 110 based on a measurement result by the measurement section 120. The fuel cell stack system 1 also includes, for example, an electrolyte supply section 140 supplying, for example, a sulfuric acid as an electrolytic solution F1 to the fuel cell stack 110, and a fuel supply section 140 supplying, for example, methanol as a fuel F2 to the fuel cell stack 110. When the electrolyte is supplied as a fluid in such a manner, an electrolyte film is not necessary, and electric power is allowed to be generated without influences of temperature and humidity, and compared to a typical fuel cell using the electrolyte film, ionic conductivity (proton conductivity) is allowed to be improved. Moreover, risks such as deterioration of the electrolyte film or a decline in proton conductivity caused by dryness of the electrolyte film are eliminated, and issues such as flooding and moisture control in an oxygen electrode are solvable.

Figure 2:
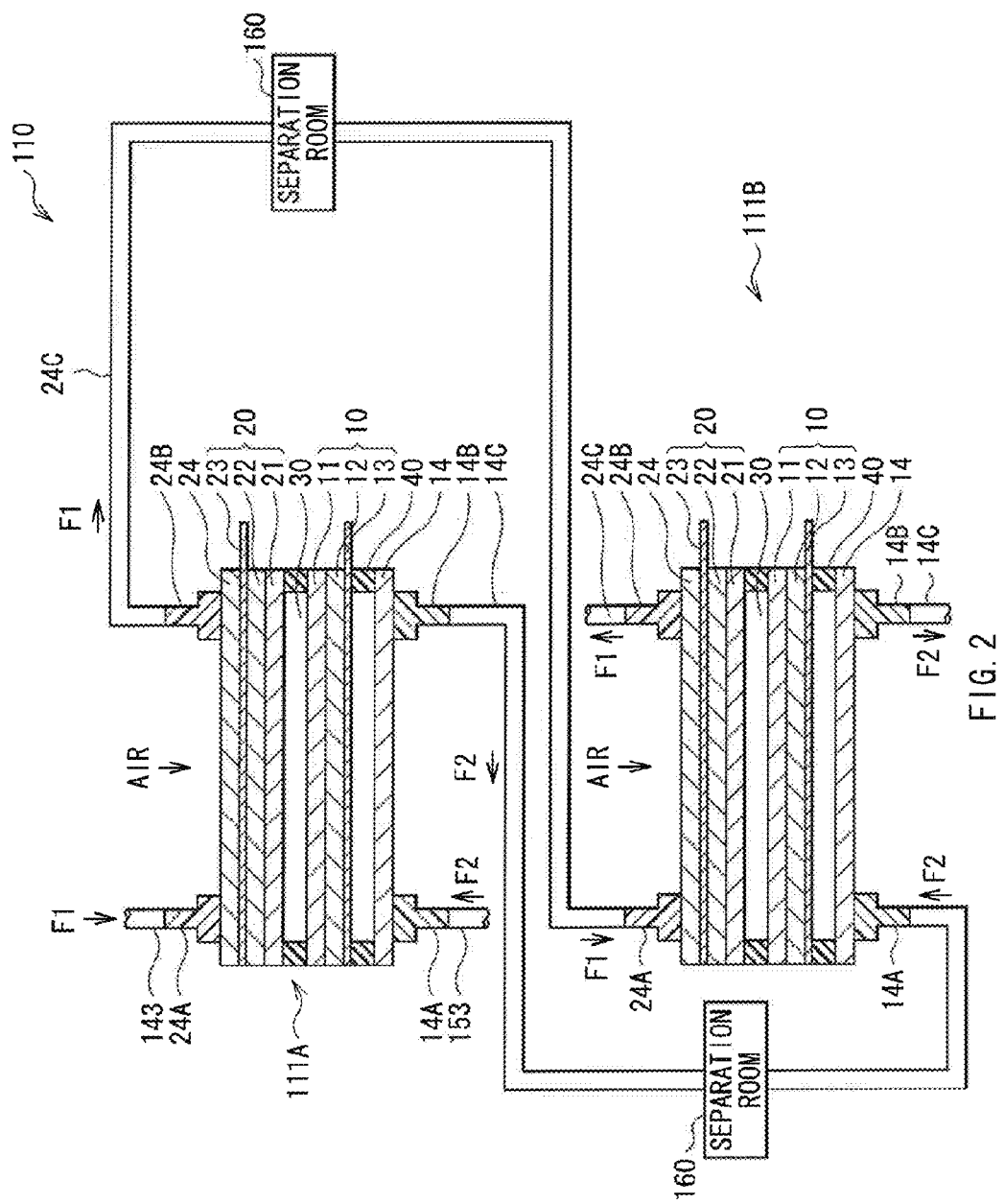
FIG. 2 is an illustration of configurations of two fuel cell elements in a fuel cell stack system illustrated in FIG. 1.

The fuel cell stack 110 is configured by stacking a plurality of (for example, four in FIG. 1) fuel cell elements 111 in a vertical direction (a stacking direction). FIG. 2 illustrates configurations of two fuel cell elements 111 (111A and 111B) of the fuel cell stack 110 illustrated in FIG. 1. The fuel cell elements 111 are so-called direct methanol flow based fuel cells (DMFFC), and each have a configuration in which a fuel electrode (anode) 10 and an oxygen electrode (cathode) 20 are arranged so as to face each other. An electrolytic solution channel 30 allowing the electrolytic solution F1 to flow therethrough is arranged between the fuel electrode 10 and the oxygen electrode 20. A fuel channel 40 allowing the fuel F2 to flow therethrough is arranged on the outside of the fuel electrode 10, that is, a side opposite to a side where the oxygen electrode 20 is arranged.

The fuel electrode 10 has a configuration in which a catalyst layer 11, a diffusion layer 12 and a current collector 13 are stacked in order from the oxygen electrode 2 side, and is contained in an external member 14. Moreover, the fuel electrode 10 also has a function as a separation film separating the electrolytic solution F1 and the fuel F2, and is allowed to prevent crossover so as to obtain high energy density. The oxygen electrode 20 has a configuration in which a catalyst layer 21, a diffusion layer 22 and a current collector 23 are stacked in order from the fuel electrode side, and is contained in an external member 24. In addition, air, that is, oxygen is supplied to the oxygen electrode 20 through the external member 24.

The catalyst layers 11 and 21 are made of, for example, a simple substance or an alloy of metal such as palladium (Pd), platinum (Pt), iridium (Ir), rhodium (Rh), ruthenium (Ru) or the like as a catalyst. Moreover, the catalyst layers 11 and 21 may include a proton conductor or a binder in addition to the catalyst. As the proton conductor, the above-described polyperfluoroalkyl sulfonic acid-based resin ("Nafion (a registered trademark)" manufactured by E. I. du Pont de Nemours and Company) or other resins having proton conductivity are cited. The binder is added to maintain the strength or flexibility of the catalyst layers 11 and 21, and as the binder, for example, a resin such as polytetrafluoroethylene (PTFE) or polyvinylidene fluoride (PVDF) is cited.

The diffusion layers 12 and 22 are configured of, for example, a carbon cloth, a carbon paper or a carbon sheet. The diffusion layers 12 and 22 are preferably subjected to water-repellent treatment by polytetrafluoroehylene (PTFE).

The current collectors 13 and 23 are configured of, for example, a titanium (Ti) mesh.

The external members 14 and 24 have, for example, a thickness of 2.0 mm, and are made of a commonly available material such as a titanium (Ti) plate or an acid-resistant metal plate, but the material is not specifically limited thereto. The external members 14 and 24 are preferably as thin a thickness as possible.

The electrolytic solution channel 30 and the fuel channel 40 are, for example, fine channels formed by processing a resin sheet, and are adhered to the fuel electrode 10. In addition, the number of the channels is not limited. The widths, heights and lengths of the channels are not specifically limited, but they are preferably small.

The electrolytic solution channels 30 and the fuel channels 40 of all of four fuel cell elements 111 are connected in series to one another. Thereby, in the fuel cell stack system 1, the fuel F2 or the electrolytic solution F1 is allowed to be uniformly supplied to each of the fuel cell elements 111 with a simple configuration.

More specifically, in each of the fuel cell elements 111, an electrolytic solution inlet 24A and an electrolytic solution outlet 24B are arranged in the external member 24. The electrolytic solution inlet 24A of a first fuel cell element 111A is connected to an electrolytic solution supply section 140 (not illustrated in FIG. 2, refer to FIG. 1), and the electrolytic solution outlet 24B is connected to the electrolytic solution inlet 24A of the next fuel cell element 111B through a connection channel 24C. Therefore, the electrolytic solution inlet 24A of the first fuel cell element 111 and the electrolytic solution outlet 24B of a last fuel cell element 111 are connected to the electrolytic solution supply section 140, and the electrolytic solution inlet 24A of each of other fuel cell elements 111 is connected to the electrolytic solution outlet 24B of a fuel cell element 111 previous thereto. Thereby, the electrolytic solution channels 30 of all fuel cell elements 111 are connected in series to one another, and the electrolytic solution F1 supplied from the electrolytic solution supply section 140 enters the electrolytic solution inlet 24A of the first fuel cell element 111A, and exits from the electrolytic solution outlet 24B of the first fuel cell element 111A to enter the electrolytic solution inlet 24A of the next fuel cell element 111B, and after the electrolytic solution F1 flows through all of the fuel cell elements 111 in the same manner, the electrolytic solution F1 exits from the electrolytic solution outlet 24B of the last fuel cell element 111 to return to the electrolytic solution supply section 140.

Moreover, in each of the fuel cell elements 111, a fuel inlet 14A and a fuel outlet 14B are arranged in the external member 14. The fuel inlet 14A of a first fuel cell element 111A is connected to the fuel supply section 150 (not illustrated in FIG. 2, refer to FIG. 1), and the fuel outlet 14B is connected to the fuel inlet 14A of the next fuel cell element 111B through a connection channel 14C. Therefore, the fuel inlet 14A of the first fuel cell element 111 and the fuel outlet 14B of a last fuel cell element 111 are connected to the fuel supply section 150, and the fuel inlet 14A of each of other fuel cell elements 111 is connected to the fuel outlet 14B of a fuel cell element 111 previous thereto. Thereby, the fuel channels 40 of all fuel cell elements 111 are connected in series to one another, and the fuel F2 supplied from the fuel supply section 150 enters the fuel inlet 14A of the first fuel cell element 111A, and exits from the fuel outlet 14B of the first fuel cell element 111A to enter the fuel inlet 14A of the next fuel cell element 111B, and after the fuel F2 flows through all of the fuel cell elements 111 in the same manner, the fuel F2 exits from the outlet 14B of the last fuel cell element 111 to return to the fuel supply section 150.

The fuel inlets 14A and the fuel outlets 14B, and the electrolytic solution inlets 24A and the electrolytic solution outlets 24B may be configured of, for example, joints made of a resin or channels formed by bonding a resin sheet having adhesion together. In the former case, the connection channels 14C and 24C may be configured of silicone tubes. In the latter case, the connection channels 14C and 24C may be configured of channels formed by bonding a resin sheet having adhesion together. In addition, the electrolytic solution inlets 24A and the electrolytic solution outlets 24B, and the fuel inlets 14A and the fuel outlets 14B are not necessarily formed in the external members 24 and 14, respectively, and may be arranged in only one of the external member 24A and the external member 14A. In this case, an internal channel configuration allows the electrolytic solution F1 and the fuel F2 to be distributed to the electrolytic solution channel 30 and the fuel channel 40, respectively.

A separation room is arranged in each of the connection channels 24C and 14C. As there is a possibility that a diffused fuel (methanol), carbon dioxide bubbles generated in the fuel electrode 10, or the like are contained in the electrolytic solution F1 emitted from the electrolytic solution outlet 24B, the separation room 160 arranged in the connection channel 24C removes such carbon dioxide or separates the fuel. As there is a possibility that carbon dioxide bubbles generated in the fuel electrode 10 or the like are contained in the fuel F2 emitted from the fuel outlet 14B, the separation room 160 arranged in the connection channel 14C removes carbon dioxide. A methanol separation mechanism is configured of, for example, a filter, or a mechanism removing methanol by burning, reacting or evaporating methanol. A mechanism removing carbon dioxide is configured of, for example, a mechanism removing carbon dioxide by a filter or reacting carbon dioxide. In addition, the separation room 160 is not necessarily arranged in each of the connection channels 24C and 14C, and may be arranged on a top surface, a bottom surface or a side surface of each of the fuel cell elements 111.

The plurality of fuel cell elements of the fuel cell stack 110 are electrically connected to one another in series or depending on specifications, in parallel. When electric power is repeatedly generated in the fuel cell stack 110, deterioration of the fuel cell elements 111 occurs. Moreover, the fuel cell elements 111 vary slightly in characteristics without exception, so a fuel cell element 111 which is easily deteriorated and a fuel cell element 111 which is resistant to deterioration are produced. Therefore, to continuously generate electric power in the fuel cell stack 110 even under such circumstances, the fuel cell stack 110 preferably has an electrical circuit configuration in which when the fuel cell element 111 which is not at all allowed to contribute to electric power generation due to deterioration is produced, the fuel cell stack 110 terminates electrical connection to the fuel cell element 111, and establishes direct connection to the next fuel cell element 111.

The measurement section 120 illustrated in FIG. 1 measures the operating voltage and the operating current of the fuel cell stack 110, and includes, for example, a voltage measurement circuit 121 measuring the operating voltage of the fuel cell stack 110 and a current measurement circuit 122 measuring the operating current, and a communication line 123 for transmitting an obtained measurement result to the control section 130.

The control section 130 illustrated in FIG. 1 controls an electrolyte supply parameter and a fuel supply parameter as the operating conditions of the fuel cell stack 110 based on the measurement result from the measurement section 120, and includes, for example, a computing section 131, a storage (memory) section 132, a communication section 133 and a communication line 134. Here, the electrolyte supply parameter contains, for example, the supply flow velocity of the electrolytic solution F1. The fuel supply parameter contains, for example, the supply flow velocity and the supply amount of the fuel F2, and may contain a supply concentration, if necessary. The control section 130 may be configured of, for example, a microcomputer.

The computing section 131 calculates the output of the fuel cell stack 110 from the measurement result obtained by the measurement section 120 so as to set the electrolyte supply parameter and the fuel supply parameter. More specifically, the computing section 131 calculates the averages of anode potentials, cathode potentials, output voltages and output currents sampled from various measurement results inputted into the storage section 132 at regular intervals to obtain an average anode potential, an average cathode potential, an average output voltage and an average output current, and then input them into the storage section 132, and intercompares various average values stored in the storage section 132 to determine the electrolyte supply parameter and the fuel supply parameter.

The storage section 132 stores various measurement values transmitted from the measurement section 120, various average values calculated by the computing section 131, and the like.

The communication section 133 has a function of receiving the measurement result from the measurement section 120 through the communication line 123 to input the measurement result to the storage section 132, and a function of outputting signals setting the electrolytic solution supply parameter and the fuel supply parameter to the electrolytic solution supply section 140 and the fuel supply section 150, respectively, through the communication line 134.

The electrolytic solution supply section 140 illustrated in FIG. 1 includes an electrolytic solution storage section 141, an electrolytic solution supply adjustment section 142 and an electrolytic solution supply line 143. The electrolytic solution storage section 141 stores the electrolytic solution F1, and is configured of, for example, a tank or a cartridge. The electrolytic solution supply adjustment section 142 adjusts the supply flow velocity of the electrolytic solution F1. The electrolytic solution supply adjustment section 142 may be configured of any component which is allowed to be driven by a signal from the control section 130, and is not specifically limited, but the electrolytic solution supply adjustment section 142 is preferably configured of, for example, a valve driven by a motor or a piezoelectric device or an electromagnetic pump.

The fuel supply section 150 illustrated in FIG. 1 includes a fuel storage section 151, a fuel supply adjustment section 152 and a fuel supply line 153. The fuel storage section 151 stores the fuel F2, and is configured of, for example, a tank or a cartridge. The fuel supply adjustment section 152 adjusts the supply flow velocity and the supply amount of the fuel F2. The fuel supply adjustment section 152 may be configured of any component which is allowed to be driven by a signal from the control section 130, and is not specifically limited, but the fuel supply adjustment section 152 is preferably configured of, for example, a valve driven by a motor or a piezoelectric device or an electromagnetic pump. In addition, the fuel supply section 150 may include a concentration adjustment section (not illustrated) adjusting the supply concentration of the fuel F2. The concentration adjustment section is allowed to be removed in the case where pure (99.9%) methanol is used as the fuel F2, thereby the size of the fuel supply section 150 is allowed to be further reduced.

The fuel cell stack system 1 is manufacturable by, for example, the following steps.

First, for example, an alloy including platinum (Pt) and ruthenium (Ru) at a predetermined ratio as the catalyst and a dispersion solution of a polyperfluoroalkyl sulfonic acid-based resin ("Nafion (a registered trademark)" manufactured by E. I. du Pont de Nemours and Company) are mixed at a predetermined ratio to form the catalyst layer 11 of the fuel electrode 10. The catalyst layer 11 is thermal compression bonded to the diffusion layer 12 made of the above-described material. Moreover, the current collector 13 made of the above-described material is thermal compression bonded with a hot-melt adhesive or a resin sheet having adhesion to form the fuel electrode 10.

Moreover, carbon-supported platinum as the catalyst and a dispersion solution of a polyperfluoroalkyl sulfonic acid-based resin ("Nafion (a registered trademark)" manufactured by E. I. du Pont de Nemours and Company) are mixed at a predetermined ratio to form the catalyst layer 21 of the oxygen electrode 20. The catalyst layer 21 is thermal compression bonded to the diffusion layer 22 made of the above-described material. Moreover, the current collector 23 made of the above-described material is thermal compression bonded with a hot-melt adhesive or a resin sheet having adhesion to form the oxygen electrode 20.

Next, a resin sheet having adhesion is prepared, and a channel is formed with the resin sheet to form the electrolytic solution channel 30 and the fuel channel 40, and the electrolytic solution channel 30 and the fuel channel 40 are thermal compression bonded to both sides of the fuel electrode 10.

Next, the external members 14 and 24 made of the above-described material are formed, and in the external member 14, the fuel inlet 14A and the fuel outlet 14B are arranged, and in the external member 24, the electrolytic solution inlet 24A and the electrolytic solution outlet 24B are arranged.

After that, the fuel electrode 10 and the oxygen electrode 20 are arranged so as to face each other so that the electrolytic solution channel 30 is arranged between the fuel electrode 10 and the oxygen electrode 20 and the fuel channel 40 is arranged outside, and the fuel electrode 10 and the oxygen electrode 20 are contained in the external members 14 and 24. Thereby, one fuel cell element illustrated in FIG. 2 is formed.

The plurality of fuel cell elements 111 are formed in the same manner, and are stacked in a vertical direction, and the electrolytic solution outlet 24B of one fuel cell element is connected to the electrolytic solution inlet 24A of the next fuel cell element 111 through the connection channel 24C, and the fuel outlet 14B of the one fuel cell element is connected to the fuel inlet 14A of the next fuel cell element 111 through the connection channel 14C. Moreover, the separation room 160 is connected to a midpoint of each of the connection channels 14C and 24C. Thereby, the fuel cell stack 110 is formed.

The fuel cell stack 110 is mounted in a system including the measurement section 120, the control section 130, the electrolytic solution supply section 140 and the fuel supply section 150 all having the above-described configurations, and the fuel inlet 14A of the first fuel cell element 111 and the fuel outlet 14B of the last fuel cell element 111 are connected to the fuel supply section 150 with the fuel supply line 153 configured of, for example, a silicone tube. Moreover, the electrolytic solution inlet 24A of the first fuel cell element 111 and the electrolytic solution outlet 24B of the last fuel cell element 111 are connected to the electrolytic solution supply section 140 with the electrolytic solution supply line 143 configured of, for example, a silicone tube. Thus, the fuel cell stack system 1 illustrated in FIG. 1 is completed.

In the fuel cell stack system 1, in each of the fuel cell elements 111, the fuel F2 is supplied to the fuel electrode 10 to produce protons and electrons by a reaction. The protons move to the oxygen electrode 20 through the electrolytic solution F1 to react with electrons and oxygen, thereby to produce water. Reactions occurring in the fuel electrode 10, the oxygen electrode 20 and the whole fuel cell elements 111 are represented by Chemical Formula 2. Thereby, a part of chemical energy of methanol as the fuel is converted into electrical energy, and a current is extracted from the fuel cell stack 110 to drive the external circuit 2.

(Chemical Formula 2)

Fuel electrode 10: $CH_3OH+H_2O \rightarrow CO_2+6e^-+6H^{3O}$

Oxygen electrode 20: $(3/2)O_2+6e^-+6H^+ \rightarrow 3H_2O$

Whole fuel cell elements 111: $CH_3OH+(3/2)O_2 \rightarrow CO_2+2H_2O$

During operating the fuel cell stack 110, the operating voltage and the operating current of the fuel cell stack 110 are measured by the measurement section 120, and the above-described electrolytic solution supply parameter and the above-described fuel supply parameter as operating conditions of the fuel cell stack 110 are controlled by the control section 130 according to measurement results. Measurement by the measurement section 120 and parameter control by the control section 130 are frequently repeated so as to optimize the supply states of the electrolytic solution F1 and the fuel F2 according to variations in characteristics of the fuel cell stack 110.

In this case, the electrolytic solution channels 30 and the fuel channels 40 of all of four fuel cell elements 111 are connected in series to one another. The electrolytic solution F1 supplied from the electrolytic solution supply section 140 enters the electrolytic solution inlet 24A of the first fuel cell element 111A, and exits from the electrolytic solution outlet 24B of the first fuel cell element 111A to enter the electrolytic solution inlet 24A of the next fuel cell element 111B, and after the electrolytic solution F1 flows through all of the fuel cell elements 111 in the same manner, the electrolytic solution F1 exits from the electrolytic solution outlet 24B of the last fuel cell element 111 to return to the electrolytic solution supply section 140. Moreover, the fuel F2 supplied from the fuel supply section 150 enters the fuel inlet 14A of the first fuel cell element 111A, and exit from the fuel outlet 14B of the first fuel cell element 111A to enter the fuel inlet 14A of the next fuel cell element 111B, and after the fuel F2 flows through all of the fuel cell elements 111 in the same manner, the fuel F2 exits from the fuel outlet 14B of the last fuel cell element 111 to return to the fuel supply section 150. Therefore, influences such as nonuniformity of the flow of the electrolytic solution F1 or the fuel F2 through each of the fuel cell elements 111, a change in pressure loss and internal characteristics are reduced, and the fuel F2 or the electrolytic solution F1 is uniformly supplied to each of the fuel cell elements 111. Therefore, the stability of electric power generation is improved.

Thus, in the embodiment, the electrolytic solution channels 30 and the fuel channels 40 of all of the plurality of fuel cell elements 111 are connected in series to one another, so the number of supply auxiliaries such as pumps or valves is reduced, thereby the configuration is allowed to be simplified. Moreover, influences such as nonuniformity of the flow of the electrolytic solution F1 or the fuel F2 through each of the fuel cell elements 111, a change in pressure loss and internal characteristics are reduced, so that the fuel F2 or the electrolytic solution F1 is allowed to be uniformly supplied to each of the fuel cell elements 111. Therefore, the stability of electric power generation is allowed to be improved, and the fuel cell stack system 1 is suitable for a multifunctional high-performance electronic device consuming a large amount of electric power.

Figure 3:
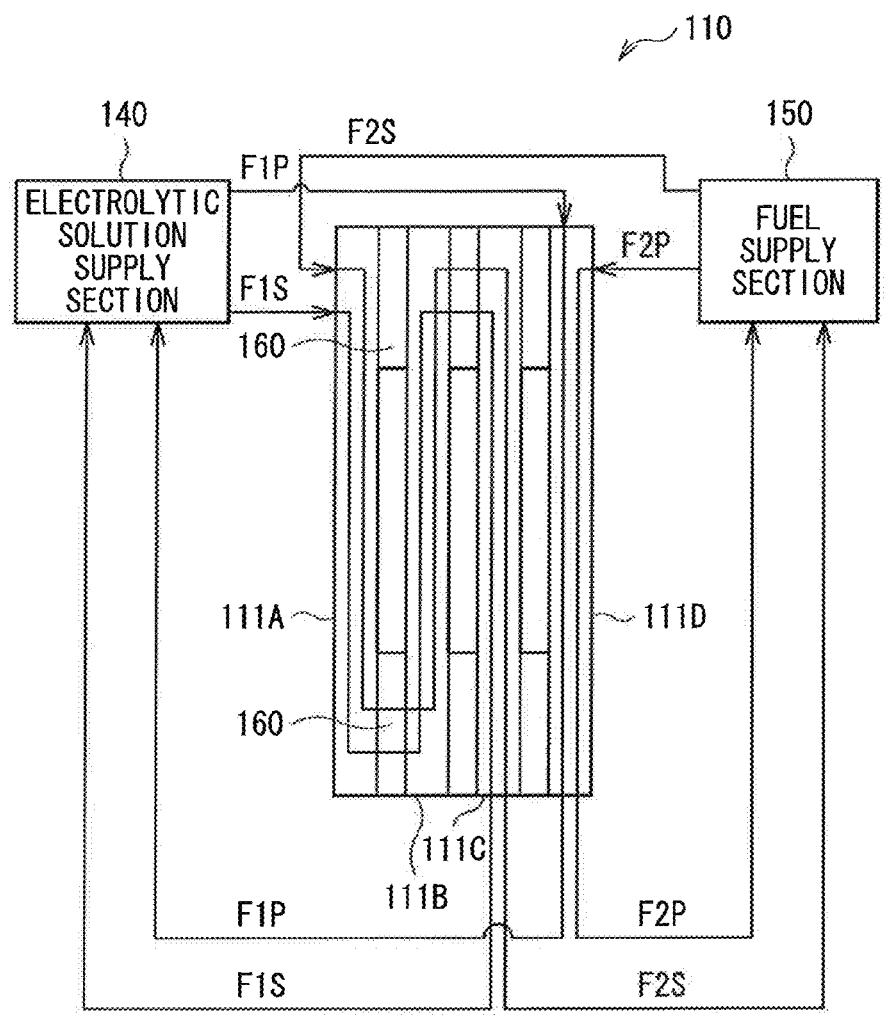
FIG. 3 is an illustration of another connection example of an electrolyte channel and a fuel channel.

In addition, in the above-described embodiment, the case where the electrolytic solution channels 30 and the fuel channels 40 of all of the plurality of fuel cell elements 111 are connected in series to one another is described; however, as illustrated in FIG. 3, the fuel channels 40 and the electrolytic solution channels 30 of some of the plurality of fuel cell elements 111, for example, fuel cell elements 111A, 111B and 111C may be connected in series to one another, and the fuel channel 40 and the electrolytic solution channel 30 of a fuel cell element 111D may be connected in parallel with them. In this case, a fuel F2S and an electrolytic solution F1S flow through the fuel cell elements 111A, 111B and 111C in series, and a fuel F2P and an electrolytic solution F1P flows through the fuel cell element 111D in parallel with the fuel F2S and the electrolytic solution F1S.

Figure 4:
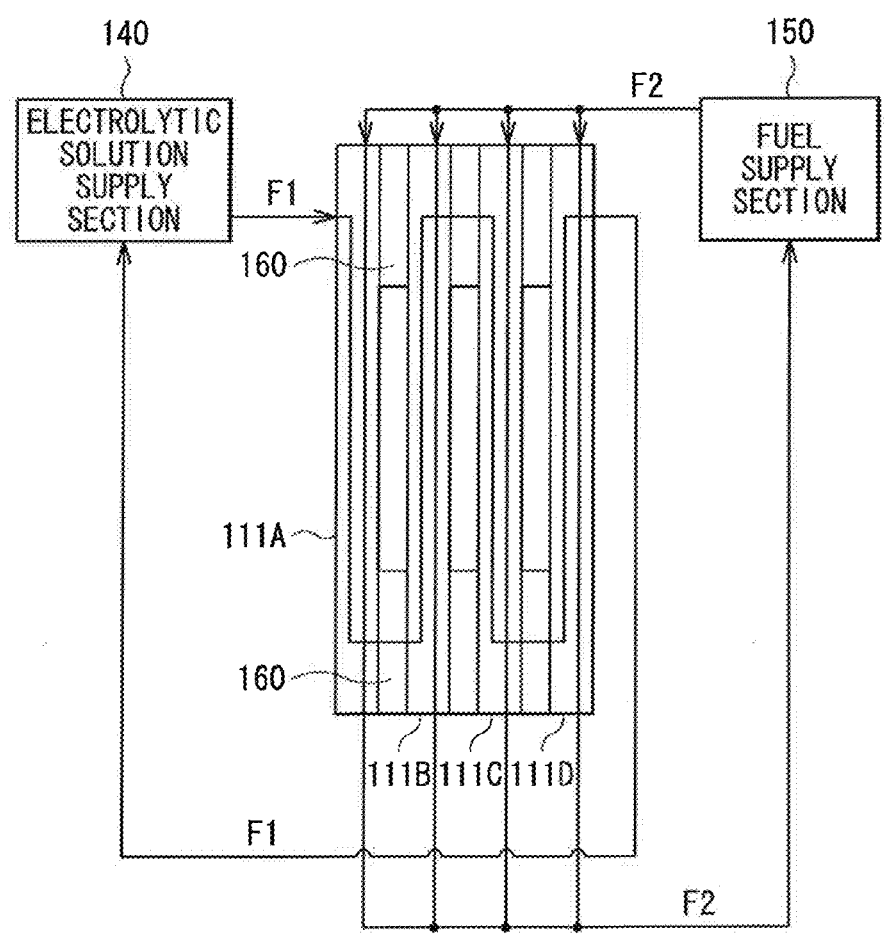
FIG. 4 is an illustration of still another connection example of the electrolyte channel and the fuel channel.
Figure 5:
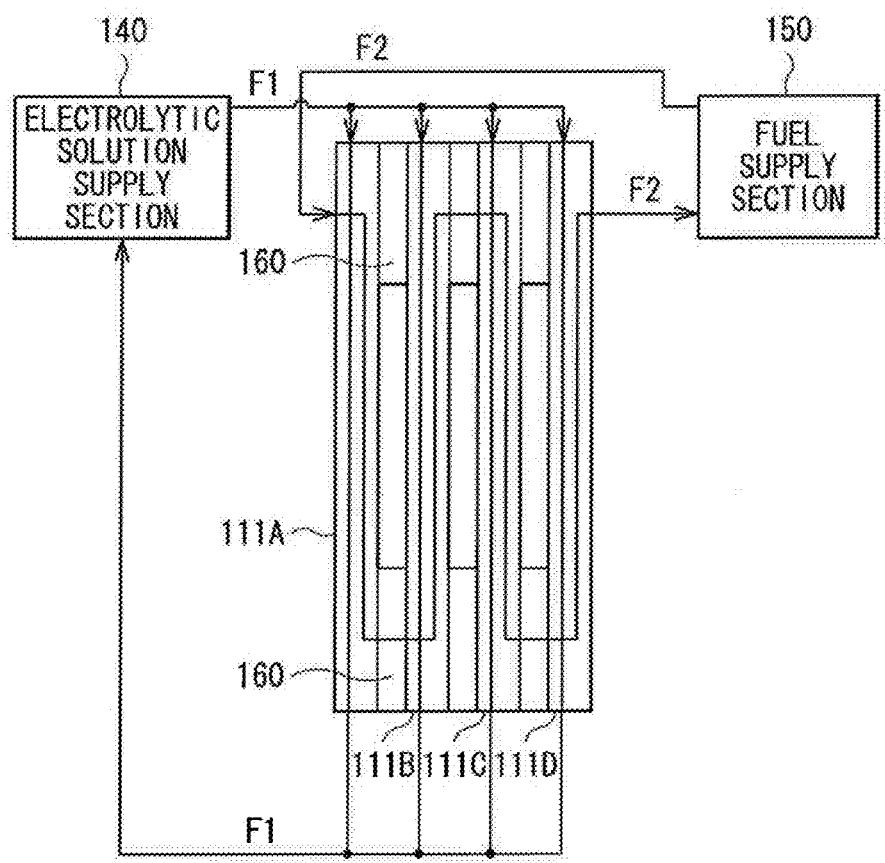
FIG. 5 is an illustration of a further connection example of the electrolyte channel and the fuel channel.

Moreover, as illustrated in FIGS. 4 and 5, one of the electrolytic solution channels 30 and the fuel channels 40 of all of the plurality of fuel cell elements 11 may be connected in series to one another. In addition, FIG. 4 illustrates the case where the electrolytic solution channels 30 of all of the plurality of fuel cell elements 111 are connected in series to one another, and FIG. 5 illustrates the case where the fuel channels 40 of all of the plurality of fuel cell elements 111 are connected in series to one another.

Figure 6:
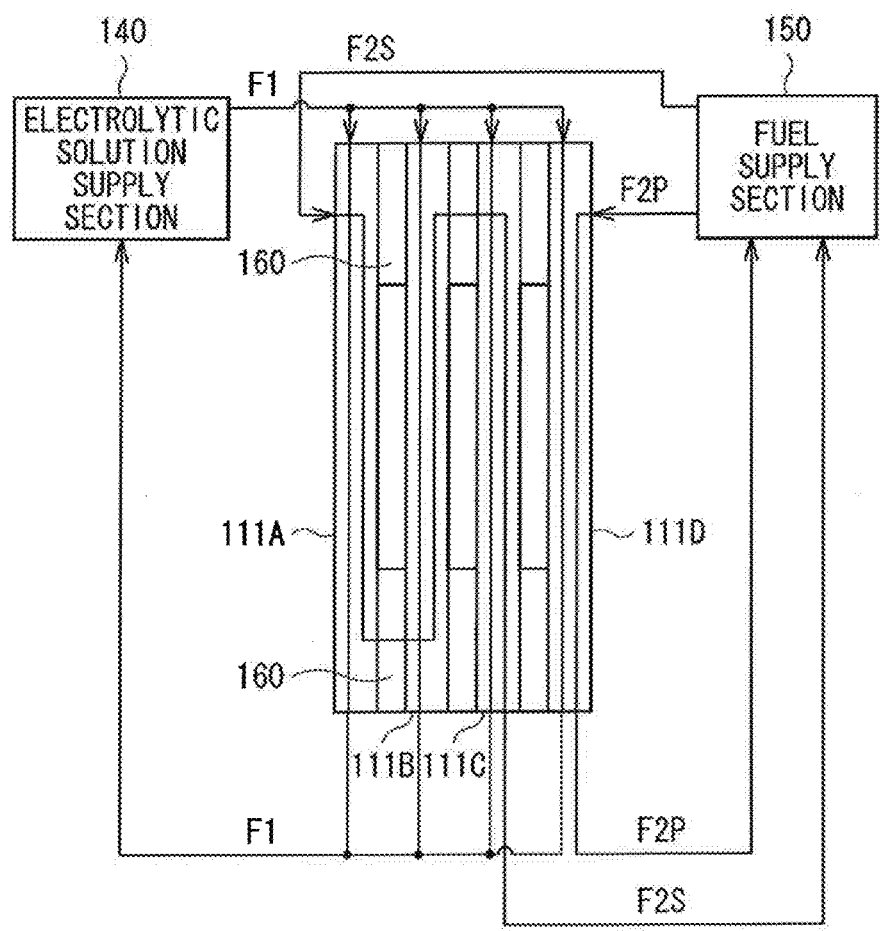
FIG. 6 is an illustration of a still further connection example of the electrolyte channel and the fuel channel.

Further, as illustrated in FIG. 6, the fuel channels 40 of some of the plurality of fuel cell elements 111, for example, the fuel cell elements 111A, 111B and 111C may be connected in series to one another, and the electrolytic solution channels 30 of all of the plurality of fuel cell elements 111 may be connected in parallel to one another. In this case, the fuel F2S flows through the fuel cell elements 111A, 111B and 111C in series, and the fuel F2P flows through the fuel cell element 111D in parallel with the fuel F2S.

Figure 7:
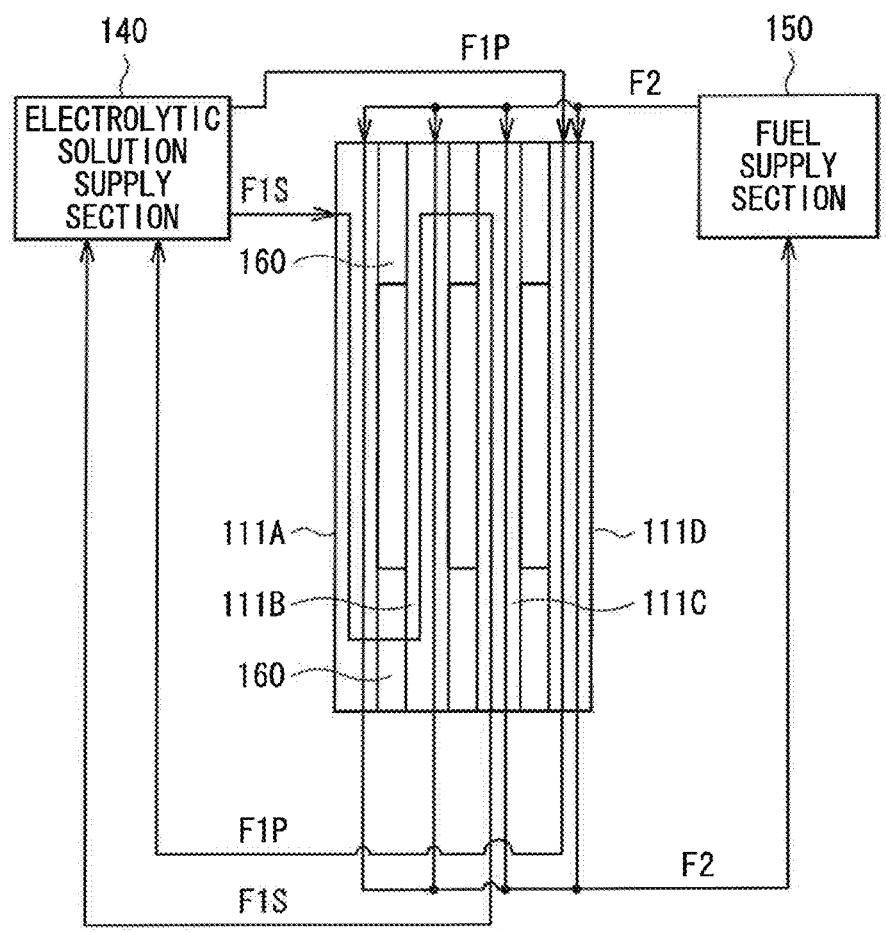
FIG. 7 is an illustration of a still connection example of the electrolyte channel and the fuel channel.

In addition, as illustrated in FIG. 7, the fuel channels 40 of all of the plurality of fuel cell elements 111 may be connected in parallel to one another, and the electrolytic solution channels 30 of some of the plurality of fuel cell elements 111, for example, the fuel cell elements 111A, 111B and 111C may be connected in series to one another and the electrolytic solution channel 30 of the fuel cell element 111D may be connected in parallel to them. In this case, the electrolytic solution F1S flows through the fuel cell elements 111A, 111B and 111C in series, and the electrolytic solution F1P flows through the fuel cell element 111D in parallel with the electrolytic solution F1S.

In modification examples illustrated in FIGS. 3 to 7, the number of parts where the electrolytic solution channels 30 and the fuel channels 40 are connected in series is preferably increased to a maximum possible value. It is because the configuration is allowed to be further simplified, and the stability of electric power generation is allowed to be further improved.

Second Embodiment

Figure 8:
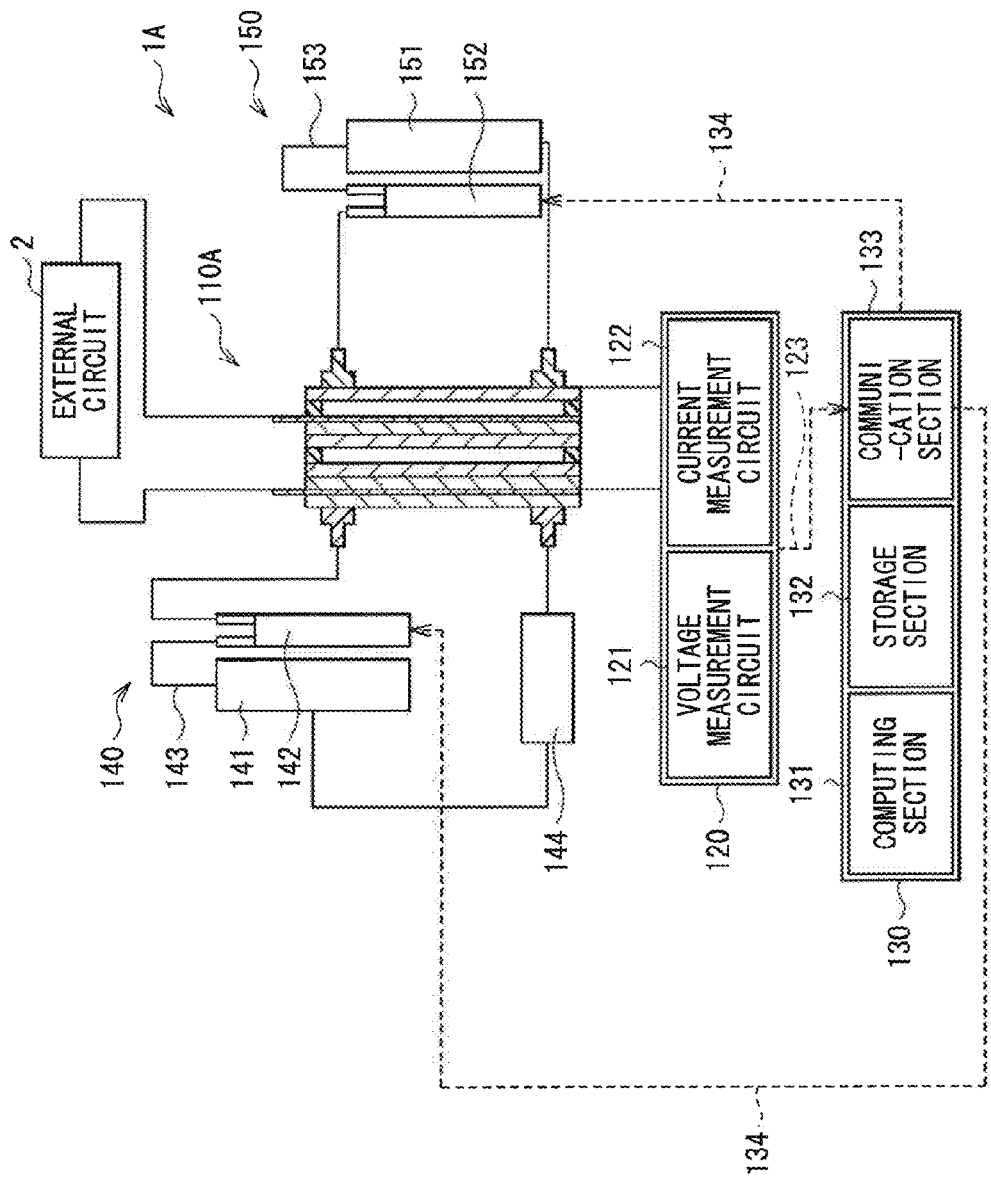
FIG. 8 is an illustration of a schematic configuration of an electronic device including a fuel cell system according to a second embodiment.

FIG. 8 illustrates a schematic configuration of an electronic device including a fuel cell system according to a second embodiment. The electronic device has many commonalities with the electronic device according to the above-described first embodiment, so like components will be defined as such, and not be further described in detail.

The electronic device is, for example, a mobile device such as a cellular phone or a PDA, or a notebook PC, and includes a fuel cell system 1A and the external circuit (load) 2 which is driven by electrical energy generated in the fuel cell system 1A.

The fuel cell system 1A has the same configuration as that of the fuel cell stack system 1 of the first embodiment, except that, for example, instead of the fuel cell stack 110, a fuel cell 110A configured of one fuel cell element is included. That is, the fuel cell system 1A includes the fuel cell 110A, the measurement section 120, the control section 130, the electrolytic solution supply section 140 and the fuel supply section 150.

The measurement section 120, the control section 130 and the fuel supply section 150 are formed as in the case of the first embodiment. The electrolytic solution supply section 140 includes the electrolytic solution storage section 141, the electrolytic solution supply adjustment section 142, the electrolytic solution supply line 143 and a separation room 144, and allows the electrolytic solution F1 to circulate between the fuel cell 110A and the electrolytic solution supply section 140. The electrolytic solution storage section 141, the electrolytic solution supply adjustment section 142 and the electrolytic solution supply line 143 are the same as those in the first embodiment. The separation room 144 is configured as in the case of the separation room 160 of the first embodiment.

Figure 9:
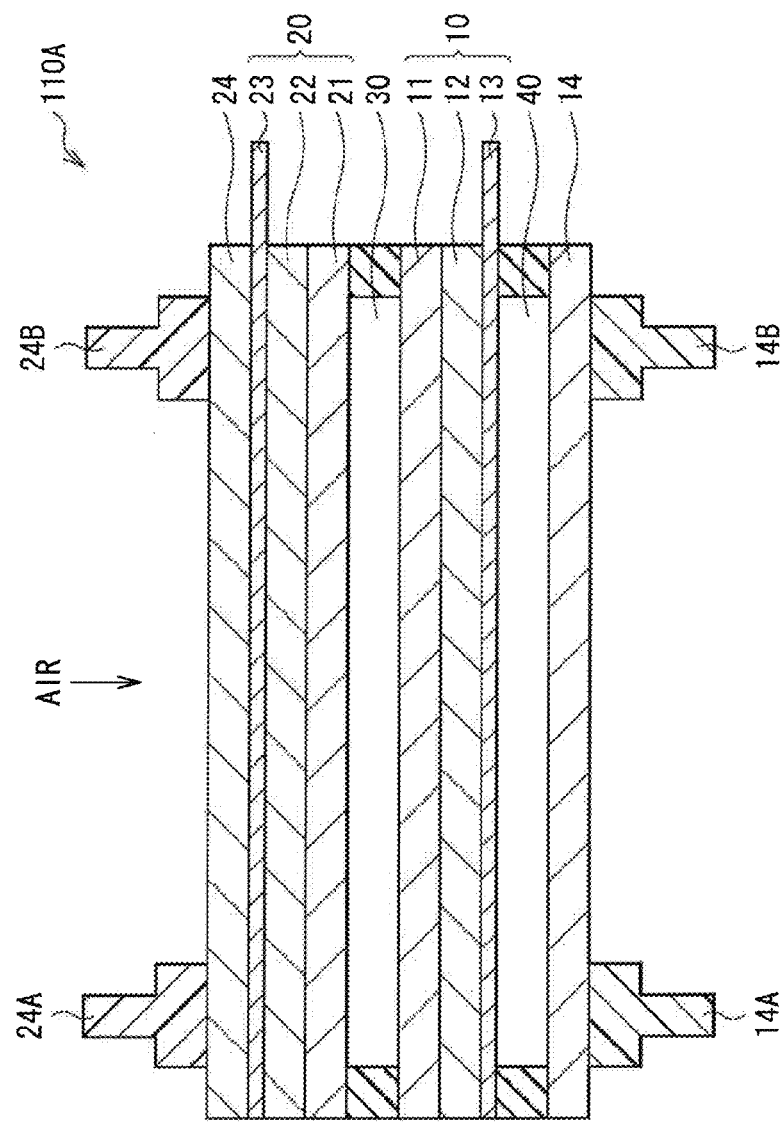
FIG. 9 is a sectional view illustrating a configuration of a fuel cell illustrated in FIG. 8.

FIG. 9 illustrates a configuration of the fuel cell 110A illustrated in FIG. 8. The fuel cell 110A includes the electrolytic solution channel 30, which allows the electrolytic solution F1 to flow therethrough, between the fuel electrode 10 and the oxygen electrode 20 as in the case of the fuel cell element 111 of the first embodiment. The fuel channel 40 allowing the fuel F2 to flow therethrough is arranged on the outside of the fuel electrode 10, that is, on a side opposite to a side where the oxygen electrode 20 is arranged.

The fuel electrode 10 and the oxygen electrode 20 are configured as in the case of the first embodiment.

Figure 10:
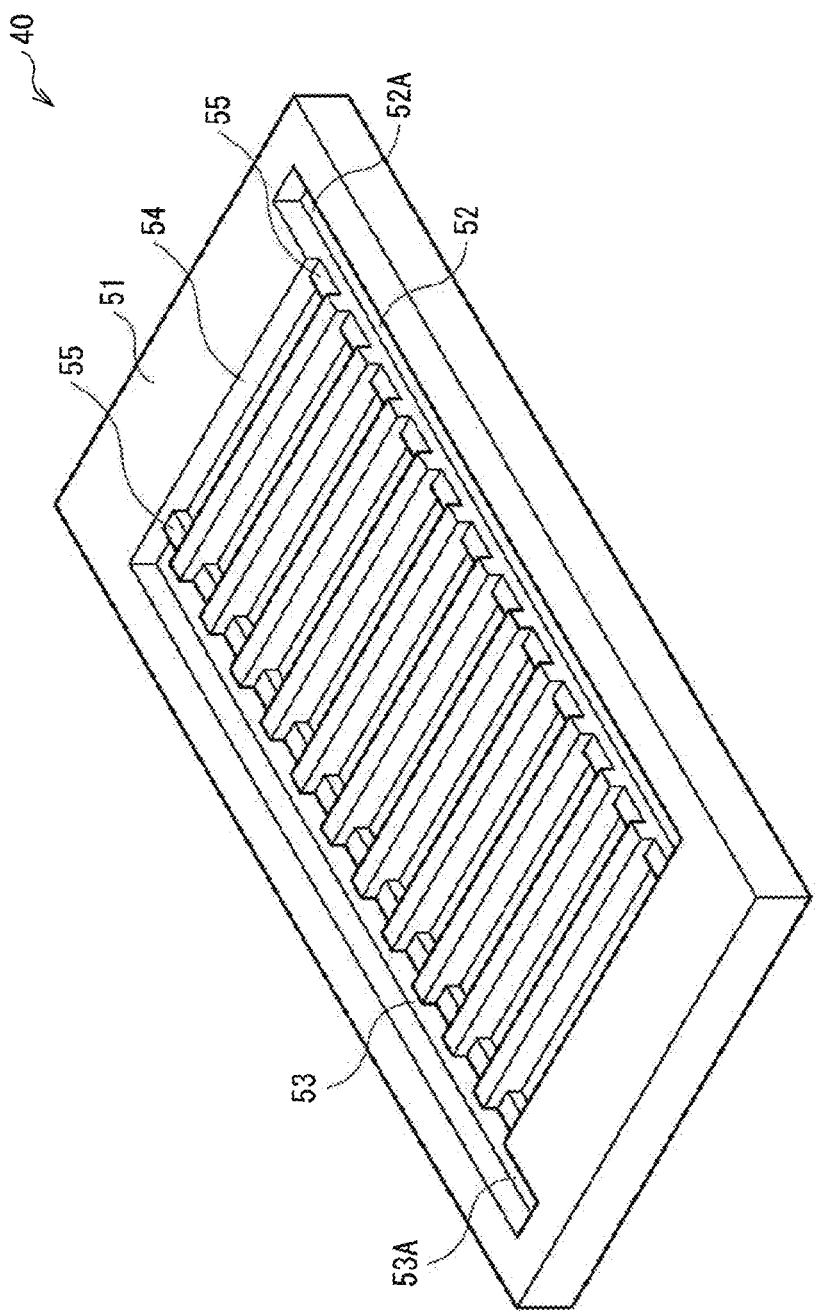
FIG. 10 is a perspective view illustrating an outer appearance of a fuel channel illustrated in FIG. 9.

FIG. 10 illustrates an outer appearance of the fuel channel 40. The fuel channel 40 is a channel structure in which a plurality of (in FIG. 10, for example, 12) parallel channels 54 are arranged between a first main channel 52 connected to a main inlet 52A for the fuel F2 and a second main channel 53 connected to a main outlet 53A for the fuel F2 in a substrate 51, and is bonded to the fuel electrode 10.

The substrate 51 has, for example, a thickness of 100 μm or less, and is made of metal, glass, carbon, a resin, a porous material, silicon (Si) or a silicon (Si)-based material, or ceramic. The shape of the substrate 51 may be a plate or an adhesive or non-adhesive film. Moreover, the substrate 51 may be configured of one plate or film, or a plurality of plates or films bonded together. In the latter case, to reliably bond the plurality of plates or films together, plates or films made of a common material are preferably bonded together, but plates or films made of different materials may be bonded together.

FIG. 11(A) illustrates a configuration of the fuel channel 40 when viewed from a side where the first main channel 52, the second main channel 53 and the parallel channels 54 are arranged, and FIG. 11(B) illustrates a sectional configuration taken along a line XIB-XIB of FIG. 11(A). The first main channel 52 and the second main channel 53 are formed as grooves parallel to each other, and the widths and the heights (depths) of them are equal to each other. The widths and the heights of the first main channel 52 and the second main channel 53 are not specifically limited, but the heights and the widths are preferably small, for example, 500 μm or less and 10 mm or less, respectively. The first main channel 52 is connected to the fuel inlet 14A (not illustrated in FIG. 10, refer to FIG. 9) through the main inlet 52A. The second main channel 53 is connected to the fuel outlet 14B (not illustrated in FIG. 10, refer to FIG. 9) through the main outlet 54A.

The inlet 54A and the outlet 54B of each of the plurality of parallel channel 54 is connected to the first main channel 52 and the second main channel 53 at a right angle, respectively, and the parallel channels 54 are formed as grooves parallel to one another. Moreover, the plurality of parallel channels 54 each have the same width and the same height (depth) as those of the first main channel 52 and the second main channel 53. That is, the sectional areas of the first main channel 52 and the second main channel 53 are equal to the sectional areas of the parallel channels 54.

Moreover, the plurality of parallel channels 54 each have a region of which the sectional area is reduced by arranging a rib 55 at each of the inlet 54A and the outlet 54B. Thereby, in the fuel channel 40, the fuel F2 is allowed to uniformly flow through the parallel channels 54.

The rib 55 has a function as a barrier to the flow of the fuel F2. That is, when the rib 55 is arranged, even if the substrate 51 is thinner and the sectional areas of the first main channel 52 and the second main channel 53 are equal to the sectional areas of the parallel channels 54, the resistance of the first main channel 52 and the second main channel 53 to the flow is reduced, and on the other hand, the uniformity of the flow through the parallel channels 54 is allowed to be improved. Therefore, the thickness and the size of the fuel cell 110A or a fuel cell stack formed by stacking the fuel cells 110A are allowed to be remarkably reduced.

For example, as illustrated in FIG. 11(C), the rib 55 blocks a lower part of the parallel channel 54. The height H1 of the rib 55 is dependent on the height H0 of the parallel channel 54, and is, for example, within a range of 1% to 99.9% of the height H0 of the parallel channel 54. As the height H1 of the rib 55 is increased, the resistance of the first main channel 52 and the second main channel 53 to the flow is reduced, thereby to allow the fuel F2 to easily flow through the first main channel 52 and the second main channel 53, and the uniformity of the flow of the fuel F2 through the parallel channels 54 is allowed to be improved. The thickness T1 of the rib 55 depends on application, and is, for example, within a range of approximately 0.5 mm to 1 mm.

Such a fuel channel 40 is connected to the fuel supply section 150 (not illustrated in FIG. 9, refer to FIG. 8) through the fuel inlet 14A and the fuel outlet 14B arranged in the external member 14, and the fuel F2 is supplied from the fuel supply section 150 to the fuel channel 40.

Figure 12:
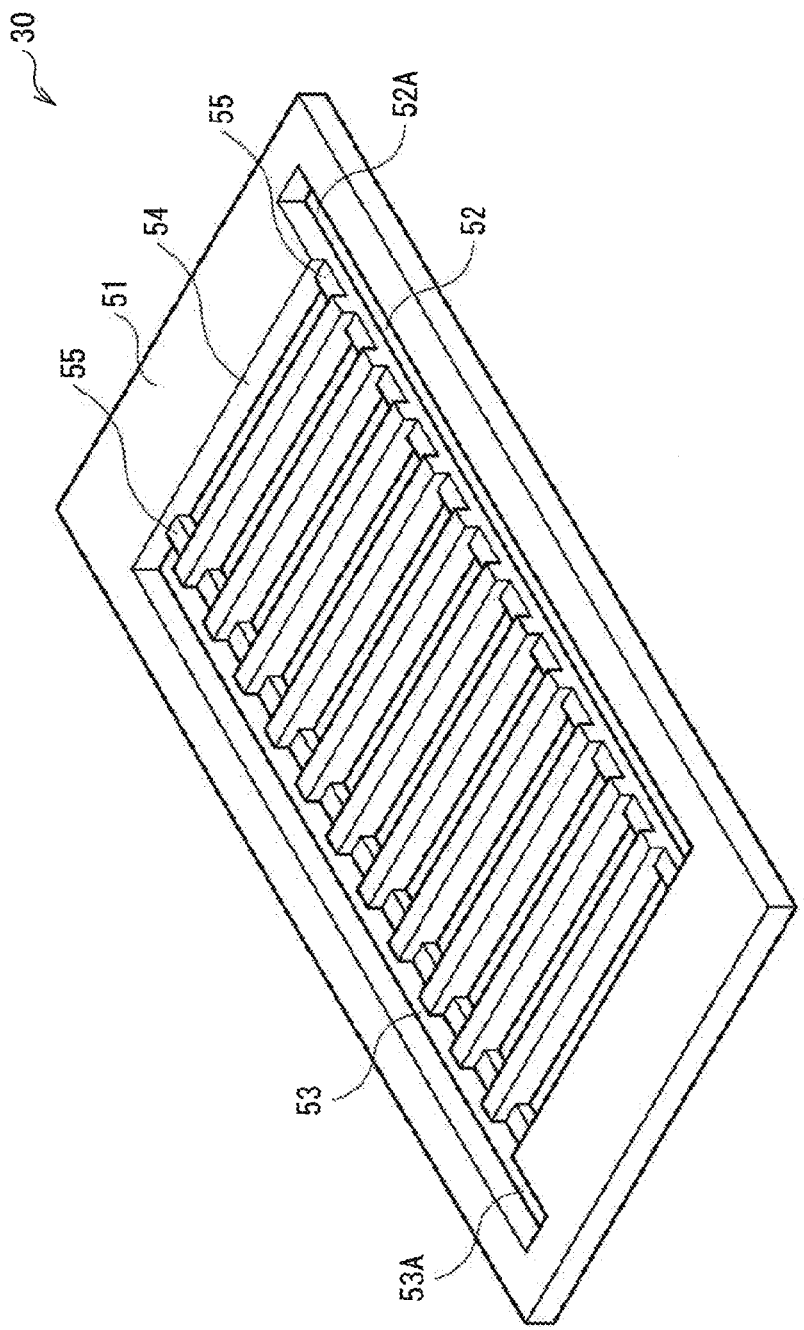
FIG. 12 is a perspective view illustrating an outer appearance of an electrolytic solution channel illustrated in FIG. 9.

FIG. 12 illustrates an outer appearance of the electrolytic solution channel 30. Moreover, FIG. 13(A) illustrates a configuration of the electrolytic solution channel 30 when viewed from a side where the first main channel 52, the second main channel 53 and the parallel channels 54 are arranged, and FIG. 13(B) illustrates a sectional configuration taken along a line VIB-VIB of FIG. 13(A), and FIG. 13(C) illustrates a sectional configuration of the rib 55 in one parallel channel 54. As in the case of the fuel channel 40, the electrolytic solution channel 30 is a channel structure in which a plurality of (in FIG. 10, for example, 12) parallel channels 54 are arranged between the first main channel 52 connected to the main inlet 52A for the electrolytic solution F1 and the second main channel 53 connected to the main outlet 53A for the electrolytic solution F1 in the substrate 51. Therefore, like components will be described using like numerals.

The substrate 51 is configured as in the case of the fuel channel 40.

The first main channel 52, the second main channel 53 and the parallel channels 54 allow the electrolytic solution F1 to come into contact with both of the fuel electrode 10 and the oxygen electrode 20 (refer to FIG. 9), so they are configured as in the case of the fuel channel 40, except that they are formed so as to penetrate through the substrate 51. Moreover, as in the case of the fuel channel 40, the sectional areas of the first main channel 52 and the second main channel 53 are equal to the sectional areas of the parallel channels 54.

As in the case of the fuel channel 40, the plurality of parallel channels 54 each have a region of which the sectional area is reduced by arranging the rib 55 at each of the inlet 54A and the outlet 54B. As in the case of the fuel channel 40, the height H1 of the rib 55 is dependent on the height H0 of the parallel channel 54, and is, for example, within a range of 1% to 99.9% of the height H0 of the parallel channel 54. As the height H1 of the rib 55 is increased, the resistance of the first main channel 52 and the second main channel 53 to the flow is reduced, thereby to allow the fuel F1 to easily flow through the first main channel 52 and the second main channel 53, and the uniformity of the flow of the fuel F1 through the parallel channels 54 is allowed to be improved.

Such an electrolytic solution channel 30 is connected to the electrolytic solution supply section 140 (not illustrated in FIG. 9, refer to FIG. 8) through the electrolytic solution inlet 24A and the electrolytic solution outlet 24B arranged in the external member 24, and the electrolytic solution F1 is supplied from the electrolytic solution supply section 140 to the electrolytic solution channel 30.

The fuel cell system 1A is manufacturable by, for example, the following steps. [0119] First, as in the case of the first embodiment, the fuel electrode 10 and the oxygen electrode 20 are formed.

Figure 11:
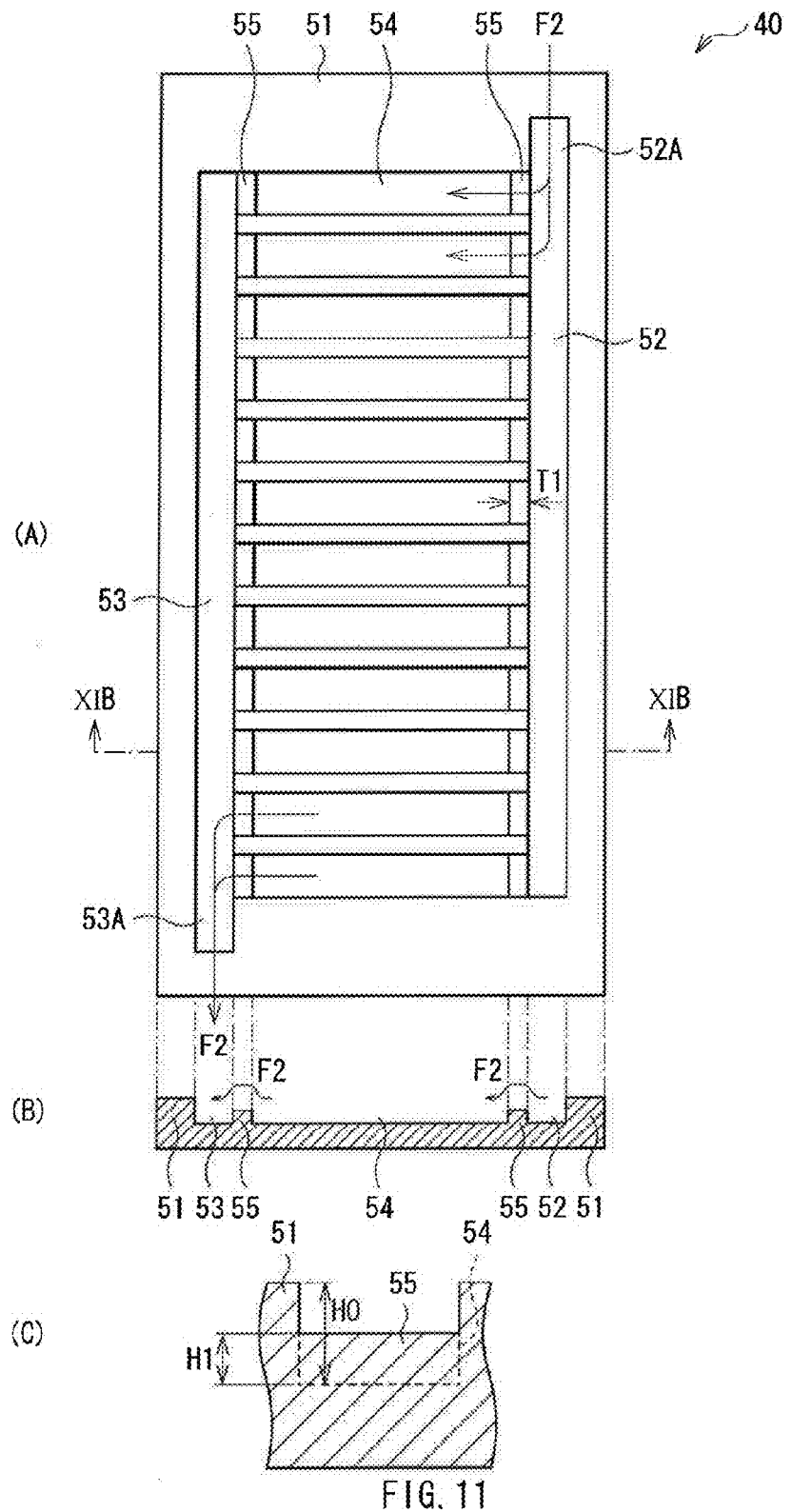
FIG. 11(A) is a plan view illustrating a configuration of the fuel channel illustrated in FIG. 10 when viewed from a side where a first main channel, a second main channel and parallel channels are arranged.
FIG. 11(B) is a sectional view taken along a line XIB-XIB of FIG. 11(A)
FIG. 11(C) is a sectional view illustrating a configuration of a rib in one parallel channel.
Figure 13:
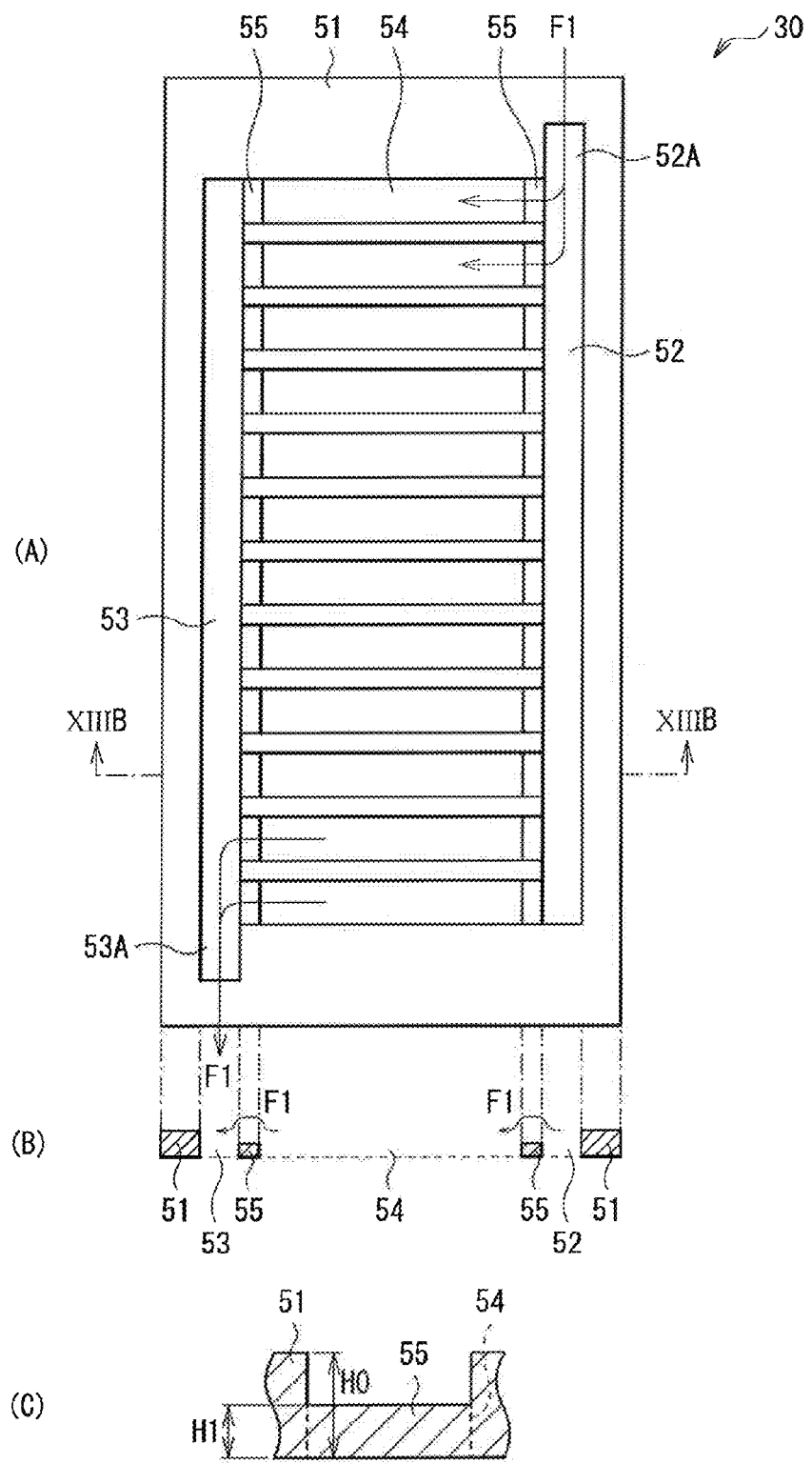
FIG. 13(A) illustrates a configuration of the electrolyte channel illustrated in FIG. 12 when viewed from a side where a first main channel, a second main channel and parallel channels are arranged.
FIG. 13(B) is a sectional view taken along a line XIIIB-XIIIB of FIG. 13(A)
FIG. 13(C) is a sectional view illustrating a configuration of a rib in one parallel channel.

Next, the substrate 51 made of the above-described material is prepared, and the first main channel 52, the second main channel 53 and the parallel channels 54 illustrated in FIGS. 10 and 11 are formed in the substrate 51, and the ribs 55 are formed at the inlets 54A and the outlet 54B of the parallel channels 54 so as to form the fuel channel 40. Moreover, the electrolytic solution channel 30 illustrated in FIGS. 12 and 13 are formed in the same manner, and the fuel channel 40 and the electrolytic solution channel 30 are thermal compression bonded to both sides of the fuel electrode 10.

Next, the external members 14 and 24 made of the above-described material are formed, and the fuel inlet 14A and the fuel outlet 14B configured of, for example, joints made of a resin are arranged in the external member 14, and the electrolytic solution inlet 24A and the electrolytic solution outlet 24B configured of, for example, joints made of a resin are arranged in the external member 24.

After that, the fuel electrode 10 and the oxygen electrode 20 are arranged so as to face each other so that the electrolytic solution channel 30 is arranged between the fuel electrode 10 and the oxygen electrode 20 and the fuel channel 40 is arranged outside, and the fuel electrode 10 and the oxygen electrode 20 are contained in the external members 14 and 24. Thereby, the fuel cell 110 illustrated in FIG. 9 is completed.

The fuel cell 110 is mounted in a system including the measurement section 120, the control section 130, the electrolytic solution supply section 140 and the fuel supply section 150 all having the above-described configurations, and the fuel inlet 14A and the fuel outlet 14B are connected to the fuel supply section 150 through the fuel supply line 153 configured of, for example, a silicone tube, and the electrolytic solution inlet 24A and the electrolytic solution outlet 24B are connected to the electrolytic solution supply section 140 through the electrolytic solution supply line 143 configured of, for example, a silicone tube. Thus, the fuel cell system 1A illustrated in FIG. 8 is completed.

In the fuel cell system 1A, as in the case of the above-described first embodiment, battery reactions by Chemical Formula 2 occur. At this time, in the fuel channel 40, as illustrated in FIGS. 11(A) and 11(B), the fuel F2 enters from the main inlet 52A into the first main channel 52, and then enters from the first main channel 52 into the inlets 54A of the parallel channels 54 to flow through the parallel channels 54, and then the fuel F2 enters from the outlets 54B into the second main channel 53 to exit from the main outlet 53A. Moreover, in the electrolytic solution channel 30, as illustrated in FIGS. 13(A) and 13(B), the electrolytic solution F1 enters from the main inlet 52A into the first main channel 52, and then enters from the first main channel 52 into the inlets 54A of the parallel channels 54 to flow through the parallel channels 54, and then the electrolytic solution F2 enters from the outlets 54B into the second main channel 53 to exit the main outlet 53A. In this case, the region of which the sectional area is reduced by forming the rib 55 is arranged at each of the inlets 54A and the outlets 54B of the parallel channels 54, so the rib 55 becomes a barrier to the flow of the fuel F2 or the electrolytic solution F1, and the resistance of the first main channel 52 and the second main channel 53 to the flow is reduced, thereby to allow the fuel F2 or the electrolytic solution F2 to easily flow through the first main channel 52 and the second main channel 53, and the uniformity of the flow of the fuel F2 or the electrolytic solution F1 through the parallel channels 54 is improved.

On the other hand, in related art, to maintain uniformity of the flow through the parallel channels, it is necessary to increase the thickness of a substrate to 1 mm or over. In the invention, as the rib 55 is arranged, the thickness of the substrate 51 is 100 μm or less which is extremely thin, and even if the sectional areas of the first main channel 52 and the second main channel 54 are equal to the sectional areas of the parallel channels 54, the resistance of the first main channel 52 and the second main channel 53 to the flow is reduced, and on the other hand, the uniformity of the flow through the parallel channels 54 is improved.

Thus, in the embodiment, the region of which the sectional area is reduced by the rib 55 is arranged at each of the inlets 54A and the outlets 54B of two or more parallel channels 54, so the fuel F2 or the electrolytic solution F1 is allowed to uniformly flow through the parallel channels 54. Therefore, the electric power generation characteristics of the fuel cell 110A are allowed to be improved, and the fuel cell system 1A is suitable for a multifunctional high-performance electronic device consuming a large amount of electric power.

Third Embodiment

Figure 14:
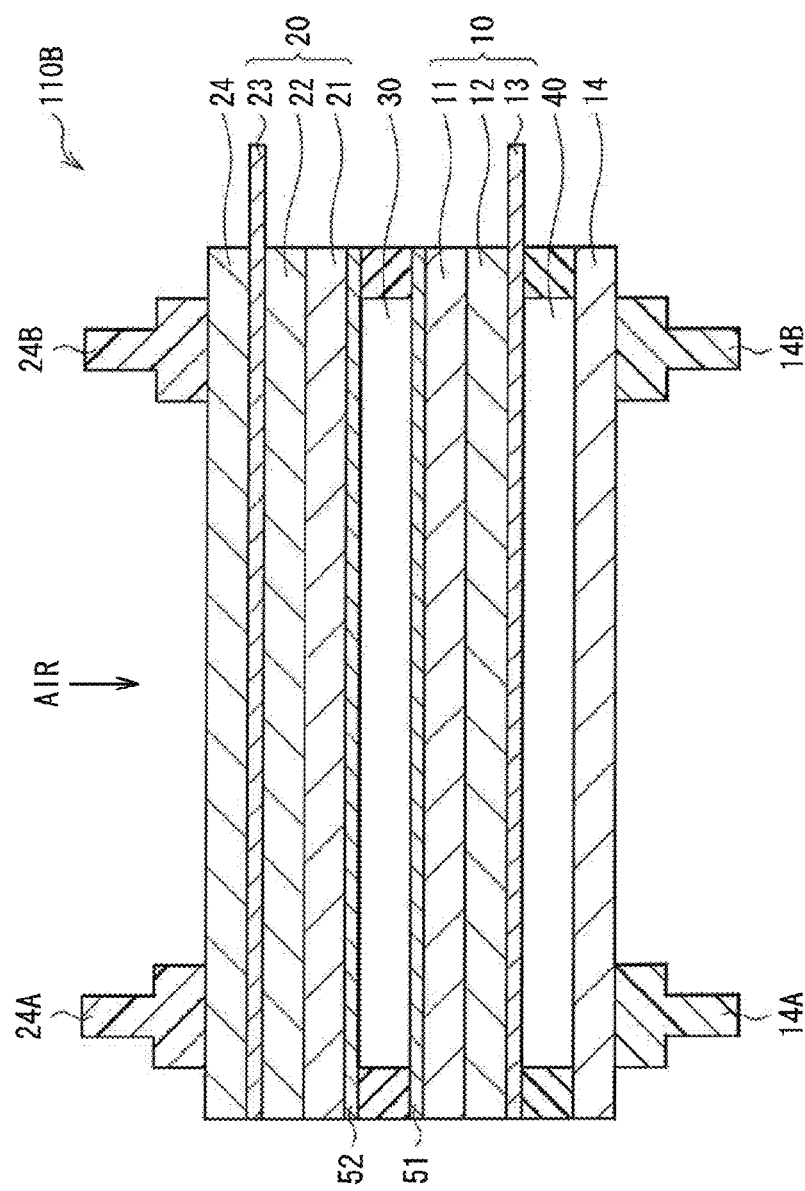
FIG. 14 is an illustration of a configuration of a fuel cell of a fuel cell system according to a third embodiment.

FIG. 14 illustrates a configuration of a fuel cell 110B of a fuel cell system 1A according to a third embodiment. The fuel cell system 1A has the same configuration as that of the above-described second embodiment, except that in the fuel cell 110B, a functional layer 51 and a functional layer 52 are arranged on the fuel electrode 10 and the oxygen electrode 20, respectively. Therefore, like components will be described using like numerals.

The catalyst layers 11 and 21, the diffusion layers 12 and 22, the current collectors 13 and 23 and the external members 14 and 24 of the fuel electrode 10 and the oxygen electrode 20 are configured as in the case of the first embodiment.

The functional layer (a contact inhibition layer) 51 inhibiting direct contact between the catalyst layer 11 and the electrolytic solution F1 is arranged on the catalyst layer 11 of the fuel electrode 10. Moreover, the functional layer (contact inhibition layer) 52 inhibiting direct contact between the catalyst layer 21 and the electrolytic solution F1 is arranged on the catalyst layer 21 of the oxygen electrode 20. Thereby, in the fuel cell 110, deterioration of the fuel electrode 10 or the oxygen electrode 20 is preventable.

The functional layer 51 arranged on the fuel electrode 10 is an anti-deterioration layer preventing deterioration such as a crack or a hole of the fuel electrode 10 caused by direct contact between the catalyst layer 11 and the electrolytic solution F1 while maintaining an ion path between the electrolytic solution F1 and the catalyst layer 11. Moreover, the functional layer 51 also has a function of reducing fuel crossover (a crossover inhibition layer) and a function of preventing carbon dioxide ($CO_2$) as bubbles generated by a reaction in the fuel electrode 10 from being released into the electrolytic solution F1 (a bubble release direction control layer). The generated carbon dioxide as bubbles is released into both of the electrolytic solution F1 in the electrolytic solution channel 30 and the fuel F2 in the fuel channel 40. Carbon dioxide released into the fuel F2 is not an issue, but carbon dioxide released into the electrolytic solution F1 may cause a fatal issue. It is because a proton path is blocked by release of carbon dioxide bubbles to cause a change in proton conductivity and instability in characteristics in an area where bubbles are present. When the functional layer 51 is arranged, the direction where carbon dioxide bubbles are released is controllable, thereby to allow carbon dioxide released into the electrolytic solution F1 to be remarkably reduced.

The functional layer 52 arranged in the oxygen electrode 20 is an anti-deterioration layer preventing deterioration such as a crack or a hole of the oxygen electrode 20 caused by direct contact between the catalyst layer 21 and the electrolytic solution F1 while maintaining an ion path between the electrolytic solution F1 and the catalyst layer 21 and preventing leakage of the electrolytic solution F1. Moreover, the functional layer 52 also has a function of preventing overvoltage generated in the oxygen electrode 20 due to fuel crossover (an overvoltage prevention layer) and a function of preventing flooding of the oxygen electrode 20 (a flooding prevention layer). The oxygen electrode 20 is consistently in contact with the electrolytic solution F1, and is in a state in which flooding consistently occurs irrespective of whether electric power is generated or not, but when the functional layer 52 is arranged, the flooding state of the oxygen electrode 20 is allowed to be relieved.

The functional layers 51 and 52 are made of, for example, a porous material. An ion path between the electrolytic solution F1 and the catalyst layers 11 and 21 is allowed to be secured by pores contained in the porous material. As the porous material, specifically metal, carbon, a resin such as polyimide or ceramic is cited, and a blend layer made of a plurality of materials selected from them may be used. The resin may be a water-repellent resin or a hydrophilic resin. The thicknesses of the functional layers 51 and 52 are, for example, approximately 10 μm to 15 μm, and are preferably as thin as possible.

The pores of the functional layers 51 and 52 preferably have, for example, a diameter ranging from nanometers to micrometers, but they are not specifically limited. However, the diameters of the pores in the functional layers 51 and 52 are preferably smaller than the diameters of pores contained in the fuel electrode 10 or the oxygen electrode 20. It is because it is necessary that carbon dioxide generated as bubbles selectively passes through the fuel electrode 10 to be released toward the fuel F2. Moreover, needless to say, a porous material with a thin pore diameter has a higher function of preventing methanol crossover than a porous material with a large pore diameter.

The functional layers 51 and 52 may be made of an ion conductor such as a proton conductor. Examples of the proton conductor include a polyperfluoroalkyl sulfonic acid-based resin ("Nafion (a registered trademark)" manufactured by E. I. du Pont de Nemours and Company), polystyrene sulfonate, a fullerene-based conductor, a solid acid and other resin having proton conductivity.

For example, the electrolytic solution channel 30 and the fuel channel 40 are configured as in the case of the first embodiment. The electrolytic solution channel 30 is connected to the electrolytic solution supply section 140 (not illustrated in FIG. 14, refer to FIG. 8) through the electrolytic solution inlet 24A and the electrolytic solution outlet 24B arranged in the external member 24, and the electrolytic solution F1 is supplied from the electrolytic solution supply section 140 to the electrolytic solution channel 30. The fuel channel 40 is connected to the fuel supply section 150 (not illustrated in FIG. 14, refer to FIG. 8) through the fuel inlet 14A and the fuel outlet 14B arranged in the external member 14, and the fuel F2 is supplied from the fuel supply section 150 to the fuel channel 40.

The fuel cell system 1A is manufacturable by, for example, the following steps.

First, as in the case of the first embodiment, the catalyst layer 11 of the fuel electrode 10 is formed. The catalyst layer 11 is thermal compression bonded to the diffusion layer 12 made of the above-described material. Moreover, the functional layer 51 made of the above-described material is formed on a surface where the diffusion layer 12 is not thermal compression bonded of the catalyst layer 11.

As a method of forming the functional layer 51, for example, a bar-coating method is preferable. It is because the functional layer 51 is applicable with a uniform thickness. In addition, the method of forming the functional layer 51 is not limited to the bar coating method, and any other coating method such as a gravure coating method, a roll coating method, a spin coating method, a dip coating method, a doctor bar coating method, a wire bar coating method, a blade coating method, a curtain coating method, a spray coating method may be used. Moreover, another member may coated with a coating liquid including the material of the functional layer 51, and the coating liquid may be dried to form a porous film, and then the porous film may be transferred to the catalyst layer 11. Moreover, the functional layer 51 made of the above-described material may be thermal compression bonded to the catalyst layer 11.

Moreover, the current collector 13 made of the above-described material is thermal compression bonded with a hot-melt adhesive or a resin sheet having adhesion to form the fuel electrode 10.

Further, as in the case of the first embodiment, the catalyst layer 21 of the oxygen electrode 20 is formed. The catalyst layer 21 is thermal compression bonded to the diffusion layer 22 made of the above-described material. Moreover, the functional layer 52 made of the above-described material is formed on a surface where the diffusion layer 22 is heat compression bonded of the catalyst layer 21. A method of forming the functional layer 52 is the same as the above-described method of forming the functional layer 51. Further, the current collector 23 made of the above-described material is thermal compression bonded with a hot-melt adhesive or a resin sheet having adhesion to form the oxygen electrode 20.

Next, a resin sheet having adhesion is prepared, and a channel is formed with the resin sheet to form the electrolytic solution channel 30 and the fuel channel 40, and the electrolytic solution channel 30 and the fuel channel 40 are thermal compression bonded to both sides of the fuel electrode 30.

Next, the external members 14 and 24 made of the above-described material are formed, and the fuel inlet 14A and the fuel outlet 14B, and the electrolytic solution inlet 24A and the electrolytic solution outlet 24B are arranged in the external member 14 and the external member 24, respectively.

After that, the fuel electrode 10 and the oxygen electrode 20 are arranged so as to face each other so that the electrolytic solution channel 30 is arranged between the fuel electrode 10 and the oxygen electrode 20 and the fuel channel 40 is arranged outside, and the fuel electrode 10 and the oxygen electrode 20 are contained in the external members 14 and 24. Thereby, the fuel cell 110B illustrated in FIG. 14 is completed.

The fuel cell 110B is mounted in a system including the measurement section 120, the control section 130, the electrolytic solution supply section 140 and the fuel supply section 150 all having the above-described configurations, and the fuel inlet 14A and the fuel outlet 14B are connected to the fuel supply section 150 through the fuel supply line 153 made of, for example, a silicone tube, and the electrolytic solution inlet 24A and the electrolytic solution outlet 24B are connected to the electrolytic solution supply section 140 through the electrolytic solution supply line 143 made of, for example, a silicone tube. Thus, the fuel cell system 1A illustrated in FIG. 8 is completed.

In the fuel cell system 1A, as in the case of the above-described first embodiment, battery reactions by Chemical Formula 2 occur. In this case, the functional layers 51 and 52 preventing direct contact between the catalyst layers 11 and 21 and the electrolytic solution F2 are arranged on the catalyst layers 11 and 21, so deterioration such as a crack or a hole of the fuel electrode 10 or the oxygen electrode 20 is prevented. Therefore, fuel crossover due to deterioration of the fuel electrode 10 or leakage of the electrolytic solution F2 due to deterioration of the oxygen electrode 20 is reduced, and stable characteristics are maintained, and long-time electric power generation is allowed.

Moreover, the fuel electrode 10 is arranged between the electrolytic solution channel 30 and the fuel channel 40, so almost all of the fuel reacts when flowing through the fuel electrode 10. Even if the fuel F2 passes through the fuel electrode 10 without reaction, fuel crossover is remarkably prevented by the functional layer 51 arranged on the catalyst layer 11, and a possibility that the fuel F2 reaches the oxygen electrode 20 is extremely low. Therefore, a high-concentration fuel is applicable, and high energy density characteristics as an intrinsic advantage of the fuel cell are utilized.

Further, carbon dioxide generated in the fuel electrode 10 is prevented from being released into the electrolytic solution F2 by the functional layer 51 arranged on the catalyst layer 11, and the carbon dioxide is released into the fuel F2 to flow with the fuel F2, thereby to be removed. Therefore, conductivity is prevented from being lost due to carbon dioxide bubbles mixed into the electrolytic solution F1. In addition, water generated in the oxygen electrode 20 flows with the electrolytic solution F1 to be removed.

Thus, in the embodiment, the functional layers 51 and 52 preventing direct contact between the catalyst layers 11 and 21 and the electrolytic solution F2 are arranged on the catalyst layers 11 and 21, so deterioration such as a crack or a hole of the fuel electrode 10 or the oxygen electrode 20 is preventable. Therefore, a decline in characteristics of the fuel cell 110 is prevented, and long-time electric power generation is allowed, and the embodiment is suitable for a multifunctional high-performance electronic device consuming a large amount of electric power.

Figure 15:
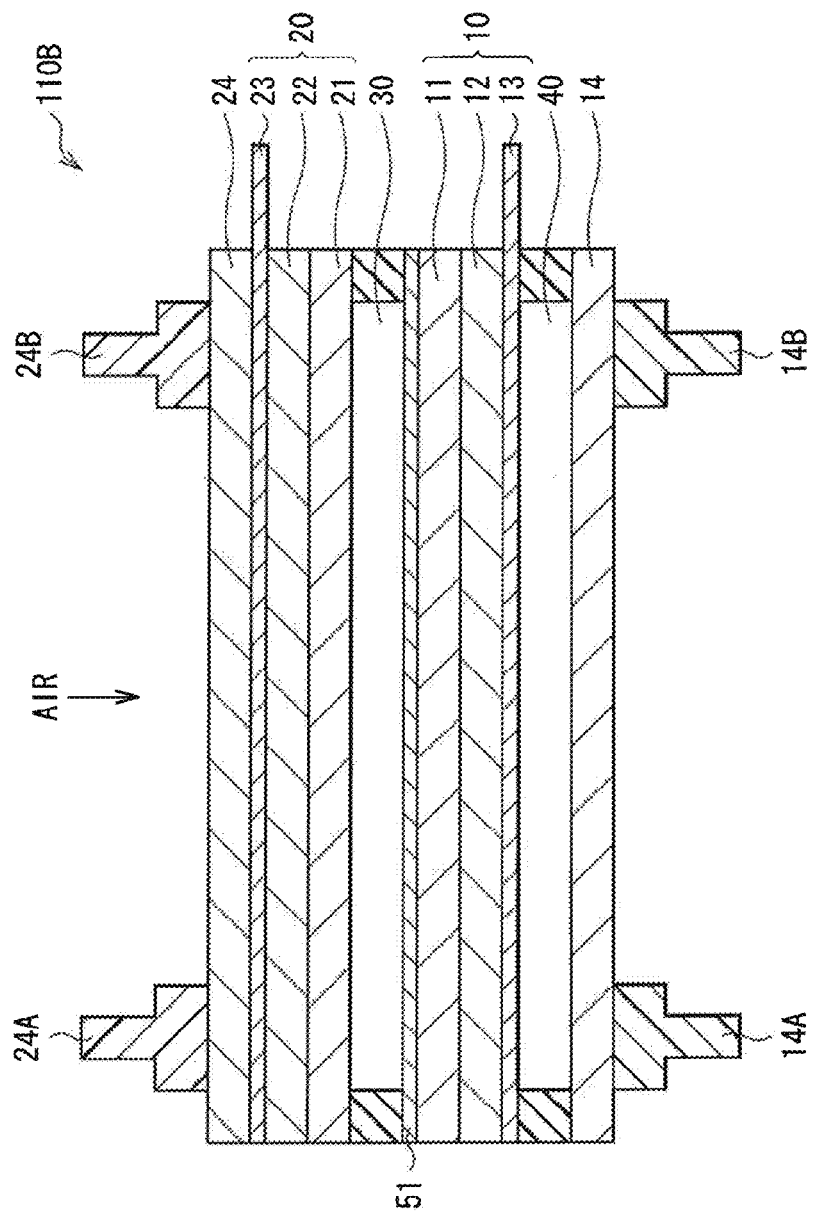
FIG. 15 is an illustration of a modification example of the fuel cell illustrated in FIG. 14.
Figure 16:
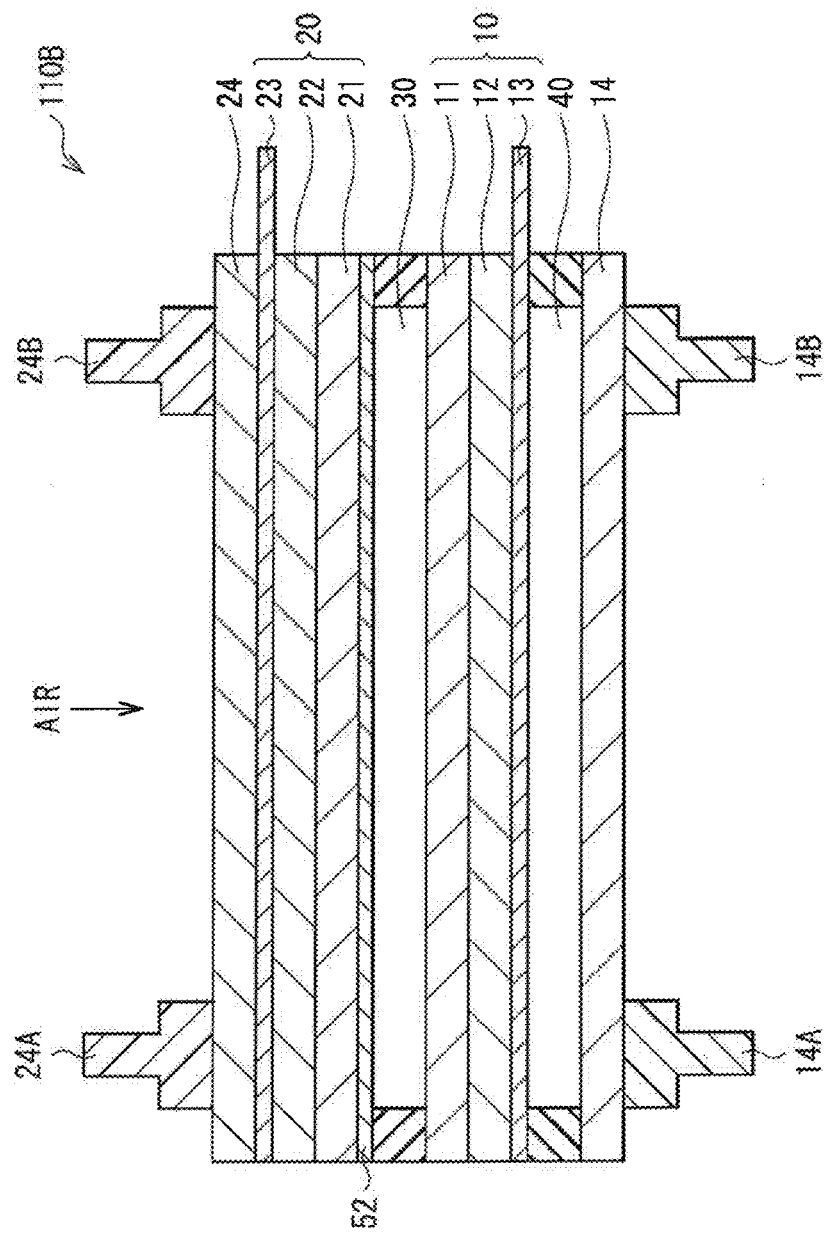
FIG. 16 is an illustration of another modification example of the fuel cell illustrated in FIG. 14.

In addition, in the above-described embodiment, the case where the functional layers 51 and 52 are arranged in the fuel electrode 10 and the oxygen electrode 20, respectively is described; however, for example, as illustrated in FIG. 15, the functional layer 51 may be arranged on the catalyst layer 11 of the fuel electrode 10, and the functional layer 52 of the oxygen electrode 20 may be removed. Moreover, as illustrated in FIG. 16, the functional layer 52 may be arranged on the catalyst layer 21 of the oxygen electrode 20, and the functional layer 41 of the fuel electrode 10 may be removed.

Fourth Embodiment

Figure 17:
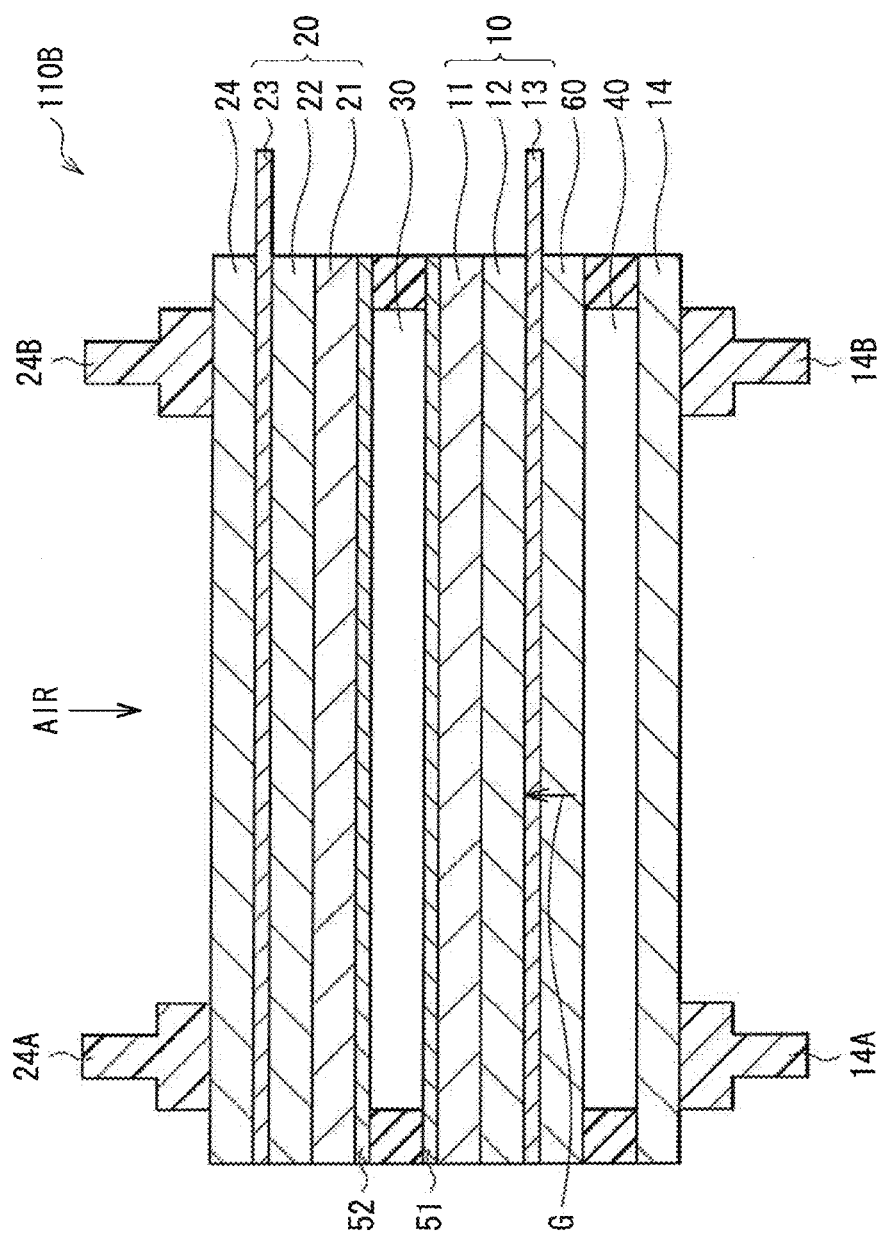
FIG. 17 is an illustration of a configuration of a fuel cell according to a fourth embodiment.

FIG. 17 illustrates a configuration of a fuel cell 110B according to a fourth embodiment. In the fuel cell 110B, a gas-liquid separation film 60 is arranged between the fuel channel 40 and the fuel electrode 10, and the fuel cell 110B is configured as in the case of the above-described third embodiment, except for this. Therefore, like components will be described using like numerals.

The gas-liquid separation film 60 may be configured of, for example, a film not allowing alcohol in a liquid form to pass therethrough such as polytetrafluoroethylene (PTFE), polyvinylidene fluoride (PVDF) or polypropylene (PP).

The fuel cell 110B and the fuel cell system 1A using the fuel cell 110B are manufacturable as in the case of the above-described embodiments, except that the gas-liquid separation film 60 is arranged between the fuel channel 40 and the fuel electrode 10.

In the fuel cell system, as in the case of the above-described embodiments, a current is extracted from the fuel cell 110B to drive the external circuit 2. In this case, as the gas-liquid separation film 60 is arranged between the fuel channel 40 and the fuel electrode 10, when pure methanol as the fuel flows through the fuel channel 40 in a liquid form, pure methanol volatilizes spontaneously, and passes through the gas-liquid separation film 60 in the form of a gas G from a surface in contact with the gas-liquid separation film 60 to be supplied to the fuel electrode 10. Therefore, the fuel is efficiently supplied to the fuel electrode 10, and a reaction stably occurs. Moreover, the fuel is supplied to the fuel electrode 10 in a gas form, so electrode reaction activity is improved, and crossover is less prone to occur, and high performance is obtained in an electronic device including a high-load external circuit 2.

In addition, even if methanol in a gas form having passed through the fuel electrode 10 is present, as in the case of the above-described embodiments, fuel crossover is remarkably prevented by the functional layer 51 on the catalyst layer 11, thereby there is an extremely low possibility that methanol reaches the oxygen electrode 20.

Thus, in the embodiment, as the gas-liquid separation film 60 is arranged between the fuel channel 40 and the fuel electrode 10, pure (99.9%) methanol is applicable as the fuel F2, and high energy density characteristics as an advantage of the fuel cell is allowed to be further utilized. Moreover, reaction stability or electrode reaction activity is allowed to be improved, and crossover is preventable. Therefore, also in an electronic device having the high-load external circuit 2, high performance is obtainable. Further, in the fuel supply section 150, a concentration adjustment section adjusting the supply concentration of the fuel F2 is allowed to be removed, so the size of the fuel supply section 150 is allowed to be further reduced.

Fifth Embodiment

Figure 18:
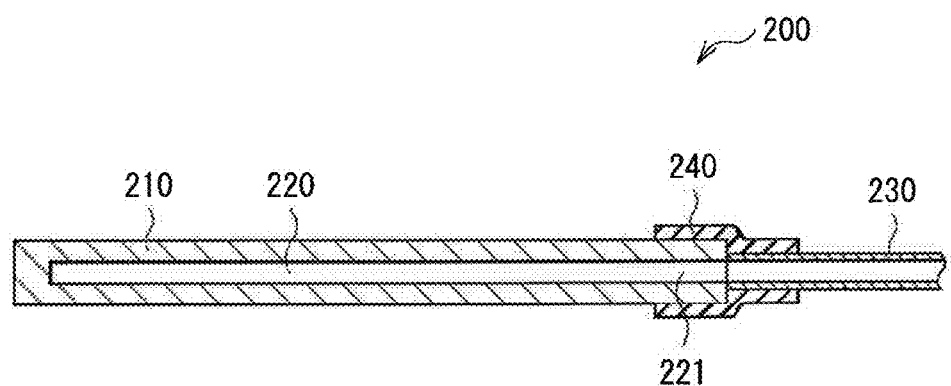
FIG. 18 is a sectional view illustrating a configuration of a channel structure according to a fifth embodiment.
Figure 19:
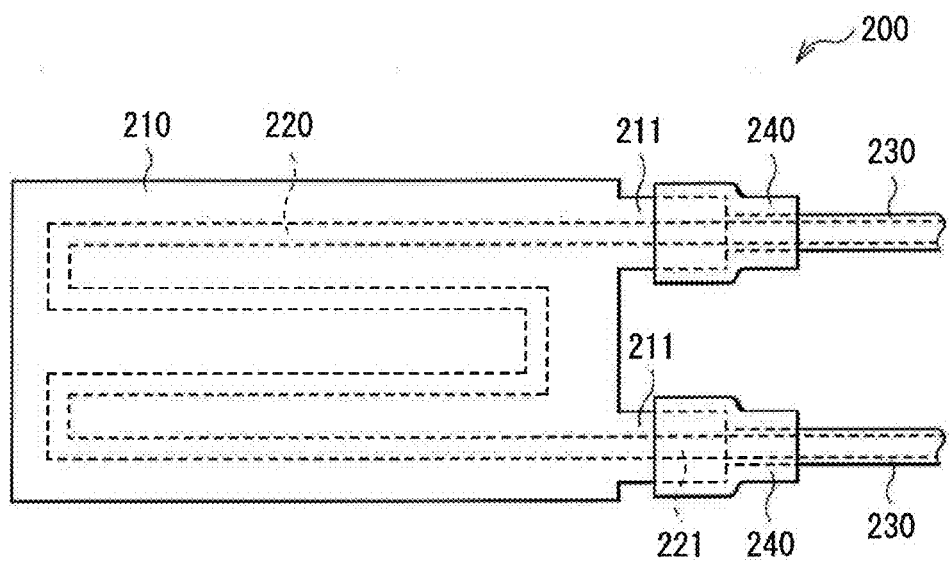
FIG. 19 is a plan view illustrating a configuration of the channel structure illustrated in FIG. 18.

FIGS. 18 and 19 illustrate a configuration of a channel structure according to a fifth embodiment. A channel structure 200 is used as, for example, a micro TAS, and includes a channel 220 for fluid formed in a base 210 and a fluid connector 230 connected to the channel 220.

Figure 20:
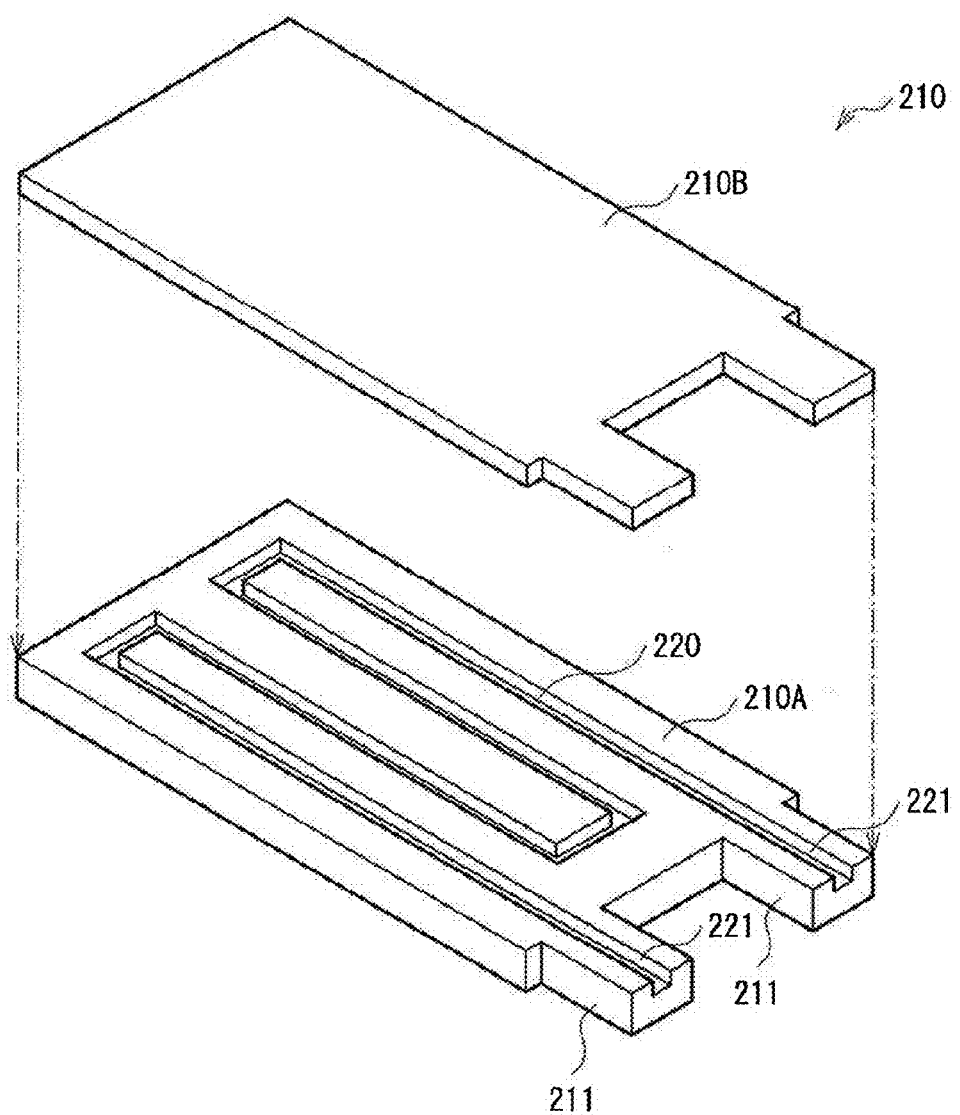
FIG. 20 is a perspective view illustrating an example of an exploded configuration of the channel structure illustrated in FIGS. 18 and 19.
Figure 21:
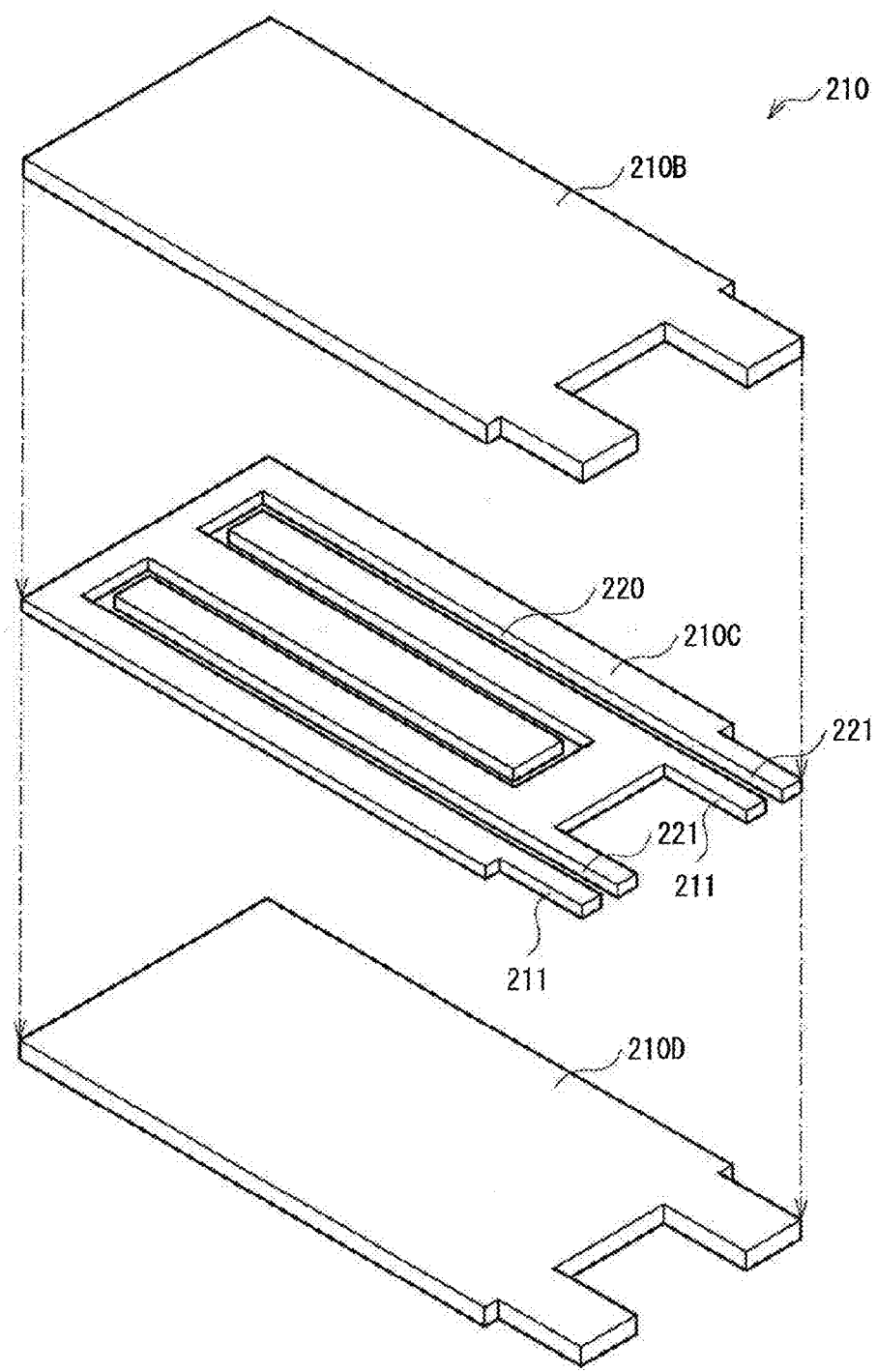
FIG. 21 is a perspective view illustrating another example of the exploded configuration of the channel structure illustrated in FIGS. 18 and 19.

The base 210 is formed by cutting a thin plate made of glass, silicon (Si) or the like or bonding the thin plates together or bonding flexible films such as plastic films together. More specifically, as illustrated in FIG. 20, the base 210 is formed by cutting a thin plate 210A made of metal, plastic or the like to form the channel 220, and bonding another thin plate or flexible film 210B to the thin plate 210A, or as illustrated in FIG. 21, the base 210 is formed by bonding a thin plate or flexible film 210C in which an incision corresponding to the shape of the channel 220 is arranged to another thin plates or flexible films 210B and 210D. Therefore, the sectional shape of the channel 220 is rectangular. In addition, as long as two ends 221 as an inlet and an outlet for fluid are included, the planar shape of the channel 220 is not specifically limited. Moreover, the end 221 on the inlet side is not necessarily arranged only at one point, and the ends 221 on the inlet side may be arranged at two or more points, and different fluids may be introduced into the channel 220 from the ends 221, respectively.

The fluid connector 230 introduces and guides the fluid into the channel 220 from an external system (not illustrated), and has a different sectional shape from the sectional shape of the channel 220. For example, the sectional shape of the channel 220 is rectangular as described above, but the fluid connector 230 is, for example, a cylindrical tube made of polyolefin.

The fluid connector 230 is connected to a main surface of the base 210 in a direction parallel to the channel 220. Thereby, in the channel structure 200, a space for connection of the fluid connector 230 is allowed to be reduced.

More specifically, the ends 221 of the channel 220 are formed in projections 211 projected from a side surface of the base 210 in a direction parallel to the main surface of the base 210, and the fluid connector 230 is connected to the projections 211, and a heat-shrinkable tube 240 is arranged on a connection part between the projection 211 and the fluid connector 230. The heat-shrinkable tube 240 allows connection between the channel 220 and the fluid connector 230 with different sectional shapes, and is made of, for example, polyolefin. Moreover, when the heat-shrinkable tube 240 is arranged, even if the base 210 is thinner than the tube diameter (outside diameter) of the fluid connector 230, the fluid connector 230 is connectable in a direction parallel to the main surface of the base 210, and the base 210 is allowed to be extremely thin. In addition, the projections 211 may be projected in parallel with the main surface of the base 210, and are not necessarily projected in a direction perpendicular to the side surface of the base 210.

The channel structure 200 is manufacturable by, for example, the following steps.

First, as illustrated in FIG. 2 the thin plate 210A is cut to form the channel 220, and the channel 220 is bonded to another thin plate 210B, or as illustrated in FIG. 21, the thin plate or flexible film 210B in which an incision corresponding to the shape of the channel 220 is arranged is bonded to another thin plates or flexible films 210B and 210D, thereby the base 210 including the channel 220 inside thereof is formed. At this time, the projections 211 projected from the side surface of the base 210 in a direction parallel to the main surface of the base 210 are arranged, and the ends 221 of the channel 220 are formed in the projections 211.

Next, the heat-shrinkable tube 240 made of the above-described material is prepared, and the projection 211 is put into an end of the heat-shrinkable tube 240. Next, a part put on the projection 211 of the heat-shrinkable tube 240 is adhered to the projection 211. For this adhesion, for example, an adhesive may be used, or a surface of the projection 211 and the inside of the heat-shrinkable tube 240 may be made of a material having thermal adhesion.

After that, the fluid connector 230 made of the above-described material is prepared, and the fluid connector 230 is put into the other end of the heat-shrinkable tube 240, and a part put on the fluid connector 230 of the heat-shrinkable tube 240 is adhered to the fluid connector 230. For this adhesion, for example, an adhesive may be used, or a surface of the fluid connector 230 and the inside of the heat-shrinkable tube 240 may be made of a material having thermal adhesion. In addition, in the case where the base 210 and the projections 211 are made of a deformable material, the fluid connector 230 may be put into the ends 221 of the channel 220 in the projection 211. Thus, the channel structure 200 illustrated in FIGS. 18 and 19 is completed.

In the channel structure 200, the fluid is introduced into the channel 220 from the external system (not illustrated) through the fluid connector 230 and the end 221 on the inlet side, and the mixture, reaction, separation, detection or the like is performed on the fluid in the channel 220, and then the fluid is emitted from the end 221 on the outlet side through the fluid connector 230.

Thus, in the embodiment, the fluid connector 230 is connected to the channel 220 in a direction parallel to the main surface of the base 210, so a space for connection of the fluid connector 230 is allowed to be reduced. Therefore, the bases 210 to which the fluid connector 230 is connected are allowed to be stacked in parallel, and integration is allowed to be improved.

Modification Example

Figure 22:
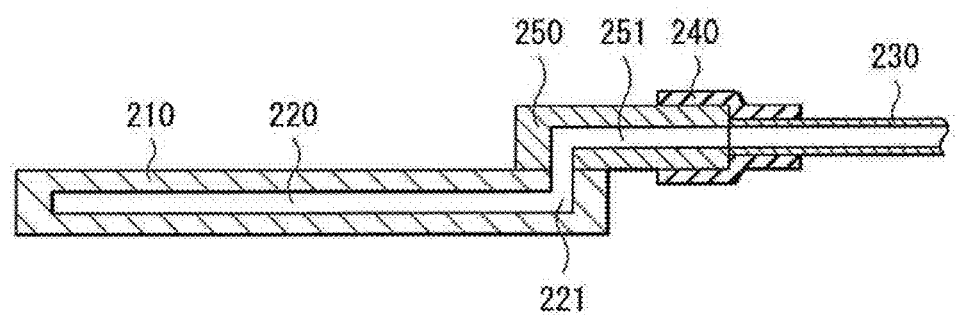
FIG. 22 is a sectional view illustrating a configuration of a channel structure according to a modification example of the embodiment.

FIG. 22 illustrates the end 221 of the channel 220 according to a modification example. In the modification example, in the case where unlike the above-described embodiment, it is difficult to form the projection 211 on the side surface of the base 210, and the ends 221 of the channel 220 are formed parallel to the side surface of the base 210, the fluid connector 230 is connected to the channel 220 with an auxiliary component 250 in between, and the heat-shrinkable tube 240 is arranged between auxiliary component 250 and the fluid connector 230. Also in such a case, the fluid connector 230 is connectable to the channel 220 in a direction parallel to the main surface of the base 210, and a space for connection of the fluid connector 230 is allowed to be reduced, and integration is allowed to be improved.

Figure 23:
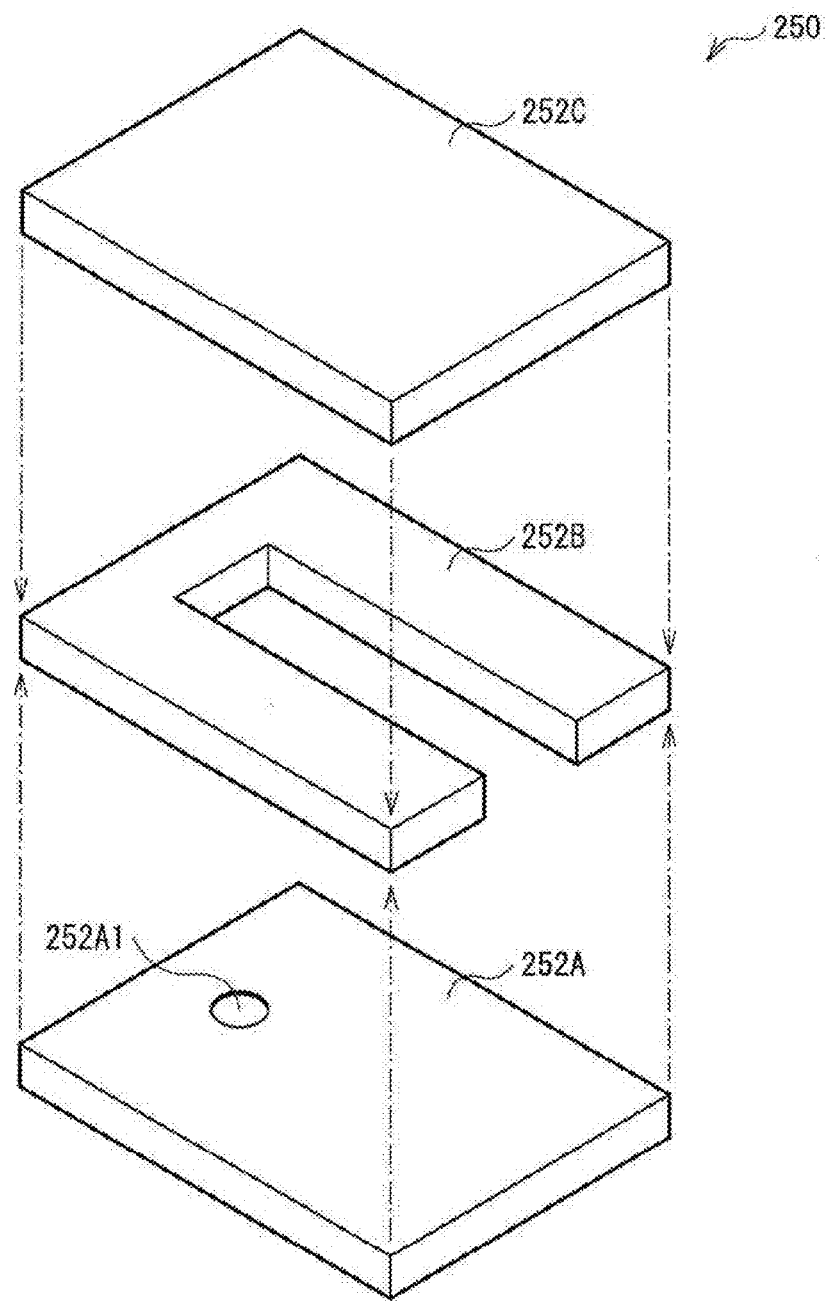
FIG. 23 is an exploded perspective view illustrating a configuration of an auxiliary component illustrated in FIG. 22.

In the auxiliary component 250, a curved channel 251 curved at 90° from the end 221 of the channel 220 is formed, and as illustrated in FIG. 23, the auxiliary component 250 is formed by bonding three films 252A, 252B and 252C made of plastic together. In the film 252A, a connection hole 252A1 connected to the end 221 of the channel 220 is arranged. In the film 252B, a cutout part 252B with a shape corresponding to the curved channel 251 is arranged. A thermosetting adhesive (not illustrated) is arranged on both sides of the film 252B, thereby the films 252A to 252C are allowed to be bonded together by stacking them and applying heat to them. In addition, an adhesive may be arranged on a back surface of the film 252A so as to be used for adhesion to the base 210 which is desired to be connected.

Application Example 1

Figure 24:
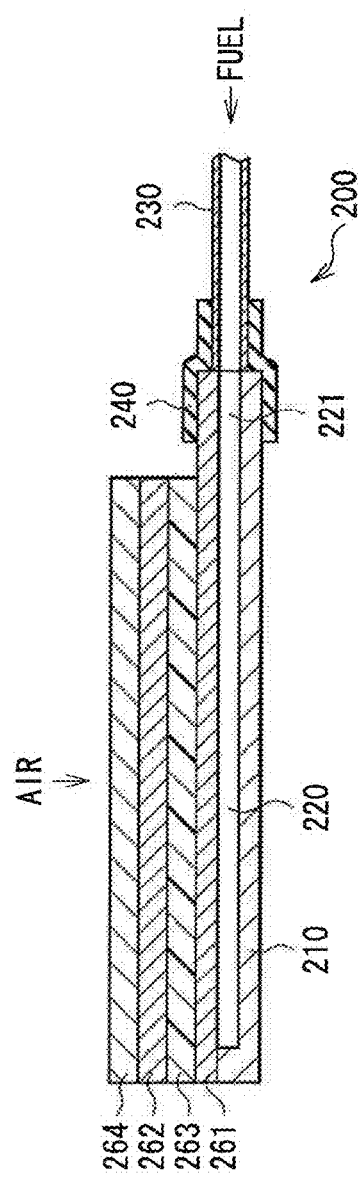
FIG. 24 is a sectional view illustrating a configuration of a fuel cell in which a fuel channel is configured of the channel structure illustrated in FIGS. 18 and 19.

Other application examples of the channel structure 200 according to the above-described fifth embodiment will be described below. FIG. 24 illustrates an example in which the channel structure 200 is applied to a fuel channel of a fuel cell. The fuel cell is a so-called polymer electrolyte fuel cell (PEFC), and includes an electrolyte film 263 between a fuel electrode (anode) 261 and an oxygen electrode (cathode) 262. The channel structure 200 according to the above-described embodiment is arranged on the outside of the fuel electrode 261, and methanol as a fuel is supplied to the fuel electrode 261 through the channel 220 of the channel structure 200. In addition, in the application example, the fuel electrode 261 is arranged instead of the thin plate or flexible film 210B illustrated in FIGS. 20 and 21, and the fuel in the channel 220 is allowed to come into contact with the fuel electrode 261. An external member 264 configured of a titanium (Ti) plate or the like is arranged on the outside of the oxygen electrode 262.

The fuel electrode 261 and the oxygen electrode 262 are formed by forming a catalyst layer including platinum (Pt), ruthenium (Ru) or the like on a surface of a carbon cloth or the like, and then arranging a current collector configured of a titanium (Ti) mesh on a back surface of the carbon cloth or the like. The electrolyte film 263 is configured of, for example, a polyperfluoroalkyl sulfonic acid-based resin ("Nafion (a registered trademark)" manufactured by E. I. du Pont de Nemours and Company) or another resin film having proton conductivity. The fuel electrode 261, the oxygen electrode 262 and the electrolyte film 263 are fixed by a gasket (not illustrated).

The fuel cell is manufacturable by, for example, the following steps. First, the electrolyte film 263 made of the above-described material is sandwiched between the fuel electrode 261 and the oxygen electrode 262 which are made of the above-described materials, and the fuel electrode 261 and the oxygen electrode 262 is thermal compression bonded to the electrolyte film 263. The channel structure 200 of the above-described embodiment is arranged on the outside of the fuel electrode 261, and the external member 263 made of the above-described material is arranged on the outside of the oxygen electrode 262. Thus, the fuel cell illustrated in FIG. 24 is completed.

In the fuel cell, as in the case of the above-described first embodiment, battery reactions by Chemical Formula 2 occur. At this time, methanol as the fuel is introduced into the channel 220 from an external fuel tank (not illustrated) through the fluid connector 230 and the end 221 on the inlet side to come into contact with the catalyst layer of the fuel electrode 261 in the channel 220, thereby a battery reaction by a first formula in Chemical Formula 2 occurs, and then methanol is emitted from the end 221 on the outlet side through the fluid connector 230.

According to Application Example 1, the channel structure 200 according to the above-described embodiment is arranged as a fuel supply path, so a space for connection of the fluid connector 230 is allowed to be reduced, and the thickness of the fuel channel is allowed to be reduced. Therefore, the fuel cells with a smaller thickness are allowed to be stacked in parallel, and integration is allowed to be improved.

Application Example 2

Figure 25:
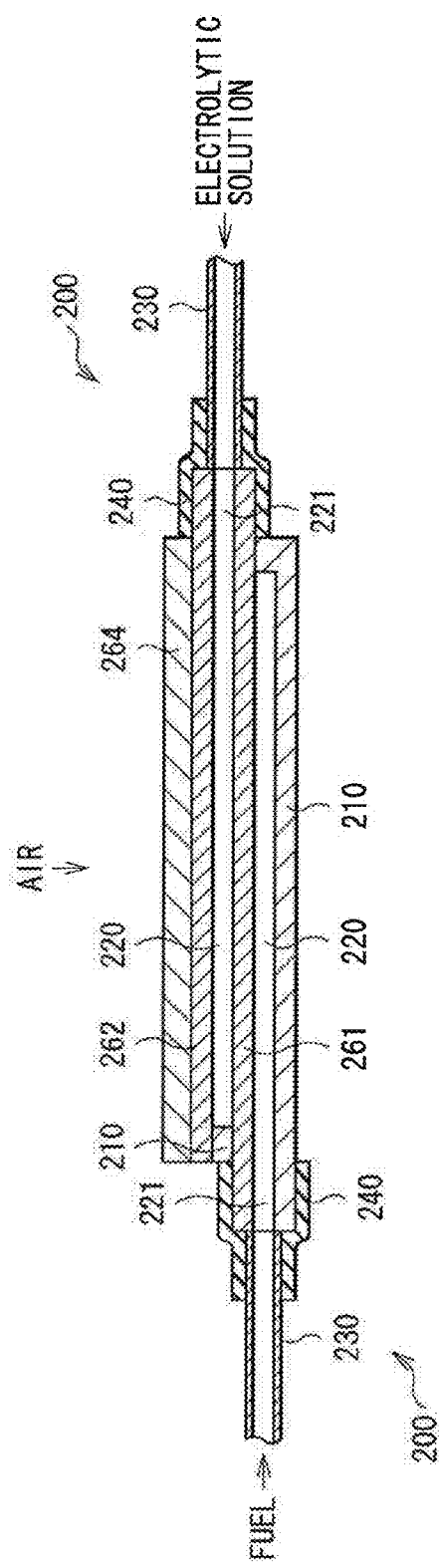
FIG. 25 is a sectional view illustrating a configuration of a fuel cell in which a fuel channel and an electrolytic solution channel each are configured of the channel structure illustrated in FIGS. 18 and 19.

FIG. 25 illustrates a configuration example of another fuel cell to which the channel structure 200 of the above-described fifth embodiment is applied. In the fuel cell, for example, instead of the electrolyte film 263, the channel structure 200 of the above-described embodiment is arranged, and an electrolytic solution (for example, a sulfuric acid) as a liquid electrolyte is supplied between the fuel electrode 261 and the oxygen electrode 262. Except for this, the fuel cell of the application example is configured as in the case of the above-descried Application Example 1. In addition, the fluid connector 230 of the channel structure 200 as a fuel channel and the fluid connector 230 of the channel structure 200 as an electrolytic solution channel are not necessarily connected to different positions as illustrated in FIG. 25, and may be stacked so as to be connected to a common position.

The fuel cell is manufacturable as in the case of the above-described Application Example 1, except that instead of the electrolyte film 263, the channel structure 200 of the above-described embodiment is arranged.

In the fuel cell, battery reactions by Chemical Formula 2 occur as in the case of the above-described Application Example 1. At this time, the fuel is supplied to the fuel electrode 261 through the channel 220 of the channel structure 200 as in the case of the above-described application example. Moreover, the electrolytic solution is introduced into the channel 220 from an external electrolytic solution tank (not illustrated) through the fluid connector 230 and the end 221 on the inlet side, and is emitted with carbon dioxide or the like generated in the reaction from the end 221 on the outlet side through the fluid connector 230. In addition, the fuel having passed through the fuel electrode 261 is also removed with the electrolytic solution before reaching the oxygen electrode 262, thereby crossover is prevented.

Thus, according to Application Example 2, in addition to the fuel supply path, the channel structure 200 according to the above-described embodiment is also arranged as an electrolytic solution supply path, so a space for connection of the fluid connector 230 is allowed to be reduced, and a gap between the fuel electrode 261 and the oxygen electrode 262 is allowed to be reduced. Therefore, the fuel cells with a smaller thickness are allowed to be stacked in parallel, and integration is allowed to be improved.

EXAMPLES

Moreover, specific examples will be described below.

Example 1

In the following Example 1, the fuel cell stack 110 configured of two fuel cell elements 111A and 111B as illustrated in FIG. 2 was formed, and its characteristics were evaluated. Therefore, referring to FIGS. 1 and 2, like components will be described using like numerals.

The fuel cell stack 110 having the same configuration illustrated in FIG. 2 was formed. First, an alloy including platinum (Pt) and ruthenium (Ru) at a predetermined ratio as a catalyst and a dispersion solution of a polyperfluoroalkyl sulfonic acid-based resin ("Nafion (a registered trademark)" manufactured by E. I. du Pont de Nemours and Company) were mixed at a predetermined ratio to form the catalyst layer 11 of the fuel electrode 10. The catalyst layer 11 was thermal compression bonded to the diffusion layer 12 made of the above-described material (HT-2500 manufactured by E-TEK Inc.) for 10 minutes under the conditions where the temperature was 150° C. and the pressure was 249 kPa. Further, the current collector 13 made of the above-described material was thermal compression bonded with a hot-melt adhesive or a resin sheet having adhesion to form the fuel electrode 10.

Moreover, carbon-supported platinum (Pt) as a catalyst and a dispersion solution of a polyperfluoroalkyl sulfonic acid-based resin ("Nafion (a registered trademark)" manufactured by E. I. du Pont de Nemours and Company) were mixed at a predetermined rate to form the catalyst layer 21 of the oxygen electrode 20. The catalyst layer 21 was thermal compression bonded to the diffusion layer 22 made of the above-described material (HT-2500 manufactured by E-TEK Inc.) as in the case of the catalyst layer 11 of the fuel electrode 10. Further, the current collector 23 made of the above-described material was thermal compression bonded as in the case of the current collector 13 of the fuel electrode 10 to form the oxygen electrode 20.

Next, the resin sheet having adhesion was prepared, and a channel was formed with the resin sheet to form the electrolytic solution channel 30 and the fuel channel 40, and the electrolytic solution channel 30 and the fuel channel 40 were thermal compression bonded to both sides of the fuel electrode 10.

Next, the external members 14 and 24 made of the above-described material were formed, and the fuel inlet 14A and the fuel outlet 14B configured of, for example, joints made of a resin were arranged in the external member 14, and the electrolytic solution inlet 24A and the electrolytic solution outlet 24B configured of, for example, joints made of a resin were arranged in the external member 24.

After that, the fuel electrode 10 and the oxygen electrode 20 were arranged so as to face each other so that the electrolytic solution channel 30 was arranged between the fuel electrode 10 and the oxygen electrode 20 and the fuel channel 40 was arranged outside, and the fuel electrode 10 and the oxygen electrode 20 were contained in the external members 14 and 24.

Thus, two fuel cell elements 111A and 111B were formed, and stacked in a vertical direction, and the electrolytic solution channels 30 and the fuel channels 40 of two fuel cell elements 111A and 111B were connected in series to each other. That is, the electrolytic solution outlet 24B of the fuel cell element 111A was connected to the electrolytic solution inlet 24A of the fuel cell element 111B through the connection channel 24C configured of a silicone tube, and the fuel outlet 14B of the fuel cell element 111A was connected to the fuel inlet 14A of the fuel cell element 111B through the connection channel 14C configured of a silicone tube. Moreover, the separation room 160 was connected to a midpoint of each of the connection channels 14C and 24C. Thereby, the fuel cell stack 110 illustrated in FIG. 2 was completed.

The fuel cell stack 110 was mounted in a system including the measurement section 120, the control section 130, the electrolytic solution supply section 140 and the fuel supply section 150 all having the above-described configurations so as to form the fuel cell stack system 1 illustrated in FIG. 1. At that time, the electrolytic solution supply adjustment section 142 and the fuel supply adjustment section 152 were configured of diaphragm type quantitative pumps (manufactured by KNF Neuberger GmbH). The fuel inlet 14A of the fuel cell element 111A and the fuel outlet 14B of the fuel cell element 111B were connected to the pump of the fuel supply adjustment section 152 through the fuel supply line 153 configured of a silicone tube, and the electrolytic solution inlet 24A of the fuel cell element 111A and the electrolytic solution outlet 24B of the fuel cell element 111B were connected to the pump of the electrolytic solution supply adjustment section 142 through the electrolytic solution supply line 143 configured of a silicone tube, and the electrolytic solution F1 and the fuel F2 were supplied to the electrolytic solution channel 30 and the fuel channel 40 at an arbitrary flow velocity, respectively. As the electrolytic solution F1, 1M sulfuric acid was used, and the flow velocity was 1.0 ml/min. As the fuel F2, a mixed liquid of 5M methanol and 1M sulfuric acid was used, and the flow velocity was 0.5 ml/min.

(Evaluation)

The obtained fuel cell stack system 1 was connected to an electrochemical measurement system (Multistat 1480 manufactured by Solartoron Co., Ltd), and the characteristics of the fuel cell system 1 were evaluated. The characteristics of each of the fuel cell elements 111A and 111B and the fuel cell stack 110 when generating electric power at an open circuit voltage (OCV) in an initial stage of measurement and a constant current of 1A were examined. The results are illustrated in FIGS. 26 and 27.

Figure 26:
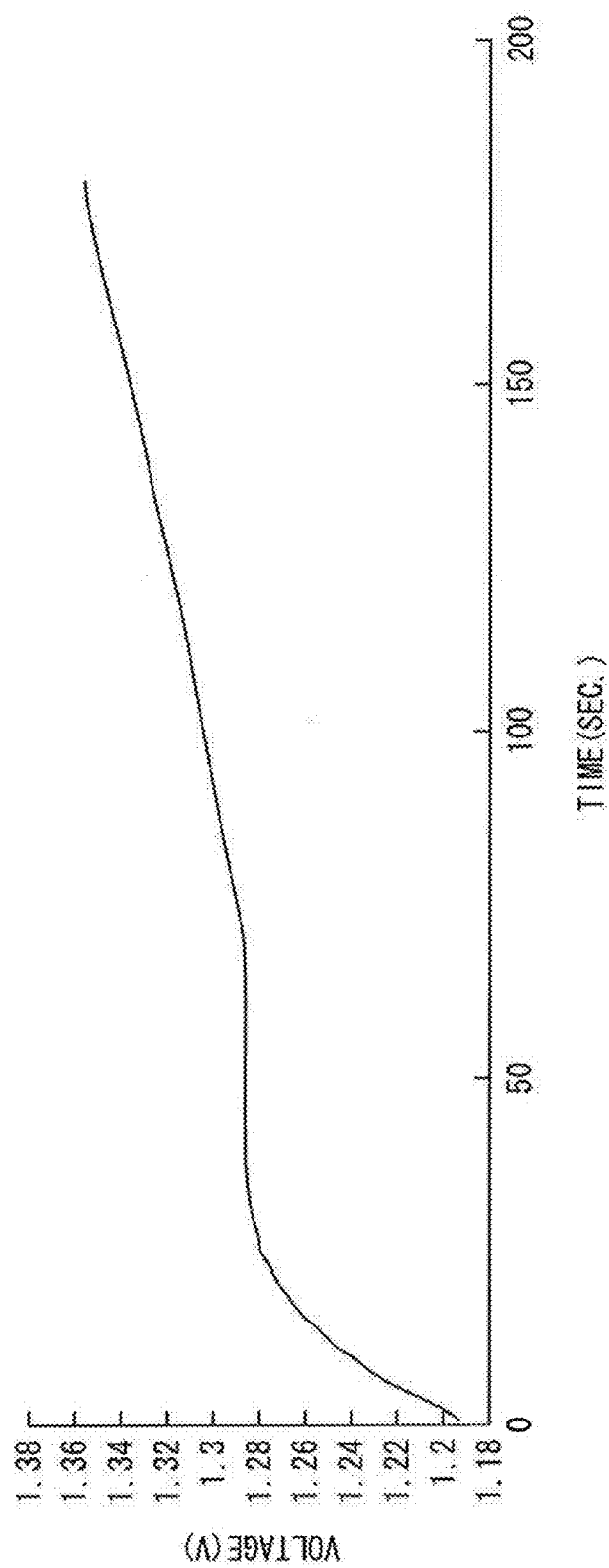
FIG. 26 is a plot illustrating results of Example 1.

FIG. 26 illustrates the OCV in the initial state of measurement. FIG. 26 illustrates a state in which the OCV was maintained for approximately 180 seconds, and the OCD showed a high value, and increased. The value of the OCV was 1.3 V or over, so the OCV of each fuel cell element was 0.65 V or over, and showed a much higher value than the OCV (approximately 0.4 V to 0.5 V) of a typical DMFC. It was considered that fuel crossover was prevented by using the electrolytic solution F1. Moreover, the value of the OCV of the fuel cell stack 110 was approximately twice as high as the value of the OCV of each of the fuel cell elements 111A and 111B, so it appeared that there was no harm in connecting the electrolytic solution channels 30 and the fuel channels 40 in series to one another.

Figure 27:
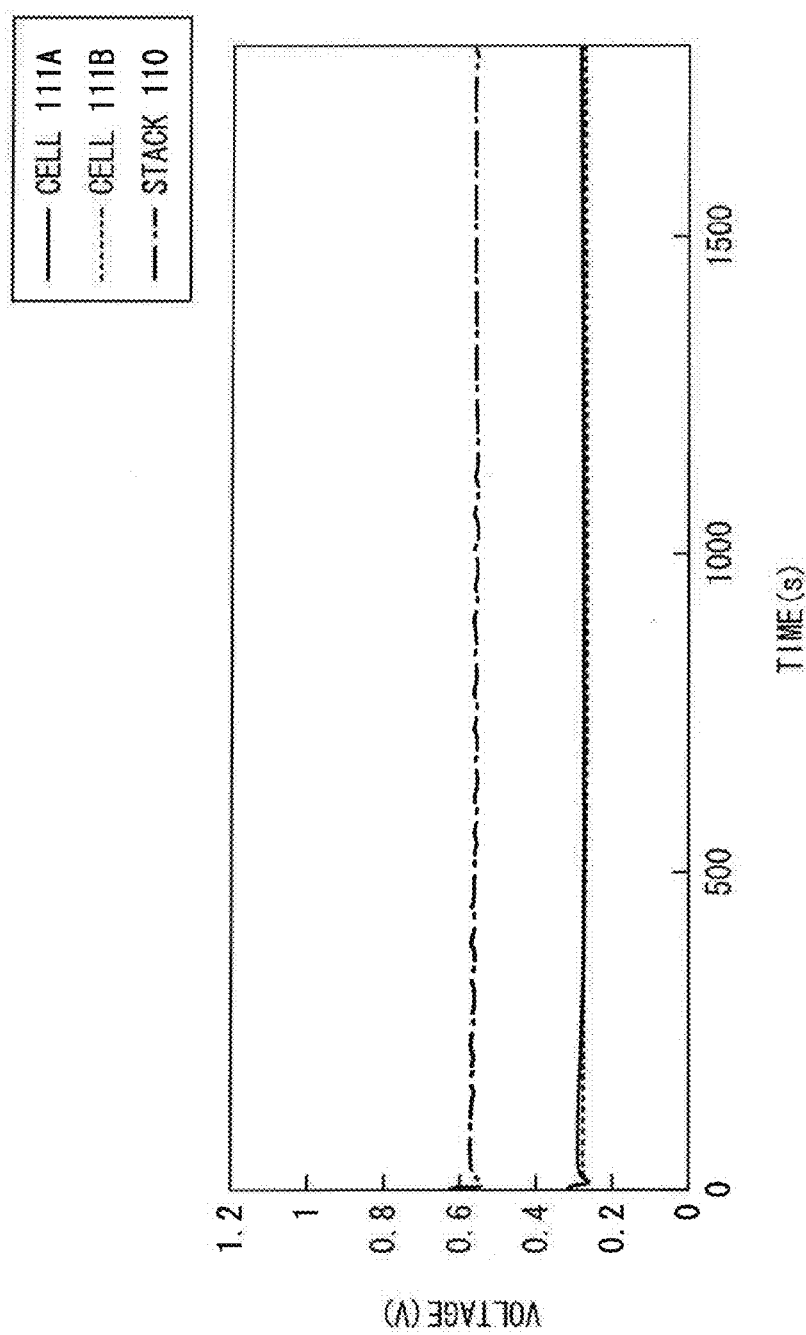
FIG. 27 is a plot illustrating results of Example 1.

Moreover, it was obvious from FIG. 27 that the characteristics of the fuel cell stack 110 at a constant current of 1A were stable. That is, it was found out that when the electrolytic solution channels 30 and the fuel channels 40 of the plurality of fuel cell elements 111A and the 111B were connected in series to one another, stability of electric power generation was allowed to be improved.

Example 2

As in the case of the above-described second embodiment, the fuel cell 110A was formed. First, an alloy including platinum (Pt) and ruthenium (Ru) at a predetermined ratio as a catalyst and a dispersion solution of a polyperfluoroalkyl sulfonic acid-based resin ("Nafion (a registered trademark)" manufactured by E. I. du Pont de Nemours and Company) were mixed at a predetermined ratio to form the catalyst layer 11 of the fuel electrode 10. The catalyst layer 11 was thermal compression bonded to the diffusion layer 12 made of the above-described material (HT-2500 manufactured by E-TEK Inc.) for 10 minutes under the conditions where the temperature was 150° C. and the pressure was 249 kPa. Further, the current collector 13 made of the above-described material was thermal compression bonded with a hot-melt adhesive or a resin sheet having adhesion to form the fuel electrode 10.

Moreover, carbon-supported platinum (Pt) as a catalyst and a dispersion solution of a polyperfluoroalkyl sulfonic acid-based resin ("Nafion (a registered trademark)" manufactured by E. I. du Pont de Nemours and Company) were mixed at a predetermined rate to form the catalyst layer 21 of the oxygen electrode 20. The catalyst layer 21 was thermal compression bonded to the diffusion layer 22 made of the above-described material (HT-2500 manufactured by E-TEK Inc.) as in the case of the catalyst layer 11 of the fuel electrode 10. Further, the current collector 23 of the above-described material was thermal compression bonded as in the case of the current collector 13 of the fuel electrode 10 to form the oxygen electrode 20.

Next, the substrate 51 configured of the resin sheet having adhesion was prepared, and the first main channel 52, the second main channel 53 and the parallel channels 54 illustrated in FIGS. 10 and 11 were formed in the substrate 51, and the ribs 55 were formed in the inlets 54A and the outlets 54B of the parallel channels 54 to form the fuel channel 40. Moreover, the electrolytic solution channel 30 illustrated in FIGS. 12 and 13 was formed in the same manner, and the fuel channel 40 and the electrolytic solution channel 30 were thermal compression bonded to both sides of the fuel electrode 10. At that time, 18 parallel channels 54 were formed, and the height H0 of each of the parallel channels 54 was 175 μm, and the height H1 of each of the ribs 55 was changed to 10%, 20%, 30%, 40%, 50%, 60%, 70%, 80% and 90% of the height H0 of the parallel channel 54.

Next, the external members 14 and 24 made of the above-described material were formed, and the fuel inlet 14A and the fuel outlet 14B configured of, for example, joints made of a resin were arranged in the external member 14, and the electrolytic solution inlet 24A and the electrolytic solution outlet 24B configured of, for example, joints made of a resin were arranged in the external member 24.

After that, the fuel electrode 10 and the oxygen electrode 20 were arranged so as to face each other so that the electrolytic solution channel 30 was arranged between the fuel electrode 10 and the oxygen electrode 20 and the fuel channel 40 was arranged outside, and the fuel electrode 10 and the oxygen electrode 20 were contained in the external members 14 and 24.

The fuel cell 110A was mounted in a system including the measurement section 120, the control section 130, the electrolytic solution supply section 140 and the fuel supply section 150 all having the above-described configurations so as to form the fuel cell system 1A illustrated in FIG. 8. At that time, the electrolytic solution supply adjustment section 142 and the fuel supply adjustment section 152 were configured of diaphragm type quantitative pumps (manufactured by KNF Neuberger GmbH), and the pumps were directly connected to the electrolytic solution inlet 24B and the fuel inlet 14A through the electrolytic solution supply line 143 and the fuel supply line 153 configured of silicone tubes, respectively, and the electrolytic solution F1 and the fuel F2 were supplied to the electrolytic solution channel 30 and the fuel channel 40 at an arbitrary flow velocity, respectively. As the electrolytic solution F1, 1M sulfuric acid was used, and the flow velocity was 1.0 ml/min. As the fuel F2, a mixed liquid of 5M methanol and 1M sulfuric acid was used, and the flow velocity was 0.5 ml/min.

(Evaluation)

Figure 28:
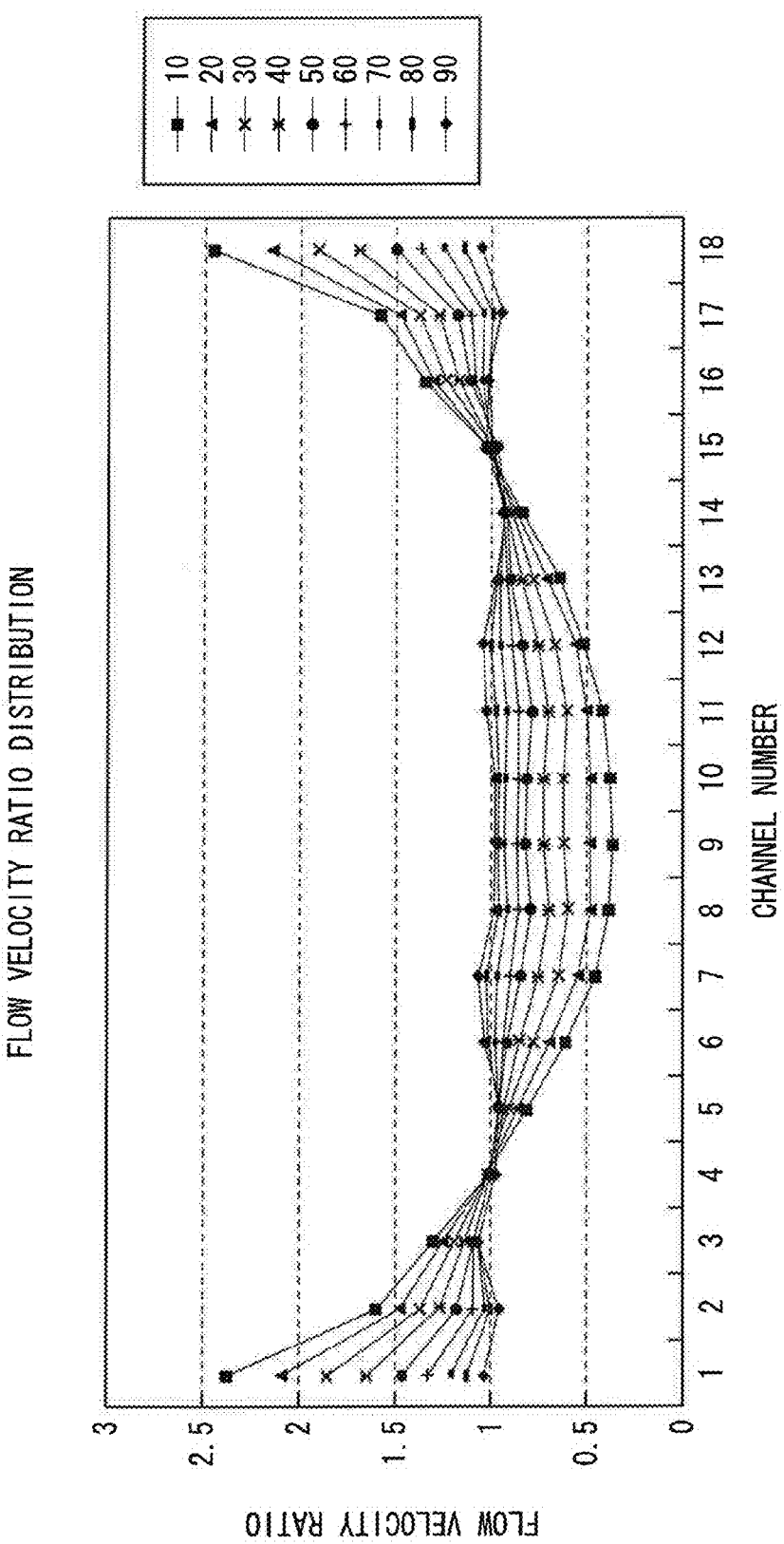
FIG. 28 is a plot illustrating results of Example 2.

The flow velocity ratio distributions in 18 parallel channels 54 in the obtained fuel cell system 1A were determined. The results are illustrated in FIG. 28. In FIG. 28, velocity distributions in the parallel channels 54 when changing the height H1 of the rib 55 based on a flow velocity ratio 1 were illustrated as a ratio. In addition, channel numbers 1 to 18 are assigned to parallel channels 54 in order from a side near the main inlet 52A.

It was obvious from FIG. 28 that as the height H1 of the rib 55 was increased relative to the height H0 of the parallel channel 54, the flow velocity ratio distributions in the parallel channels 54 were reduced, and in the case where the height H1 was 90% of the height H0, the flow velocity ratio distributions were allowed to be substantially zero. That is, it was confirmed that as the height H1 of the rib 55 was increased relative to the height H0 of the parallel channel 54, the flow velocity ratio distributions in the parallel channels 54 was reduced, and the fuel F2 or the electrolytic solution F1 was allowed to uniformly flow through the parallel channels 54.

Example 3

The fuel cell systems 1A were formed as in the case of the above-described Example 2, except that the number N of the parallel channels 54 was changed to 1, 6, 12 and 18.

Electric power generation characteristics of the obtained fuel cell systems 1A were examined. At that time, the height H0 and the width of the parallel channel 54 was 175 μm and 2 mm, respectively, and the height H1 of the rib 55 was slightly less than 40% of the height H0 of the parallel channel 54. Moreover, the measurement voltage was 0.3 V, and the data 180 seconds after the start of electric power generation at a constant voltage of 0.3 V was taken. The obtained results are illustrated in FIG. 29.

Figure 29:
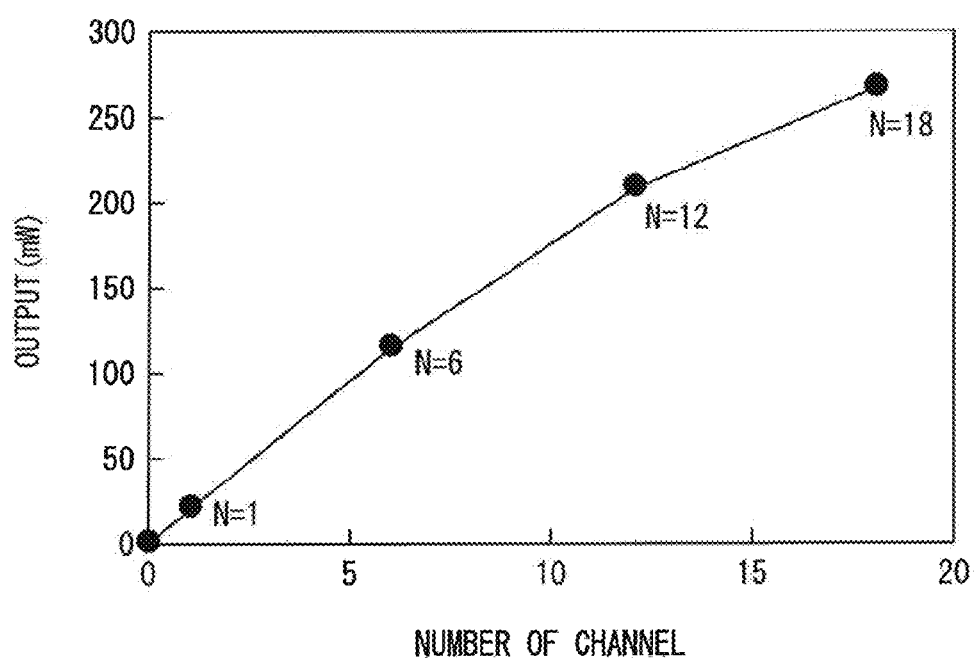
FIG. 29 is a plot illustrating results of Example 3.

It was obvious from FIG. 29 that as the number N of the parallel channels 54 was increased to 1 (N=1), 6 (N=6), 12 (N=12) and 18 (N=18), electric power generation characteristics were increased with a substantially linear relationship. If the fluid does not flow uniformly, the electric power generation characteristics are not increased with a linear relationship. That is, it was confirmed that when regions of which the sectional area was reduced by forming the ribs 55 at the inlet 54A and the outlet 54B of the parallel channels 54 was arranged, uniformity of the flow through the parallel channels 54 was improved.

Example 4

In the following Examples 4 and 5, the fuel cells 110 illustrated in FIGS. 15 and 16 were formed, and the characteristics thereof were evaluated. Therefore, referring to FIGS. 8, 15 and 16, like components will be described using like numerals.

The fuel cell 110B having the same configuration of that in FIG. 15 was formed. First, an alloy including platinum (Pt) and ruthenium (Ru) at a predetermined ratio as a catalyst and a dispersion solution of a polyperfluoroalkyl sulfonic acid-based resin ("Nafion (a registered trademark)" manufactured by E. I. du Pont de Nemours and Company) were mixed at a predetermined ratio to form the catalyst layer 11 of the fuel electrode 10. The catalyst layer 11 was thermal compression bonded to the diffusion layer 12 made of the above-described material (HT-2500 manufactured by E-TEK Inc.) for 10 minutes under the conditions where the temperature was 150° C. and the pressure was 249 kPa. Moreover, as the functional layer 51, a fine porous film made of polyimide with a thickness of approximately 10 μm to 15 μm was prepared, and the functional layer 51 was thermal compression bonded to the catalyst layer 11 for 5 minutes under the conditions where the temperature was 150° C. and the pressure was 249 kPa. Further, the current collector 13 made of the above-described material was thermal compression bonded with a hot-melt adhesive or a resin sheet having adhesion to form the fuel electrode 10.

Moreover, carbon-supported platinum (Pt) as a catalyst and a dispersion solution of a polyperfluoroalkyl sulfonic acid-based resin ("Nafion (a registered trademark)" manufactured by E. I. du Pont de Nemours and Company) were mixed at a predetermined rate to form the catalyst layer 21 of the oxygen electrode 20. The catalyst layer 21 was thermal compression bonded to the diffusion layer 22 made of the above-described material (HT-2500 manufactured by E-TEK Inc.) as in the case of the catalyst layer 11 of the fuel electrode 10. Further, the current collector 23 of the above-described material was thermal compression bonded as in the case of the current collector 13 of the fuel electrode 10 to form the oxygen electrode 20.

Next, a resin sheet having adhesion was prepared, and the channel was formed with the resin sheet to form the electrolytic solution channel 30 and the fuel channel 40, and the electrolytic solution channel 30 and the fuel channel 40 were thermal compression bonded to both sides of the fuel electrode 10.

Next, the external members 14 and 24 made of the above-described material were formed, and the fuel inlet 14A and the fuel outlet 14B configured of, for example, joints made of a resin were arranged in the external member 14, and the electrolytic solution inlet 24A and the electrolytic solution outlet 24B configured of, for example, joints made of a resin were arranged in the external member 24.

After that, the fuel electrode 10 and the oxygen electrode 20 were arranged so as to face each other so that the electrolytic solution channel 30 was arranged between the fuel electrode 10 and the oxygen electrode 20 and the fuel channel 40 was arranged outside, and the fuel electrode 10 and the oxygen electrode 20 were contained in the external members 14 and 24. Thereby, the fuel cell 110B illustrated in FIG. 15 was completed.

The fuel cell 110B was mounted in a system including the measurement section 120, the control section 130, the electrolytic solution supply section 140 and the fuel supply section 150 all having the above-described configurations so as to form the fuel cell system 1A illustrated in FIG. 8. At that time, the electrolytic solution supply adjustment section 142 and the fuel supply adjustment section 152 were configured of diaphragm type quantitative pumps (manufactured by KNF Neuberger GmbH), and the pumps were directly connected to electrolytic solution inlet 24A and the fuel inlet 14A through the electrolytic solution supply line 143 and the fuel supply line 153 configured of silicone tubes, respectively, and the electrolytic solution F1 and the fuel F2 were supplied to the electrolytic solution channel 30 and the fuel channel 40 at an arbitrary flow velocity, respectively. As the electrolytic solution F1, 1M sulfuric acid was used, and the flow velocity was 1.0 ml/min. As the fuel F2, a mixed liquid of 5M methanol and 1M sulfuric acid was used, and the flow velocity was 0.080 ml/min.

As Comparative Example 1 relative to the example, a fuel cell was formed as in the case of Example 4 except that the functional layer 51 was not arranged, and a fuel cell system using the fuel cell was formed.

(Evaluation)

Figure 30:
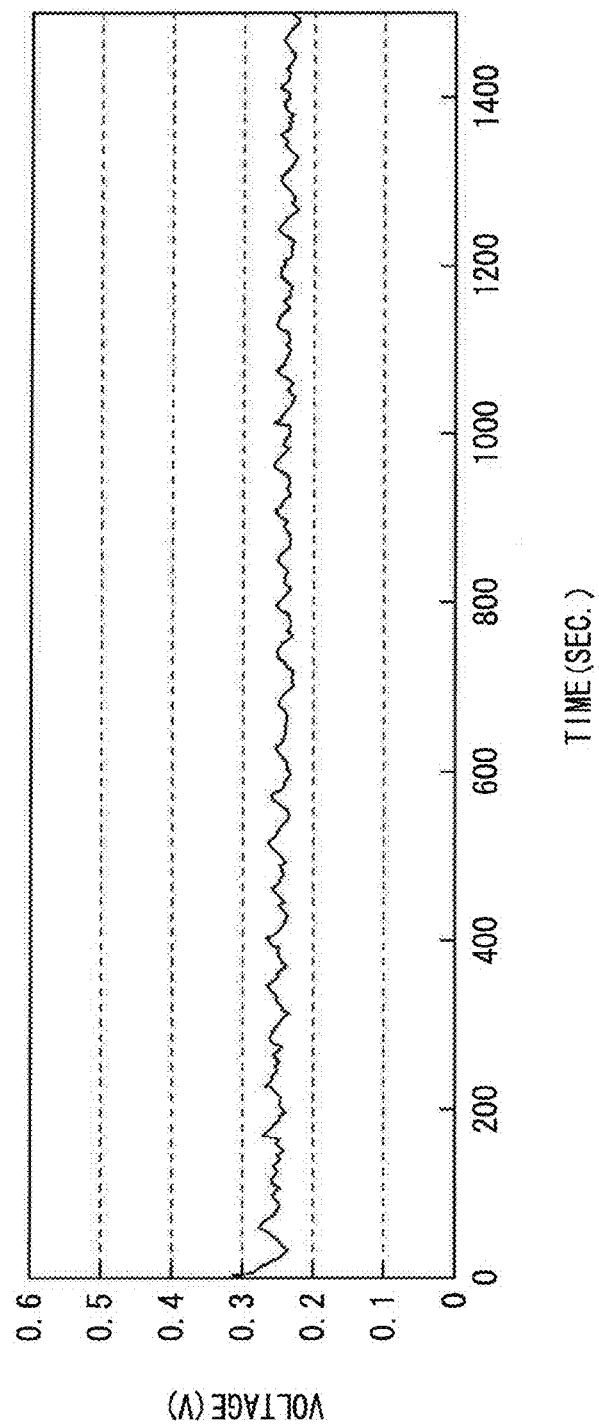
FIG. 30 is a plot illustrating a result of Comparative Example 1.

The obtained fuel cell systems of Example 4 and Comparative Example 1 were connected to an electrochemical measurement system (Multistat 1480 manufactured by Solartoron Co., Ltd) to perform a constant current mode operation, and the characteristics of the fuel cell systems were evaluated. As a measurement condition, the current density was approximately 150 mA/cm$^2$. The result of Comparative Example 1 and the result of Example 4 are illustrated in FIGS. 30 and 31, respectively.

The fuel cells operated at a current value at which the generation of $CO_2$ was visible, so in Comparative Example 1 in which the functional layer was not included, the influence was obvious. Excess $CO_2$ was generated as bubbles on the electrolytic solution F1 side, and these bubbles were not completely removed from the electrolytic solution channel 30, and exit in the electrolytic solution channel 30, thereby the flow of the electrolytic solution F1 was disturbed. The bubbles also affect the proton conductivity of the electrolytic solution F1, so as illustrated in FIG. 30, in Comparative Example 1, characteristics were extremely unstable. In the case where $CO_2$ was generated, and exit in the electrolytic solution channel 30 as bubbles, the voltage was reduced, and when $CO_2$ bubbles were transferred from the electrolytic solution channel 30, the voltage was increased. Therefore, when the $CO_2$ bubbles were allowed to be efficiently removed from the electrolytic solution channel 30, continuous electric power generation was allowed without the functional layer, but if $CO_2$ bubbles were not allowed to be removed from the electrolytic solution channel 30 on a regular basis, the characteristics was getting worse.

Figure 31:
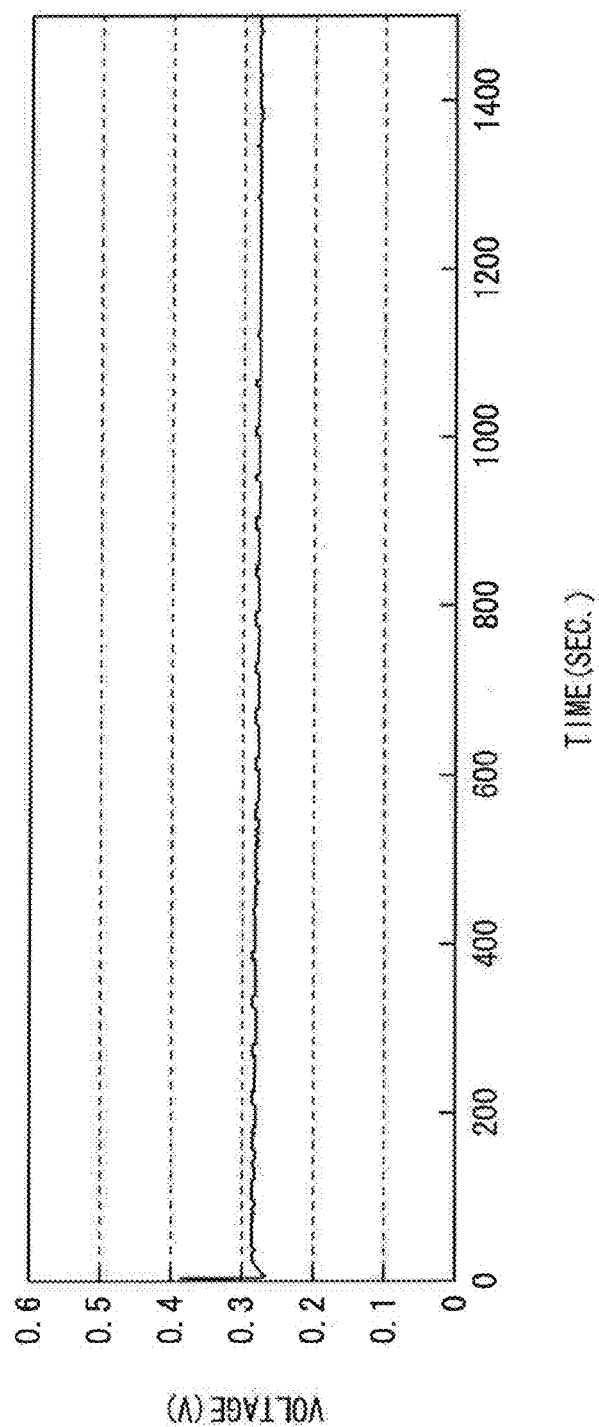
FIG. 31 is a plot illustrating a result of Example 4.

On the other hand, in Example 4 in which the functional layer 51 was formed, it was obvious from FIG. 31 that the characteristics were extremely stable. It was considered that it was because almost all generated $CO_2$ was released into the fuel F2 as bubbles. That is, it was confirmed that when the functional layer 51 was arranged on the catalyst layer 11 of the fuel electrode 10, the direction where the carbon dioxide bubbles were released was controllable, and the characteristics were allowed to be stabilized.

Example 5

The fuel cell 110 having the same configuration as that in FIG. 16 was formed. At that time, while the functional layer 51 was not formed in the fuel electrode 10, a blend layer of PVDF as a water repellent resin and a polyperfluoroalkyl sulfonic acid-based resin ("Nafion (a registered trademark)" manufactured by E. I. du Pont de Nemours and Company) as a proton conductor was formed on the catalyst layer 21 of the oxygen electrode 20 as the functional layer 52. The fuel cell 110B was formed as in the case of Example 4 except for this, and the fuel cell system 1A was formed.

As Comparative Example 2 relative to the example, a fuel cell was formed as in the case of Example 4, except that the functional layer 52 was not arranged, and a fuel cell system was formed using the fuel cell.

Characteristics of the obtained fuel cell systems of Example 5 and Comparative Example 2 were evaluated as in the case of the above-described Example 4 and Comparative Example 1. The result of Comparative Example 2 and the result of Example 5 are illustrated in FIGS. 32 and 33, respectively.

Figure 32:
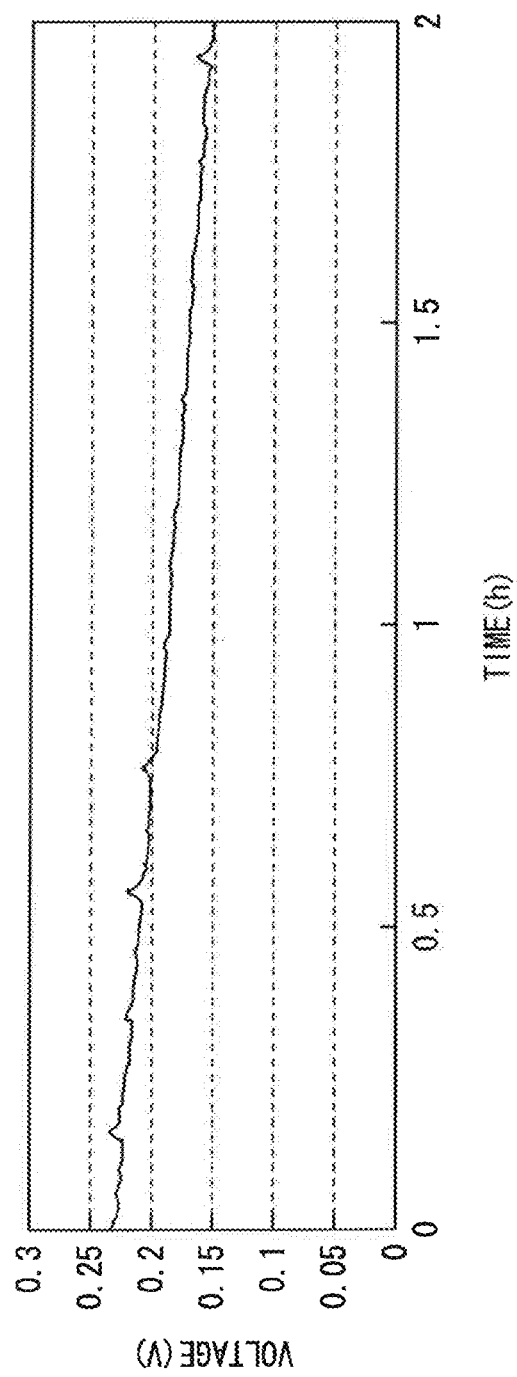
FIG. 32 is a plot illustrating a result of Comparative Example 2.
Figure 33:
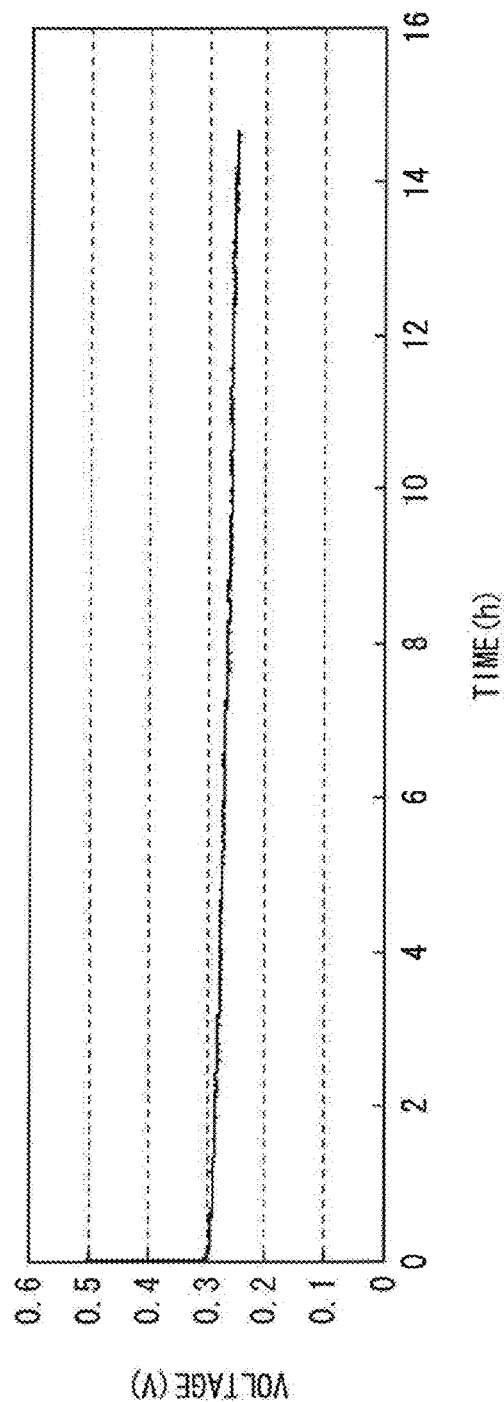
FIG. 33 is a plot illustrating a result of Example 5.

It was obvious from FIGS. 32 and 33 that in Comparative Example 2 in which the functional layer was not arranged, the characteristics were largely deteriorated for approximately 2 hours, but in Example 5 in which the functional layer 52 was arranged, deterioration of the characteristics were less likely to occur, and the electric power generation was stably maintained for a long time. It was considered that it was because when the functional layer 52 was arranged on the catalyst layer 21 of the oxygen electrode 20, overvoltage in the oxygen electrode 20 due to fuel crossover was prevented, and flooding in the oxygen electrode 20 was prevented. That is, it was confirmed that when the functional layer 52 was arranged on the catalyst layer 21 of the oxygen electrode 20, deterioration of the characteristics were preventable, and long-time electric power generation was allowed.

In the above-described embodiments and examples, the configurations of the fuel electrode 10, the oxygen electrode 20, the fuel channel 30 and the electrolytic solution channel 40 are described in detail, but they may have any other configuration or may be made of any other material. For example, in the above-described third and fourth embodiments, the fuel channel 30 may be configured of a sheet made of a porous material or the like in addition to a channel formed by processing the resin sheet described in the above-described first embodiment and examples.

Figure 34:
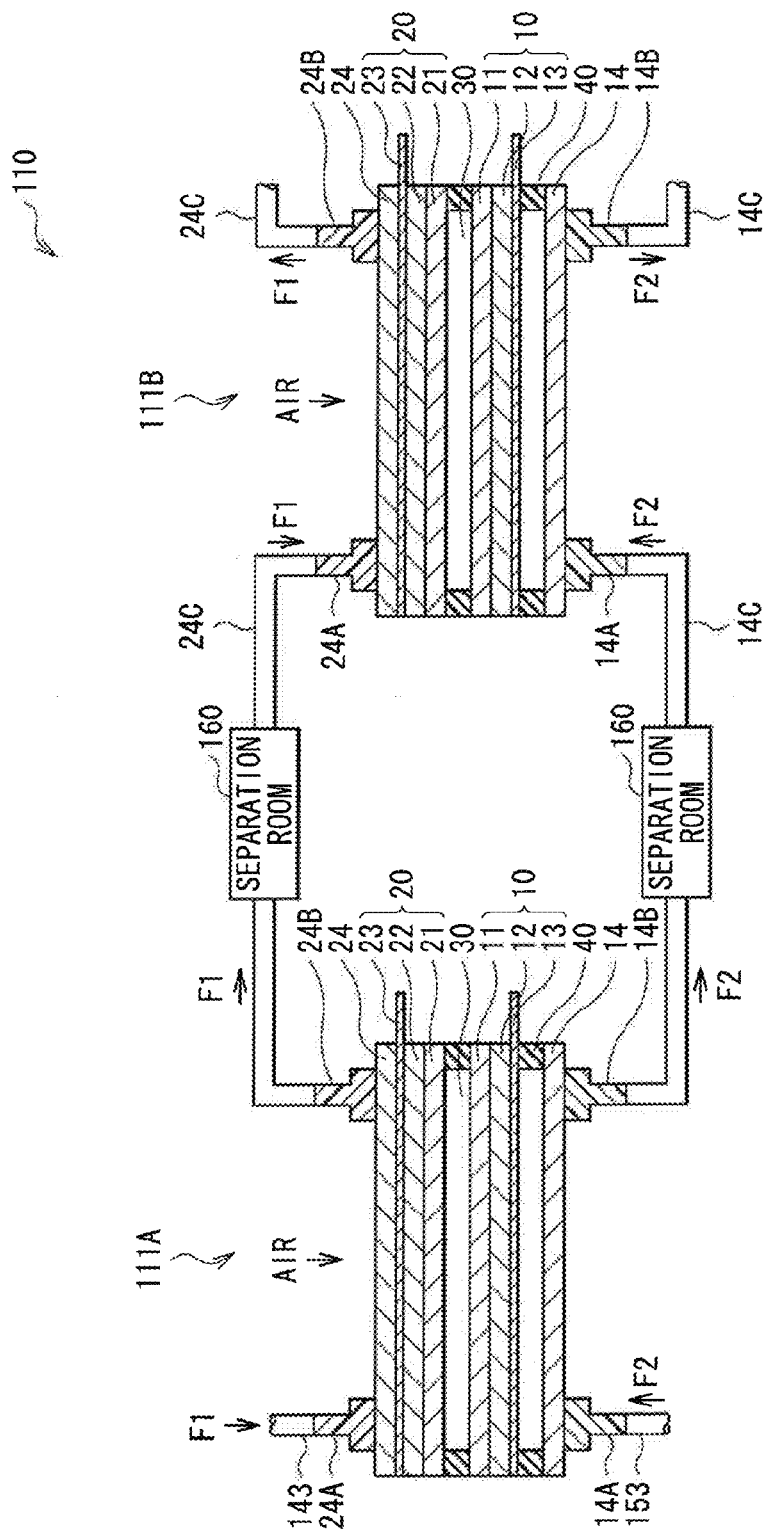
FIG. 34 is an illustration of configurations of two fuel cell elements of a fuel cell stack system according to a modification example.

Moreover, for example, in the above-described first embodiment and examples, the case where a plurality of fuel cell elements 111 are stacked in a vertical direction (a stacking direction) to form the fuel cell stack 110 is described; however, for example, as illustrated in FIG. 34, the invention is applicable to the case where a plurality of fuel cell elements 111 are stacked in a horizontal direction (a stack plane direction) to form the fuel cell stack 110.

Figure 35:
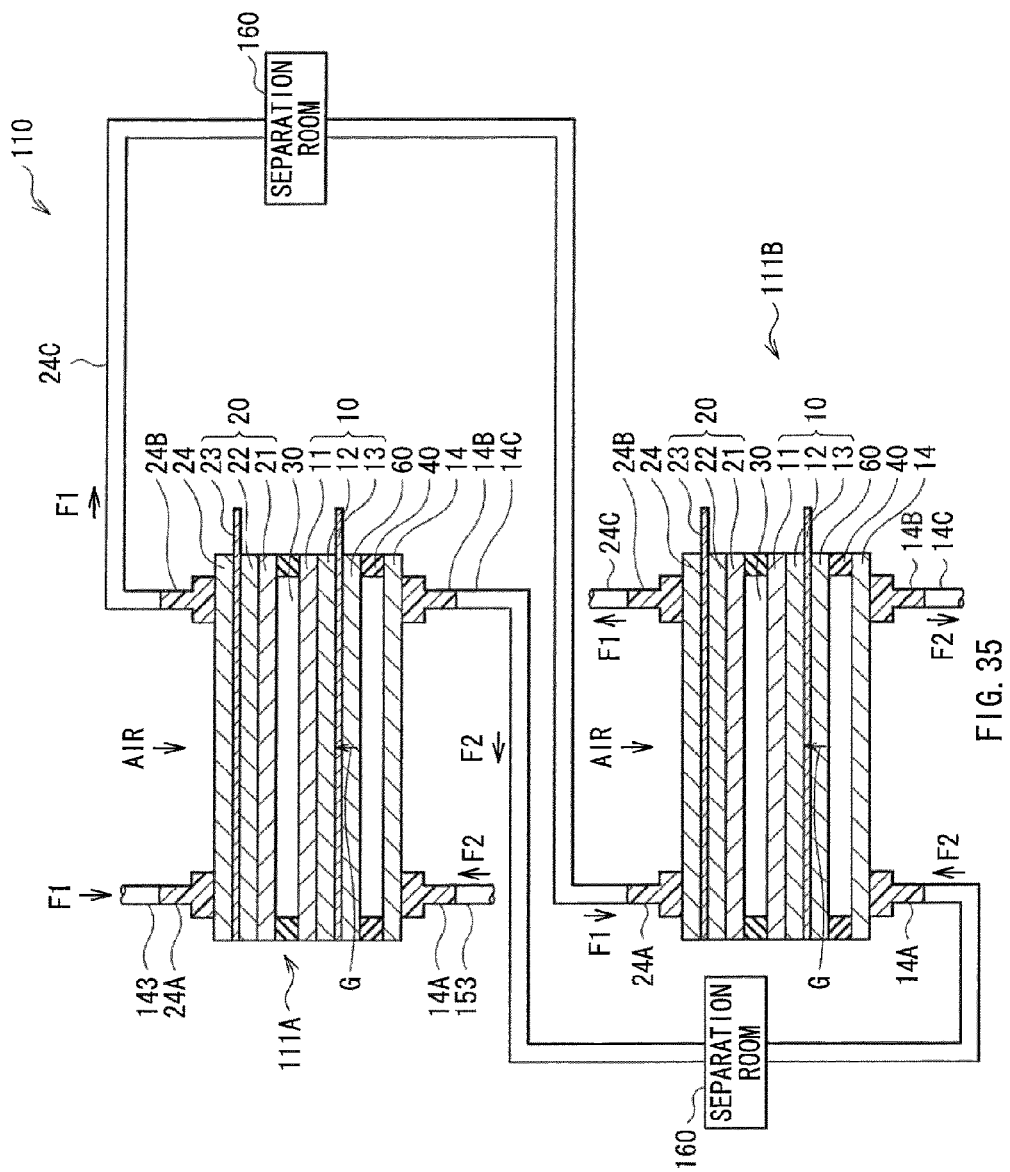
FIG. 35 is an illustration of configurations of two fuel cell elements of the fuel cell stack system according to a modification example.

Further, as illustrated in FIG. 35, the gas-liquid separation film 60 described in the fourth embodiment may be arranged between the fuel channel 40 and the fuel electrode 10.

Figure 36:
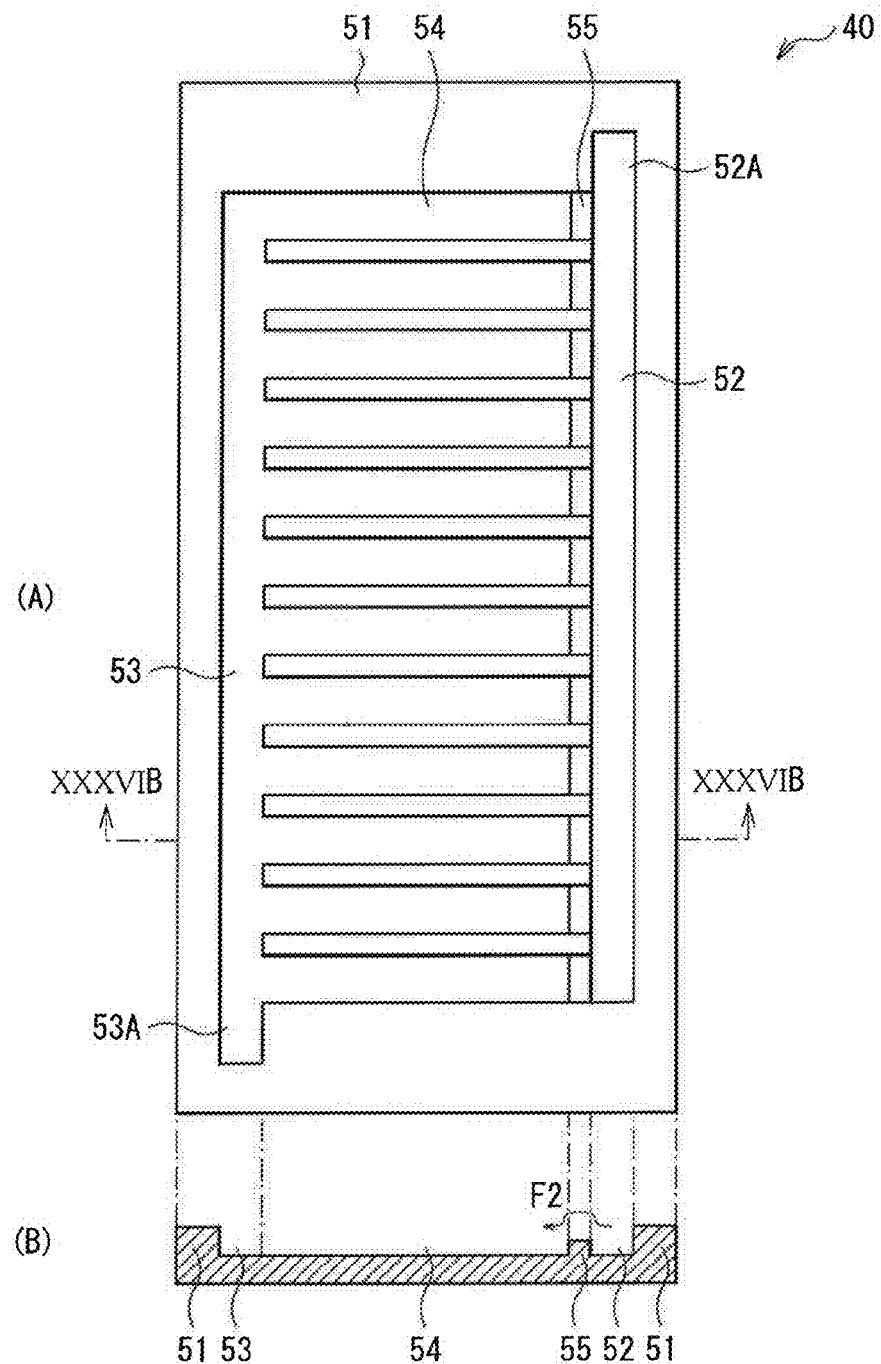
FIG. 36 is a plan view and a sectional view illustrating a modification example of the fuel channel illustrated in FIG. 11.
Figure 37:
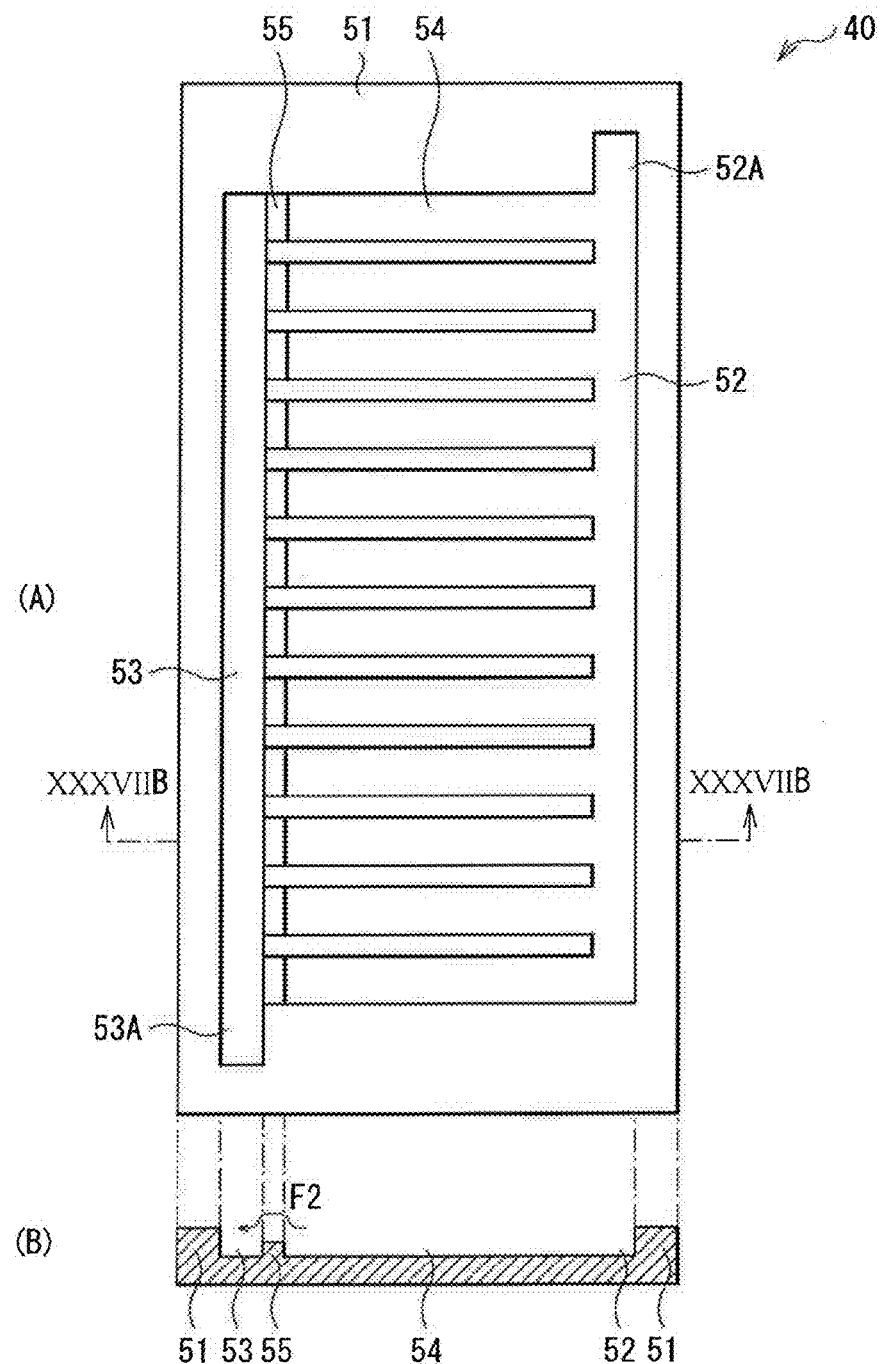
FIG. 37 is a plan view and a sectional view illustrating another modification example of the fuel channel illustrated in FIG. 11.

In addition, in the above-described second embodiment and examples, the case where regions of which sectional areas are reduced by forming the ribs 55 in both of the inlet 54A and the outlet 54B of the parallel channel 54 are arranged is described; however, the rib 55 may be arranged either or both of the inlet 54A and the outlet 54B. For example, as illustrated in FIG. 36, the rib 55 may be arranged only in the inlet 54A, or as illustrated in FIG. 37, the rib 55 may be arranged only in the outlet 54B. In addition, FIGS. 36 and 37 illustrate modification examples of the fuel channel 40, but the same modification examples are applicable to the electrolytic solution channel 30.

Moreover, in the above-described second embodiment and examples, the case where the case where the ribs 55 are arranged in all of the parallel channels 54 is described; however, the rib 55 may be arranged one or more of the parallel channels 54.

Further, in the above-described second embodiment and examples, the case where the heights H1 of the ribs 55 in all of the parallel channels 54 are equal to one another is described; however, the height H1 of the rib 55 may differ in each of the parallel channels 54.

Figure 38:
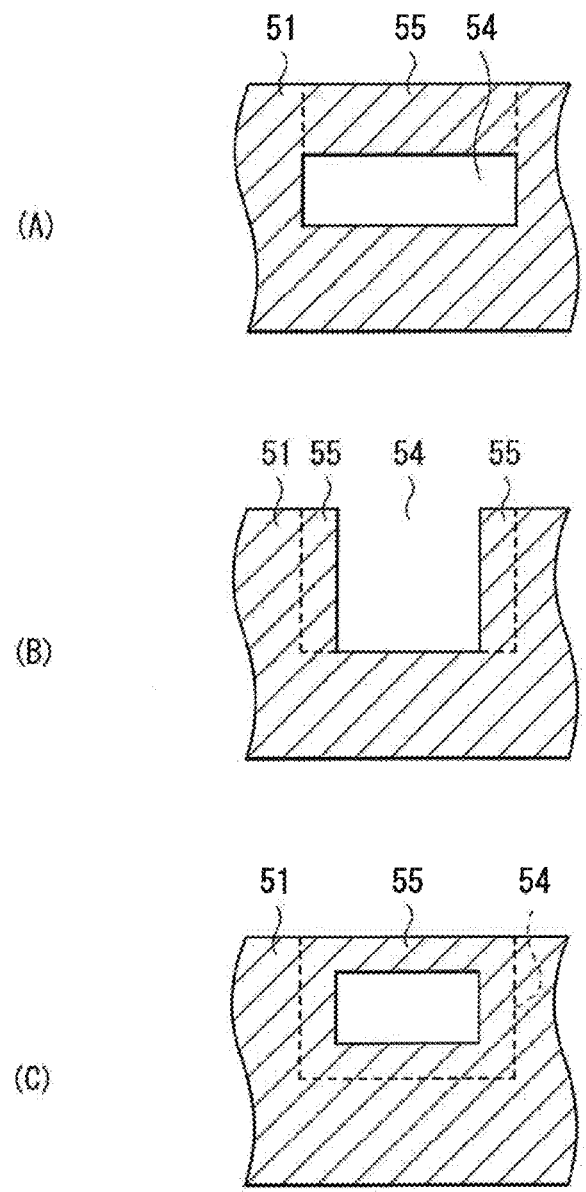
FIG. 38 is a sectional view illustrating a modification example of the rib illustrated in FIG. 11(C).

Further, in the above-described second embodiment and examples, the case where the rib 55 is arranged in a lower part of the parallel channel 54 is described; however, as illustrated in FIG. 38(A), the rib 55 may be formed in an upper part of the parallel channel 54, or as illustrated in FIG. 38(B), the rib 55 may be arranged in one or both of a right part and a left part of the parallel channel 54, or as illustrated in FIG. 38(C), the rib 55 may be formed in all of the upper, lower, right and left parts of the parallel channel 54.

Figure 39:
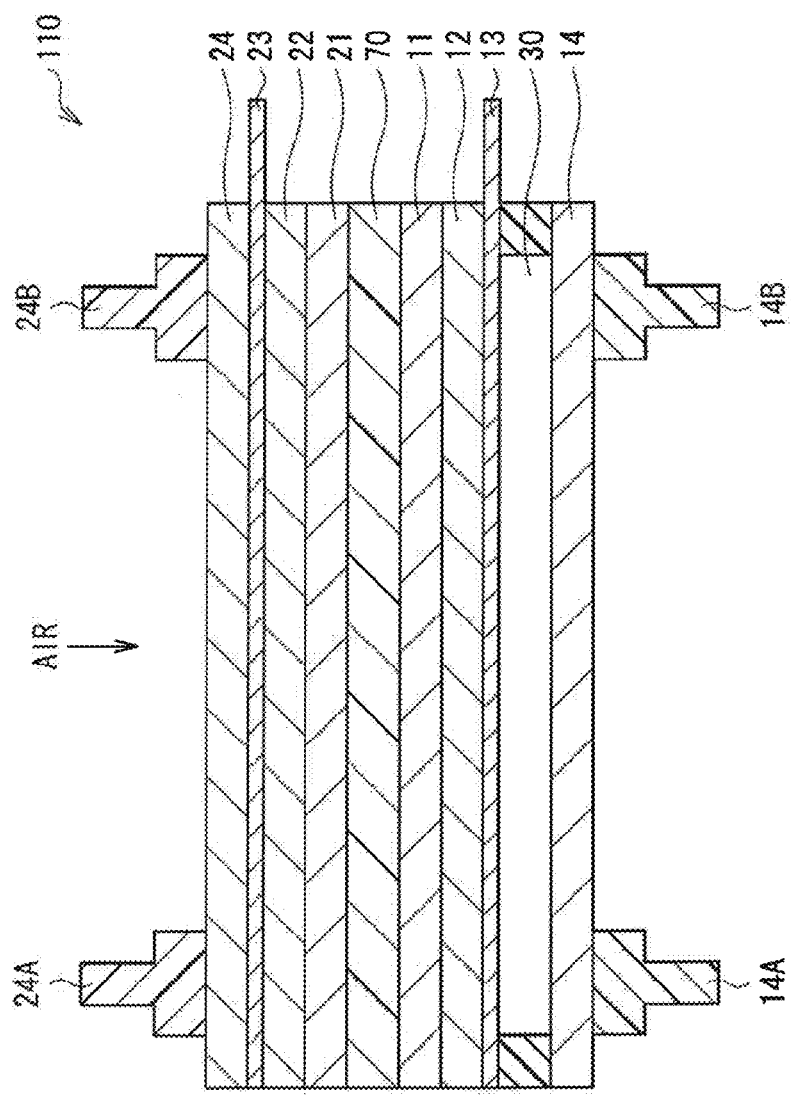
FIG. 39 is a sectional view illustrating a modification example of the fuel cell illustrated in FIG. 9.

In addition, instead of the electrolytic solution channel 40 described in the above-described second embodiment and examples, as illustrated in FIG. 39, an electrolyte film 70 made of a polyperfluoroalkyl sulfonic acid-based resin ("Nafion (a registered trademark)" manufactured by E. I. du Pont de Nemours and Company) or any other resin having proton conductivity may be arranged between the fuel electrode 10 and the oxygen electrode 20.

Figure 40:
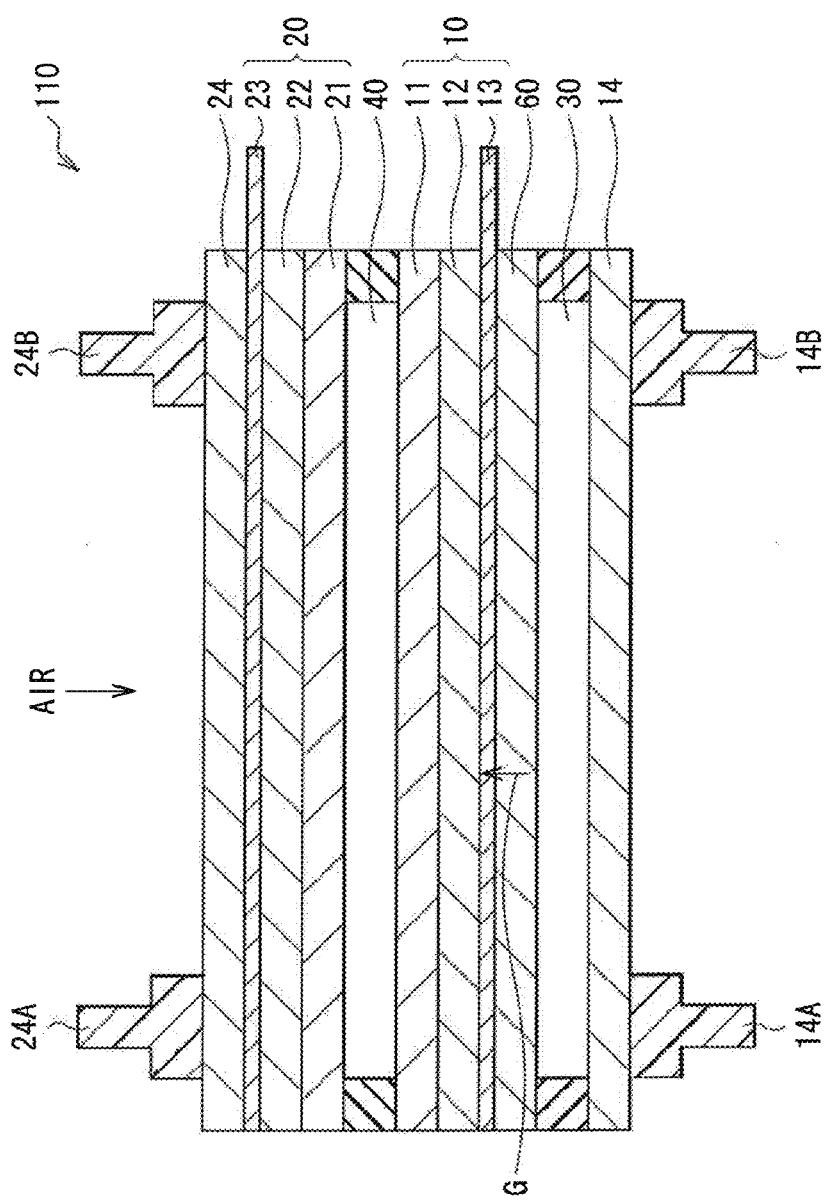
FIG. 40 is a sectional view illustrating another modification example of the fuel cell illustrated in FIG. 9.
Figure 41:
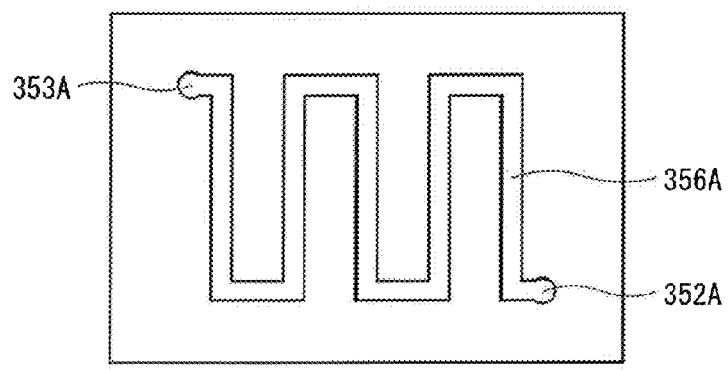
FIG. 41 is a plan view illustrating an example of a channel in related art.
Figure 42:
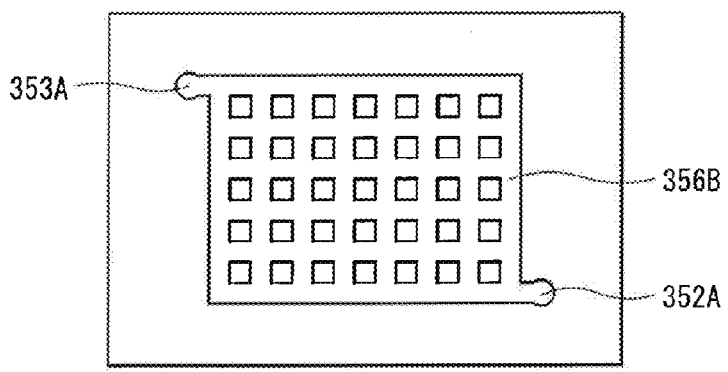
FIG. 42 is a plan view illustrating another example of the channel in related art.
Figure 43:
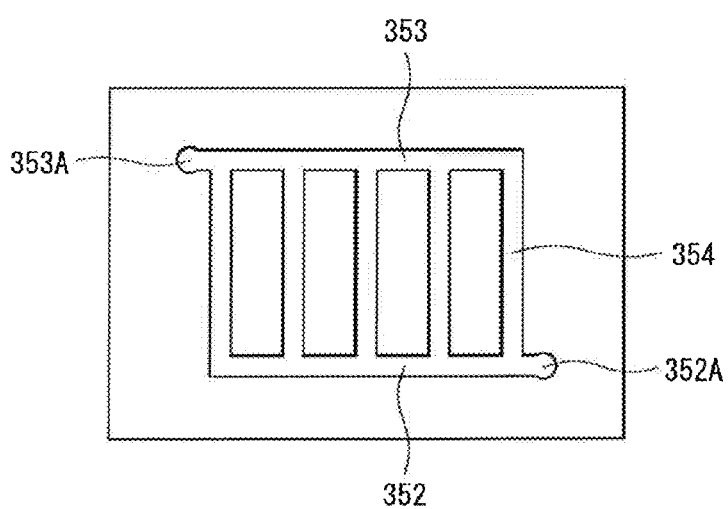
FIG. 43 is a plan view illustrating still another example of the channel in related art.
Figure 44:
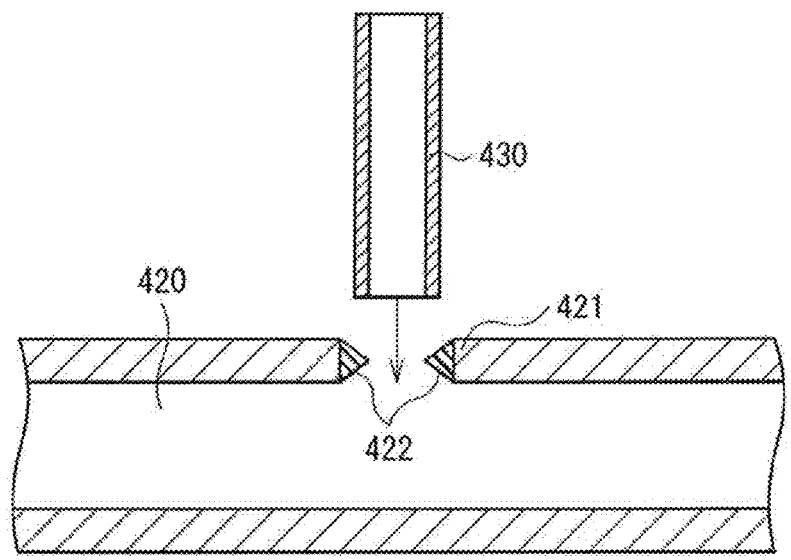
FIG. 44 is an illustration for describing a method of connecting a fluid connected to the channel in related art.
Figure 44:
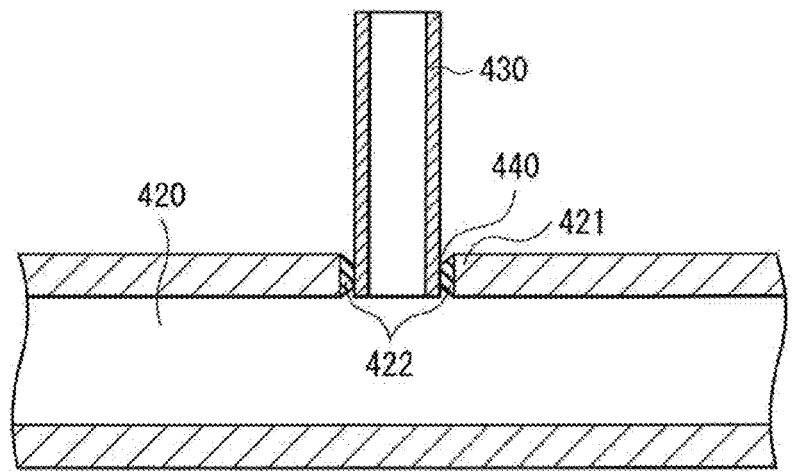

Moreover, also in the above-described second embodiment, as illustrated in FIG. 40, the gas-liquid separation film 60 described in the fourth embodiment may be arranged between the fuel channel 30 and the fuel electrode 10.

Further, for example, in the above-described second embodiment and examples, the case where the electrolytic solution F1 circulates between the fuel cell 110 and the electrolytic solution supply section 140 is described; however, the electrolytic solution F1 may not circulate and remain stationary between the fuel electrode 10 and the oxygen electrode 20.

In addition, for example, in the above-described second embodiment and examples, one fuel cell 110A is described as an example; however, the invention is applicable to a fuel cell stack in which a plurality of fuel cells 110A are stacked in a vertical direction (a stacking direction) or a horizontal direction (a stack plane direction), and the invention is extremely effective to reduce the thickness and the size of the fuel cell stack.

Moreover, in the above-described second embodiment and examples, the case where the channel structure of the invention is applied to the fuel channel 30 and the electrolytic solution channel 40 of the fuel cell 110A is described; however, the channel structure of the invention is widely applicable to applications for flowing a fluid through parallel channels such as a boiler, a radiator or a concentration sensor.

Further, for example, in the above-described third and fourth embodiments and examples, the case where the electrolytic solution F1 is in a state in which the electrolytic solution F1 consistently flows during electric power generation is described; however, the invention is widely applicable to fuel cells using a liquid electrolyte such as a fuel cell using the electrolytic solution F1 in a stationary state.

In addition, for example, in the above-described third and fourth embodiments and examples, the case where one fuel cell 110 is included is described; however, the invention is applicable to the case where a fuel cell stack is configured by stacking a plurality of fuel cells 110 in a vertical direction (a stacking direction) or a horizontal direction (in a stack plane direction).

Moreover, for example, the material and the thickness of each component, a bonding method, electric power generation conditions in the fuel cell stack 11 and the like are not limited to those described in the above-described embodiments and examples, and any other material, any other thickness and any other bonding method may be used, and any other electric power generation conditions may be used.

Further, for example, in the above-described embodiments and examples, the configurations of the fuel electrode 10, the oxygen electrode 20, the fuel channel 30 and the electrolytic solution channel 40 are described in detail; however, they may have any other configuration or may be made of any other material.

In addition, in the above-described embodiments, the case where the fuel F2 is supplied from the fuel supply section 150 to the fuel electrode 10 is described; however, the fuel electrode 10 may be of a sealed type, and the fuel F2 may be supplied as necessary.

Moreover, for example, the fuel F2 may be any other liquid fuel such as ethanol or dimethyl ether in addition to methanol. The electrolytic solution F1 is not specifically limited as long as the electrolytic solution F1 has proton (H+) conductivity, and examples of the electrolytic solution F1 include a phosphoric acid and an ionic liquid in addition to the sulfuric acid.

Further, the embodiments are not limited to a fuel cell using a liquid fuel, and is applicable to a fuel cell using a substance such as hydrogen other than a liquid fuel as a fuel.

In addition, in the above-described embodiments and examples, air is supplied to the oxygen electrode 20 by natural ventilation; however, air may be forcefully supplied using a pump or the like. In this case, oxygen or a gas including oxygen may be supplied instead of air.

Moreover, in the above-described embodiments and examples, the case where in the fuel cell 110, the fuel electrode 10 and the oxygen electrode 20 are arranged so as to face each other so that the electrolytic solution channel 30 is arranged between the fuel electrode 10 and the oxygen electrode 20 and the fuel channel 40 is arranged outside is described; however, the invention is applicable to a fuel cell system including a fuel cell with any other configuration.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A fuel cell stack system comprising a plurality of fuel cell elements,
   wherein each of the plurality of fuel cell elements includes: a fuel electrode and an oxygen electrode which are arranged so as to face each other; an electrolytic channel arranged between the fuel electrode and the oxygen electrode and in contact with both the fuel electrode and the oxygen electrode, the electrolytic channel enabling an electrolytic solution to flow therethrough; and a fuel channel arranged on a side of the fuel electrode opposite to a side where the oxygen electrode is arranged and enabling a fuel to flow therethrough,
   wherein at least one of the electrolytic channels and the fuel channels of some or all of the plurality of fuel cell elements are connected in series to one another, and
   wherein the electrolytic channel comprises a channel formed in a resin sheet.

2. The fuel cell stack system according to claim 1, wherein the fuel channels of some or all of the plurality of fuel cell elements are connected in series to one another, and the electrolytic solution channels of all of the plurality of fuel cell elements are connected in parallel to one another.

3. The fuel cell stack system according to claim 1, wherein the fuel channels of all of the plurality of fuel cell elements are connected in parallel to one another, and the electrolytic solution channels at least of some of the plurality of fuel cell elements are connected in series to one another.

4. The fuel cell stack system according to claim 1, wherein both the fuel channels and the electrolytic solution channels of at least some of the plurality of fuel cell elements are connected in series to one another.

5. The fuel cell stack system according to claim 1, wherein at least one of the electrolytic solution channels and the fuel channels of all of the plurality of fuel cell elements are connected in series to one another.

6. The fuel cell stack system according to claim 1, comprising:
   a separation room configured to remove carbon dioxide included in the fuel or the electrolytic solution or to separate a fuel included in the electrolytic solution.

7. The fuel cell stack system according to claim 1, wherein each of the plurality of fuel cell elements includes a gas-liquid separation film between the fuel channel and the fuel electrode.

8. The fuel cell stack system according to claim 1, wherein each of the electrolytic channels and the fuel channels are formed with a resin sheet.

9. The fuel cell stack system according to claim 6, wherein the separation room is connected to a midpoint of a connection channel, and wherein the connection channel connects an outlet of one of the electrolytic channels and the fuel channels of a first fuel cell element to an inlet of the one of the electrolytic channels and the fuel channels of a second fuel cell element.

10. The fuel cell stack system according to claim 1, wherein the fuel cell stack system comprises an electrolytic solution supply section for supplying electrolytic solution to the plurality of fuel cells, and wherein an electrolytic solution outlet of a last of the plurality of fuel cell elements is connected directly to the electrolytic solution supply section.

11. The fuel cell stack system according to claim 1, wherein the fuel cell stack system comprises an electrolytic solution supply section containing an electrolytic solution selected from the group consisting of: a sulfuric acid solution, a phosphoric acid solution and an ionic liquid.

12. The fuel cell stack system according to claim 1, wherein the fuel cell stack system comprises a fuel supply section containing a liquid fuel.

13. The fuel cell stack system according to claim 1, wherein the channel formed in the resin sheet is bonded to the fuel electrode.

14. An electronic device comprising a fuel cell stack system including a plurality of fuel cell elements,
   wherein each of the plurality of fuel cell elements includes a fuel electrode and an oxygen electrode which are arranged so as to face each other; an electrolytic channel arranged between the fuel electrode and the oxygen electrode and in contact with both the fuel electrode and the oxygen electrode, the electrolytic channel enabling an electrolytic solution to flow therethrough; and a fuel channel arranged on a side of the fuel electrode opposite to a side where the oxygen electrode is arranged and enabling a fuel to flow therethrough, wherein at least one of the electrolytic channels and the fuel channels of some or all of the plurality of fuel cell elements are connected in series to one another, and wherein the electrolytic channel comprises a channel formed in a resin sheet.

* * * * *